(12) United States Patent
Chen et al.

(10) Patent No.: US 9,375,063 B2
(45) Date of Patent: *Jun. 28, 2016

(54) SYSTEMS AND METHODS FOR COLLAPSIBLE LUGGAGE

(75) Inventors: Stephen Chi Yueh Chen, Arcadia, CA (US); Ahron Hersh, Brooklyn, NY (US); Nancy Mei-Hui Hung, Taipei (TW)

(73) Assignee: Stephen Chi Yueh Chen et al., Arcadia, PA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/594,010

(22) Filed: Aug. 24, 2012

(65) Prior Publication Data

US 2013/0075213 A1    Mar. 28, 2013

Related U.S. Application Data

(60) Provisional application No. 61/575,657, filed on Aug. 24, 2011, provisional application No. 61/634,553, filed on Mar. 2, 2012, provisional application No. 61/690,234, filed on Jun. 21, 2012, provisional application No. 61/690,197, filed on Jun. 21, 2012, provisional application No. 61/690,233, filed on Jun. 21, 2012.

(51) Int. Cl.
*A45C 7/00*     (2006.01)
*A45C 13/38*    (2006.01)
(Continued)

(52) U.S. Cl.
CPC ............. *A45C 7/0054* (2013.01); *A45C 7/0018* (2013.01); *A45C 7/0036* (2013.01);
(Continued)

(58) Field of Classification Search
CPC ........ A45C 5/14; A45C 13/262; A45C 5/146; A45C 13/385; A45C 3/004
USPC ...... 190/18 R, 18 A, 107, 108, 110, 111, 115, 190/124, 4, 103; 280/37, 643; 292/252; 206/287.1, 289, 291; 220/666, 6, 9.4, 220/630, 495.04
See application file for complete search history.

(56) References Cited

U.S. PATENT DOCUMENTS 3,362,041 A * 1/1968 Fynewever ............ A45C 13/34
                                                    16/335
4,974,870 A * 12/1990 Jarke ........................ A47C 4/04
                                                    280/643
(Continued)

FOREIGN PATENT DOCUMENTS

EP          0662289 B1    4/2001
WO          98/12943 A1   4/1998
(Continued)

*Primary Examiner* — Fenn Mathew
*Assistant Examiner* — Cynthia Collado
(74) *Attorney, Agent, or Firm* — Kramer Levin Naftalis & Frankel LLP

(57) ABSTRACT

In exemplary embodiments of the present invention, systems and methods for providing collapsible luggage are presented. Such exemplary collapsible luggage can have two states: (i) a fully extended state in which said luggage is used by a user to hold, for example, clothing and objects, and (ii) a compressed or folded state in which the luggage has a minimum volume and can be easily and conveniently stored, especially where space is a premium. Various novel technologies are used to obtain maximal compression in the compressed state, provide rigidity and structural support in the fully extended state, and to allow for convenient transformation between the two states. One of such technologies is a self-locking hinge mechanism requiring no direct contact from a user, which also provides audible feedback to the user.

24 Claims, 94 Drawing Sheets

(51) Int. Cl.
*E05D 3/02* (2006.01)
*E05D 11/10* (2006.01)
*F16C 11/10* (2006.01)
*A45C 5/14* (2006.01)

(52) U.S. Cl.
CPC ............. *A45C13/385* (2013.01); *E05D 3/02* (2013.01); *E05D 11/1064* (2013.01); *F16C 11/10* (2013.01); *A45C 5/14* (2013.01); *Y10T 16/5406* (2015.01); *Y10T 16/540257* (2015.01)

(56) References Cited

U.S. PATENT DOCUMENTS

| | | | |
|---|---|---|---|
| 5,197,580 A | 3/1993 | Berman et al. | |
| 6,182,981 B1 * | 2/2001 | Kuo | A45C 5/14 190/18 A |
| 6,227,339 B1 * | 5/2001 | Bogert | A45C 5/06 190/107 |
| 6,443,274 B1 * | 9/2002 | Klamm | A45C 7/0077 190/107 |
| 6,604,617 B2 * | 8/2003 | Davis | A45C 5/02 190/107 |
| 6,926,129 B2 * | 8/2005 | Hoberman | A45C 13/385 190/107 |
| 7,232,018 B1 | 6/2007 | Salander | |
| 7,500,547 B2 | 3/2009 | Bettua et al. | |
| 2006/0118376 A1 * | 6/2006 | Godshaw | A01K 1/0254 190/107 |
| 2007/0038162 A1 * | 2/2007 | Alexiadis | A47C 9/025 601/5 |
| 2010/0300825 A1 * | 12/2010 | Nordstrom | A45C 7/0036 190/107 |

FOREIGN PATENT DOCUMENTS

| | | |
|---|---|---|
| WO | 02/052975 A1 | 7/2002 |
| WO | 2005/029997 A2 | 4/2005 |
| WO | 2008/021793 A2 | 2/2008 |
| WO | 2010/141207 A1 | 12/2010 |

\* cited by examiner (a)  (b)  (c)

(a)

(b)

(a)  (b)

(a)  (b)

(a)

(b)

(a)

(b)

(a)                    (b)

(a)             (b)

(a)                      (b)

(a)

(b)

(c)

(a)

(b)

(c)

(a)

(b)

(c)

(e)

(f)

(g)

(a)

(b)

(a)

(b)

(c)

SYSTEMS AND METHODS FOR COLLAPSIBLE LUGGAGE

CROSS REFERENCE TO RELATED APPLICATIONS

The present application claims the benefit of U.S. Provisional Patent Application Nos. 61/575,657, filed on Aug. 24, 2011, 61/634,553, filed on Mar. 2, 2012, 61/690,234, filed on Jun. 21, 2012, 61/690,197, filed on Jun. 21, 2012, and 61/690,233, filed on Jun. 21, 2012, each of which is hereby incorporated herein by reference.

TECHNICAL FIELD

The present invention relates to container technologies, and in particular to systems and methods for providing collapsible luggage that can (i) achieve significant compression of volume, and thus ease of portability, in a compressed state, yet can also (ii) maintain rigidity, provide structural support in an expanded state.

BACKGROUND OF THE INVENTION

In the modern world, especially in areas which are substantially populated, people live in relatively small apartments or even houses and have a limit on storage space. Often, when storing luggage, a large amount of space, for example in a basement storage room, or an entire closet is devoted to the task. This is because luggage doesn't readily stack on each other and does not have a uniform size; thus, luggage is generally stored in loose piles that are often unstable, not uniform, and frequently fall over, thus exacerbating the mess and volume required for storage. Additionally, in order to save space when transporting luggage, such as from a manufacturer in the Orient to an American distributor, luggage cannot readily be compressed so sets of luggage are attempted to be nested one within the other, biggest piece then medium piece then smallest piece which creates a lot of work on the receiving end to take them apart. Finally, when marketing luggage at the retail level, there is generally not enough store space to display all the various pieces that a particular store might have so they display two or three different sets and then the sales person has to go into the back room and bring out the luggage or the set of luggage when you actually purchase it.

All of these inconvenient aspects of owning, shipping and marketing luggage could be ameliorated if luggage could be compressed when not being used and such compressed state of the luggage could be in a uniform size.

What is needed in the art is a convenient and elegant method for compressing luggage that solves some of the problems described above.

SUMMARY OF THE INVENTION

In exemplary embodiments of the present invention, systems and methods for providing collapsible luggage are presented. Such exemplary collapsible luggage can have two states: (i) a fully extended state in which said luggage is used by a user to hold, for example, clothing and objects, and (ii) a compressed or folded state in which the luggage has a minimum volume and can be easily and conveniently stored, especially where space is a premium. Various novel technologies are used to obtain maximal compression in the compressed state, provide rigidity and structural support in the fully extended state, and to allow for convenient transformation between the two states. One of such technologies is a self-locking hinge mechanism requiring no direct contact from a user, which also provides audible feedback to the user.

DETAILED DESCRIPTION OF THE INVENTION

In exemplary embodiments of the present invention, systems and methods for collapsible luggage are presented. Such exemplary collapsible luggage can have two states, a fully extended state in which said luggage is used by a user to hold, for example, clothing and objects, and a compressed or folded state in which the luggage has a minimum volume and can be easily and conveniently stored, especially where space is a premium. In the fully extended state, the exemplary luggage can, for example, have as much structural support as conventional luggage, and thus can support other items on top of its top panel, as is commonly done by travelers. Various novel technologies are used to obtain maximal compression in the compressed state, provide rigidity and structural support in the fully extended state, and to allow for convenient transformation between the two states.

In general, the compression or collapsibility of luggage in exemplary embodiments of the claimed invention can be achieved by (i) disconnecting and rotating upwards a bottom structural panel; and (ii) allowing a larger front portion of the bottom plate of the article of luggage to fold upwards to an approximately vertical plane, a smaller portion remaining in its original horizontal configuration. To this, optionally, can be added: (iii) moving structural elements out of the side panels to collapsible side "wings"; and (iv) allowing a front portion of the top panel to fold downward. Various details of exemplary embodiments and various alternate elements and methods for implementing these features are next described.

Figure 1:
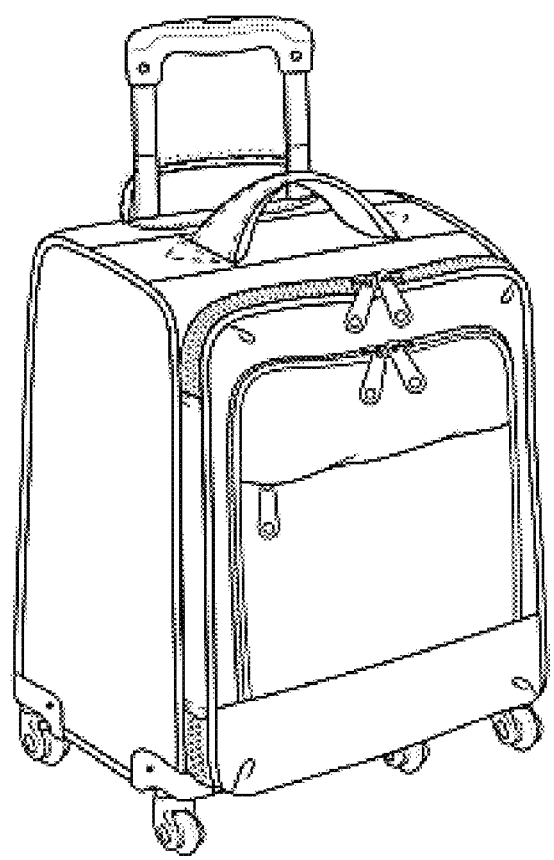
FIG. 1 illustrates an exemplary article of collapsible luggage in an expanded configuration according to an exemplary embodiment of the present invention.

FIG. 1 is a drawing of an exemplary article of collapsible luggage in a fully-expanded state according to an exemplary embodiment of the present invention. It functions in this state as conventional luggage does.

Figure 2:
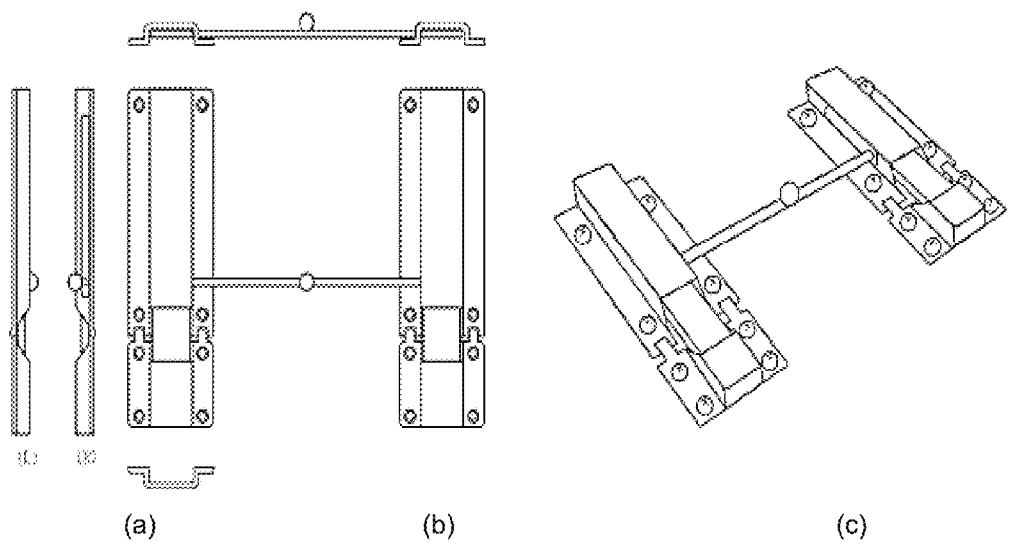
FIG. 2 depict details of an exemplary locking system for an exemplary luggage bottom panel according to an exemplary embodiment of the present invention.

FIG. 2 depict an exemplary hinge-locking mechanism that can, for example, be used in a bottom plate of exemplary collapsible luggage according to an exemplary embodiment of the present invention. Thus, in an expanded state, the two portions of the foldable bottom panel can be made into one rigid plane by setting the locking mechanism in a locked position. The exemplary mechanism can comprise two bars that can slide in and out of two receiving members. The bars, can, for example, be connected by a crossbar, such that they move in tandem. The receiving members can be provided on the rear portion of the bottom panel that does not fold, and thus they can remain stationary. The mechanism can be provided with a handle, that a user can push to simultaneously lock or unlock the dual bars into or from the receiving members. Alternatively, three or more vertical bars, with corresponding receiving members, can be used. By affixing this locking mechanism across the junction between the two portions of the bottom panel, the bottom panel can be locked into place in the expanded configuration of the luggage. FIGS. 51-56, described below, provide close up shots of an exemplary prototype of such a hinge-locking mechanism.

Figure 3:
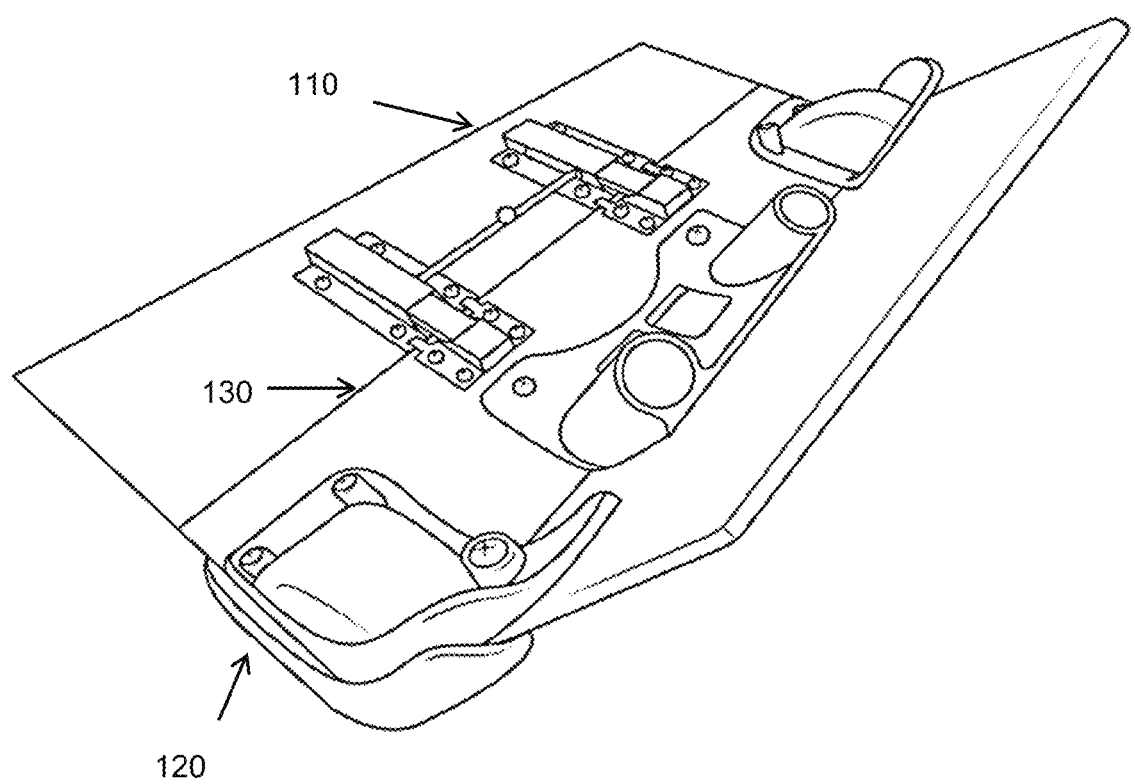
FIG. 3 depicts a perspective view of the exemplary locking system of FIG. 2 as installed in an exemplary hinged bottom panel according to an exemplary two-wheel embodiment of the present invention.

FIG. 3 depicts a bottom portion of an exemplary two-wheel suitcase in the fully-extended position with the hinge-locking mechanism 130 of FIG. 2 fully engaged in the lock position. Also shown are front portion 110 and rear portion 120, of the bottom portion. Thus, the only wheels shown are the rear wheels, and those remain in the rear portion 120 of the bottom panel that does not fold upwards. The rear portion 120 can also contain, for example, a receiving base for a two pipe telescoping handle. In the depicted expanded and locked configuration the two hinged portions of the bottom portion (110, 120) act as a single rigid planar panel.

Figure 4:
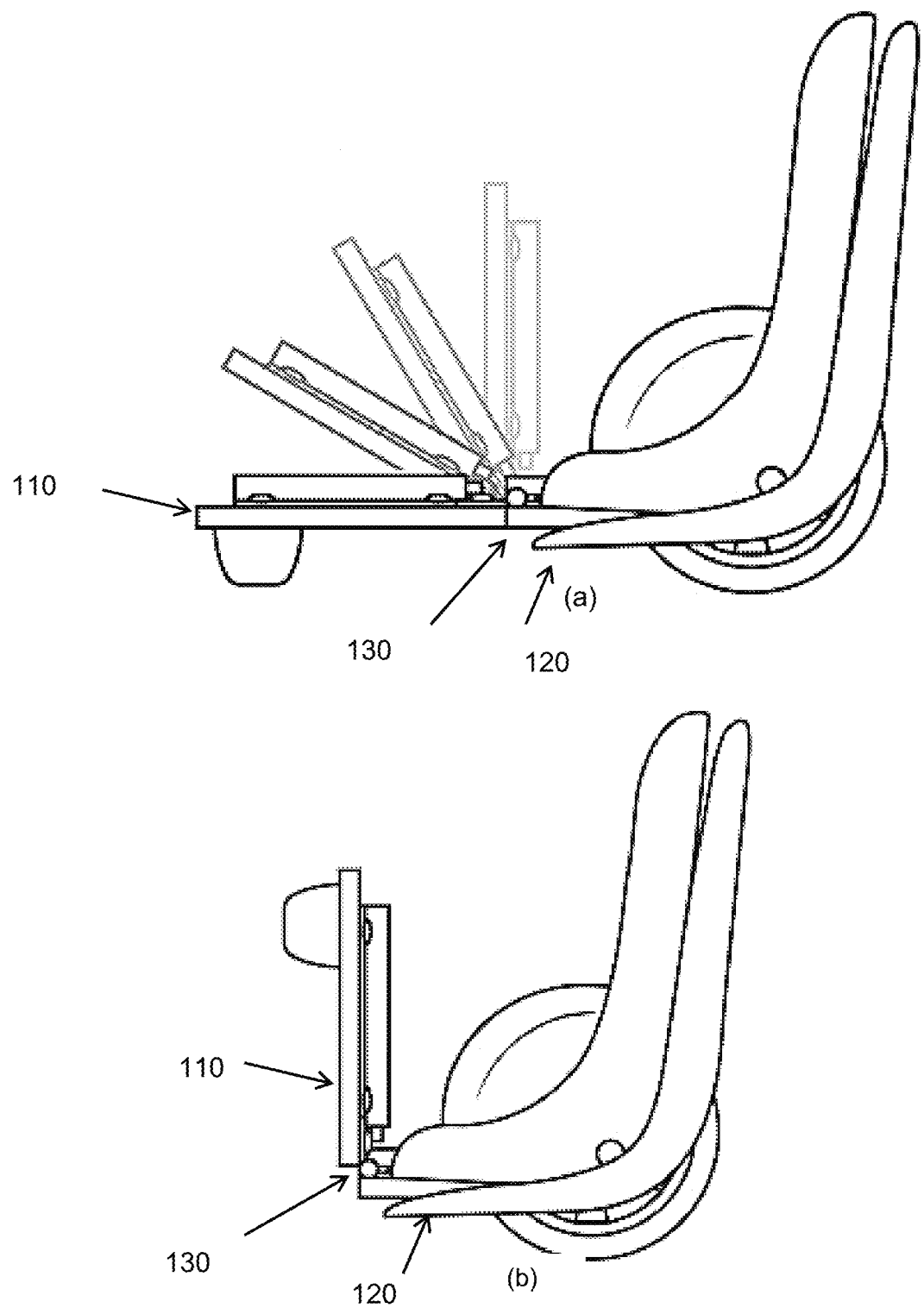
FIG. 4 depict a side view of an exemplary bottom panel in extended (upper panel) and folded (bottom panel) configuration according to an exemplary two-wheel embodiment of the present invention.

FIG. 4(a) illustrates a side view of the exemplary piece of luggage of FIG. 3 with the front portion 110 of the bottom panel in various stages of being folded upwards to collapse the luggage, ending in the configuration shown in FIG. 4(b). As can be seen in FIG. 4(b), the final depth of the bottom panel—and thus of the entire piece of luggage in the collapsed state—is the depth of the non-folding rear portion 120 of the bottom panel, plus the protrusion due to the stops or "feet" at the front portion 110 of the bottom panel, which, in the folded configuration are now at the top of said vertical portion of the bottom panel. It is noted that the remaining portions of the luggage, including any side supports and folded top panel, will all fit within this depth in the collapsed configuration. This depth is thus the volume compression limiting factor.

Figure 5:
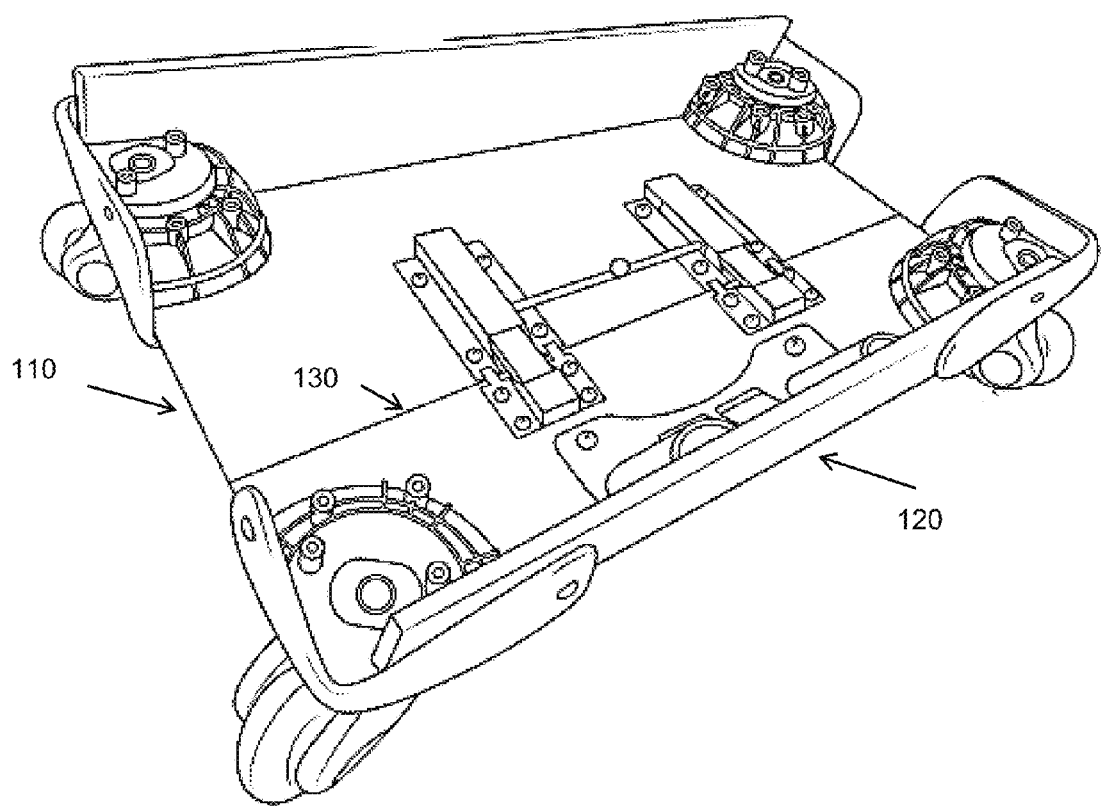
FIG. 5 depicts a perspective view of the exemplary locking system of FIG. 3 as installed in an exemplary hinged bottom panel according to an exemplary four-wheel embodiment of the present invention.
Figure 6:
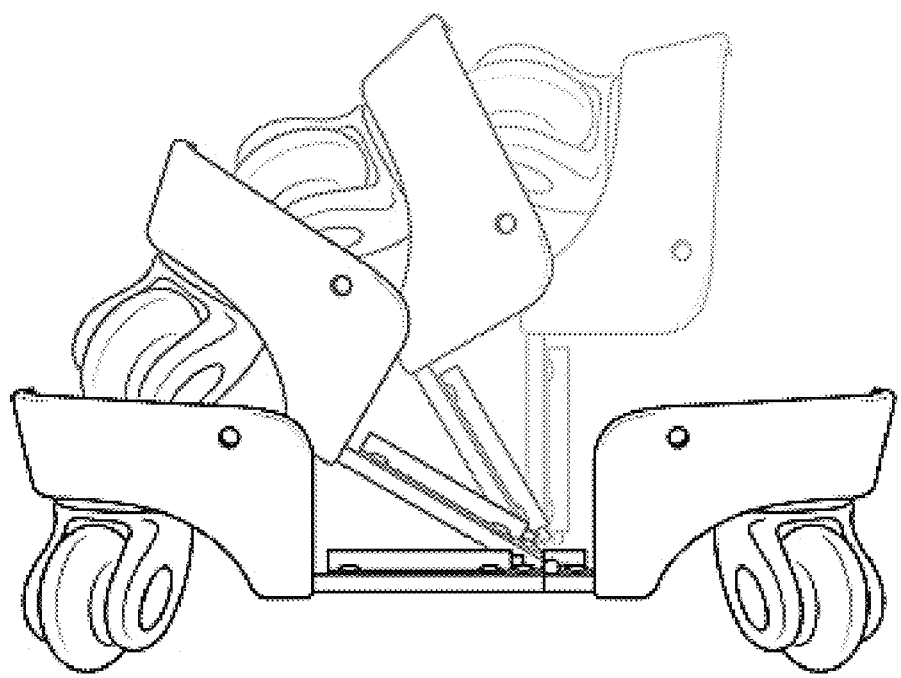
FIG. 6 depicts a side view of the exemplary bottom panel of FIG. 5 in an extended configuration and FIG. 7 depicts it in a folded configuration.
Figure 7:
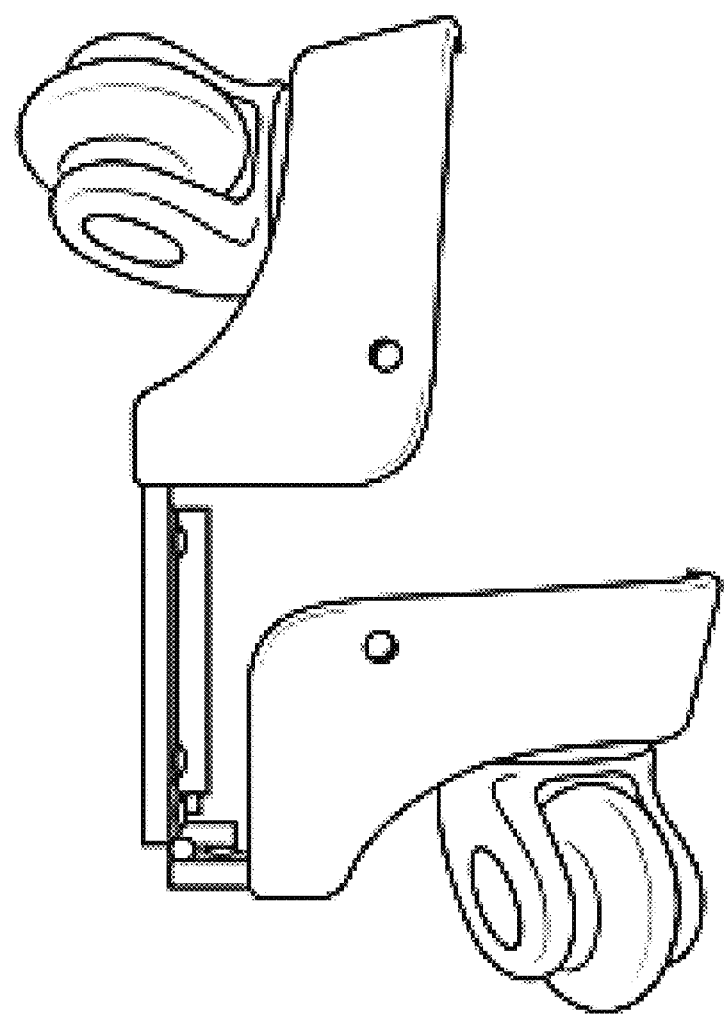

FIG. 5 depicts a bottom plate of an exemplary piece of luggage similar to that of FIG. 3, except here having four wheels according to an exemplary embodiment of the present invention. FIG. 6 depicts the exemplary piece of luggage shown in FIG. 5 being compressed in various stages, and FIG. 7 shows it in its final fully-compressed state. Here the final depth of the bottom panel—and thus of the entire piece of luggage in the collapsed state—is the depth of the non-folding rear portion 120 of the bottom panel, plus the protrusion due to the front wheels at the front portion 110 of the bottom panel, which, in the folded configuration of FIG. 7 are now at the top of said vertical portion of the bottom panel. By recessing somewhat the wheels, as shown, this protrusion can be minimized. In alternate exemplary embodiments, the wheels can be rotated, for example, in the fashion of an airplane's landing gear, so as to have a "collapsed" configuration where the wheel axle is essentially parallel to the bottom plate, thus further shrinking the depth, or for example, can be wholly turned inside out.

As can be readily appreciated, in various exemplary embodiments of the present invention, various alternate hinge and locking mechanisms 130 for the bottom plate of an exemplary article of luggage can be used. A number of examples of such possible variations are next described.

Figure 8:
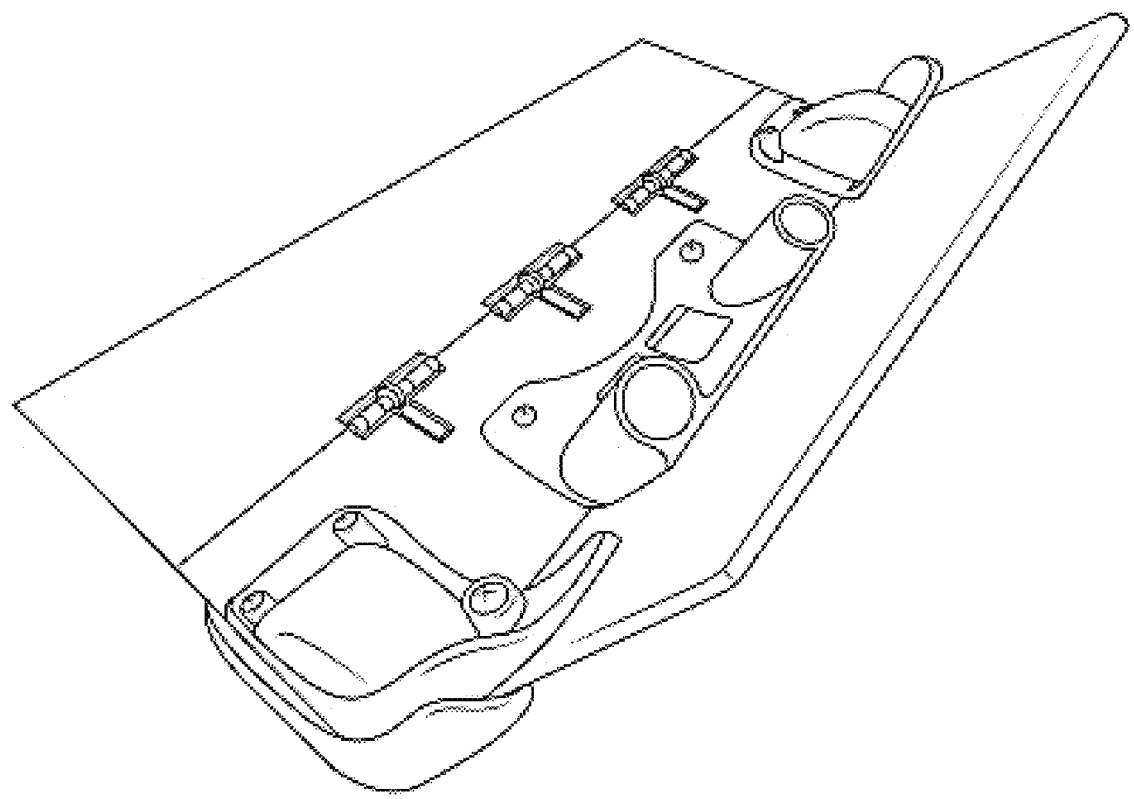
FIG. 8 depicts a perspective view of an alternate, spring loaded self-locking hinge system for an exemplary luggage bottom panel according to an exemplary embodiment of the present invention.
Figure 9:
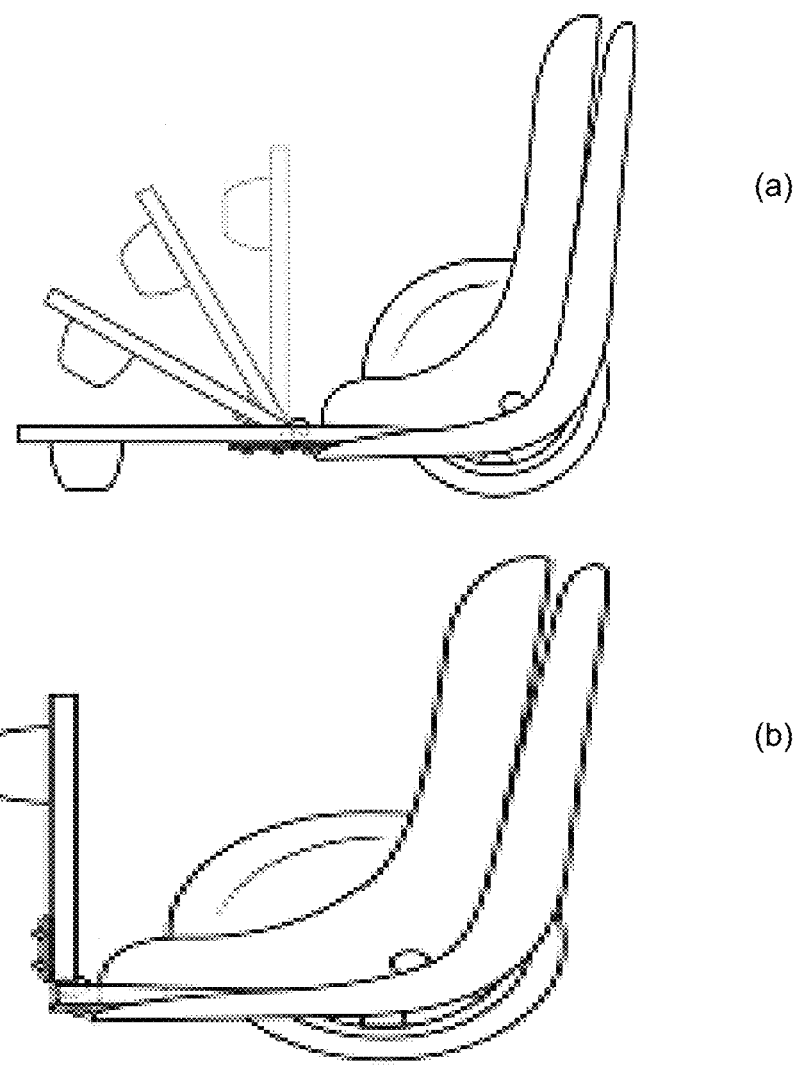
FIG. 9 depict a side view of the exemplary bottom panel of FIG. 8 in an extended (left panel) and folded (right panel) configuration according to an exemplary two-wheel embodiment of the present invention.

FIG. 8 depicts an exemplary piece of luggage with a novel barrel type self-locking hinge device according to an exemplary embodiment of the present invention. This is an alternative to the hinge mechanism shown in FIGS. 2 and 5. FIG. 9(a) shows the exemplary bottom plate of FIG. 8 as implemented in a two-wheel embodiment in various stages of compression, and FIG. 9(b) shows it in a fully-compressed state.

Figure 10:
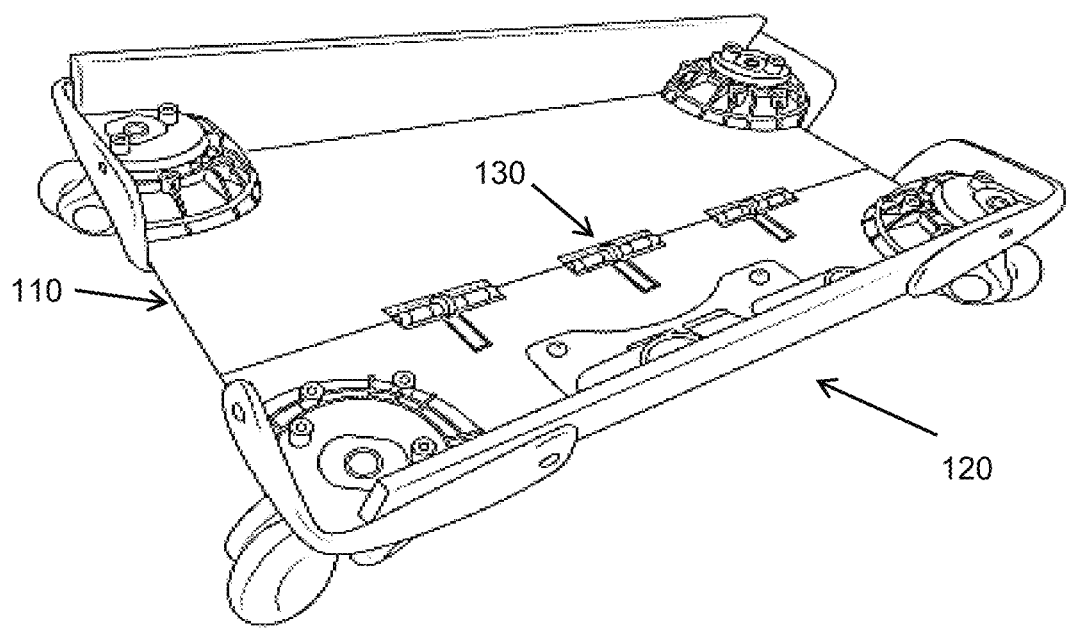
FIG. 10 depicts a perspective view of the exemplary spring loaded self-locking hinge system of FIG. 8 as installed in an exemplary hinged bottom panel according to an exemplary four-wheel embodiment of the present invention.
Figure 11:
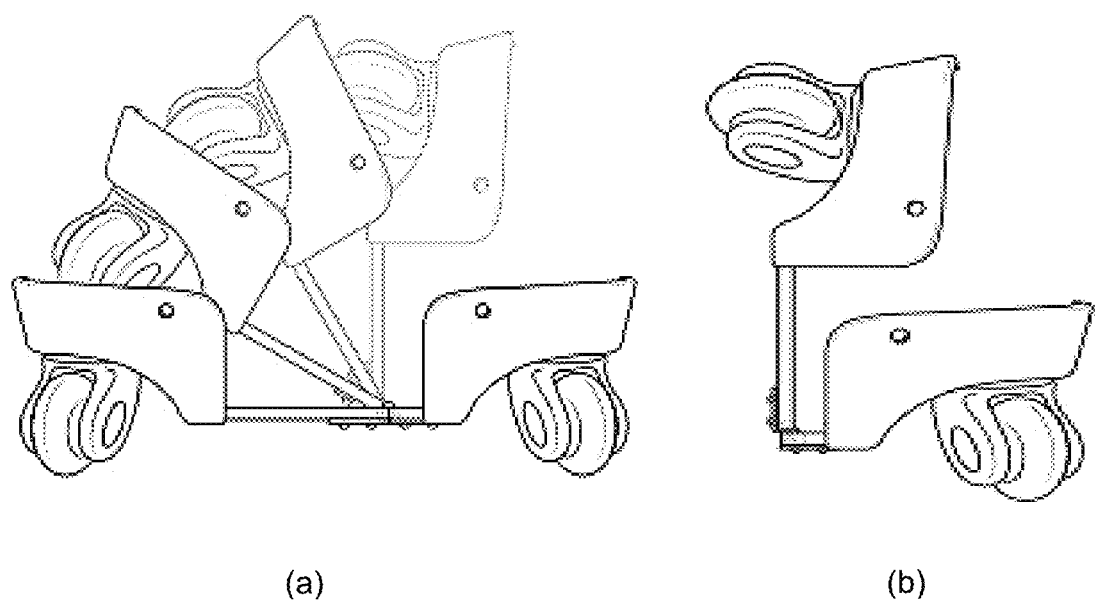
FIG. 11 depict a side view of the exemplary bottom panel of FIG. 10 in an extended (right panel) and folded (left panel) configuration according to an exemplary four-wheel embodiment of the present invention.
Figure 12:
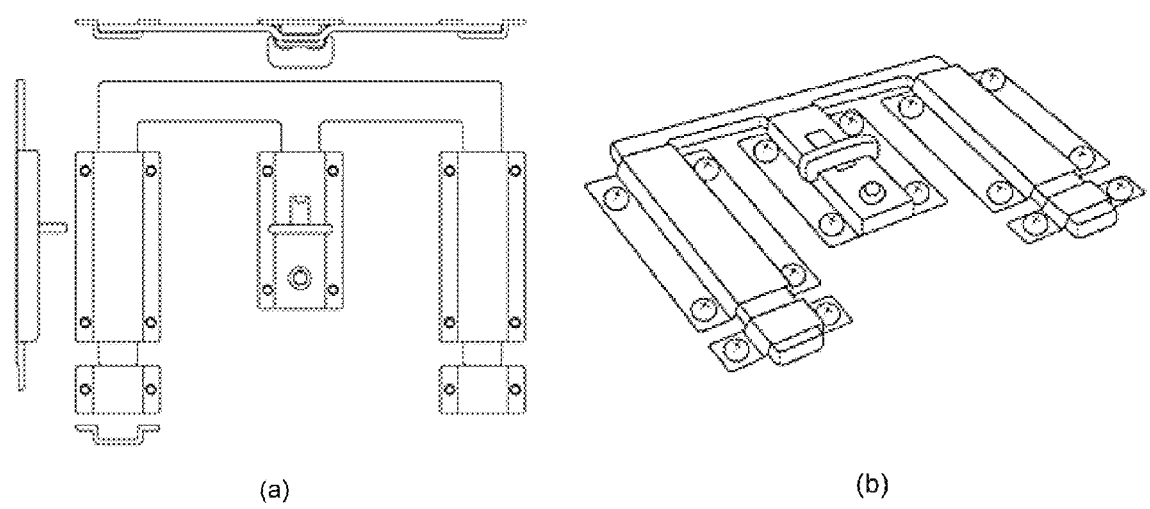
FIG. 12 depict exemplary top and perspective views of an exemplary luggage bottom panel alternate locking system according to an exemplary embodiment of the present invention.
Figure 13:
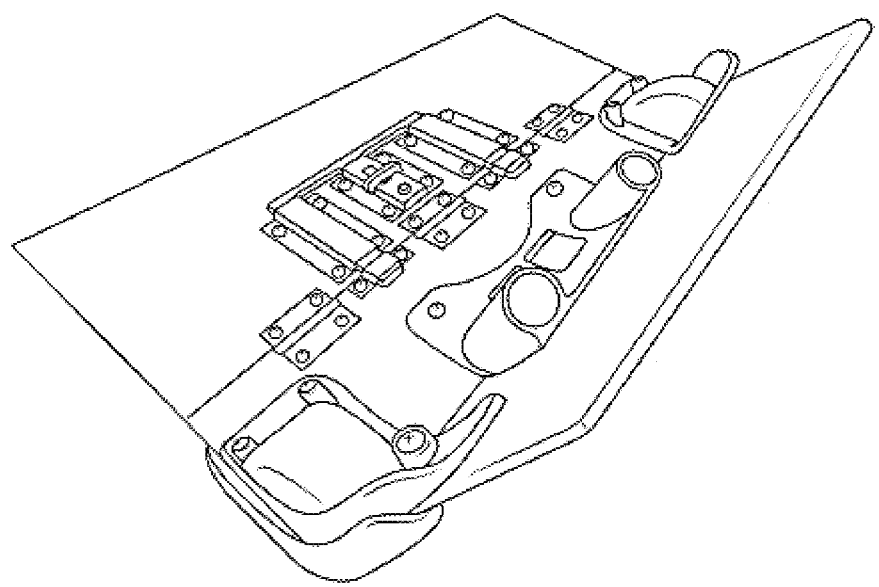
FIG. 13 depicts a perspective view of the exemplary locking system of FIG. 12 as installed in an exemplary hinged bottom panel according to an exemplary two-wheel embodiment of the present invention.

FIG. 10 depicts an exemplary bottom plate such as shown in FIG. 8, here in an exemplary four wheel embodiment of the present invention. Similarly, FIG. 11(a) shows the exemplary bottom plate of FIG. 10 in various stages of compression and FIG. 11(b) shows it in a fully-compressed and locked state according to exemplary embodiments of the present invention. As described in detail below, this exemplary hinge mechanism 130 locks in place in the 90° position, indicating that the front portion 11j of the bottom plate of the article of luggage is fully vertical, and fully compressed. Returning now to alternate exemplary hinge-locking mechanisms. FIG. 12 depict an alternate form of hinge-locking mechanism according to an exemplary embodiment of the present invention; a spring loaded version of that of FIG. 5. Here a user need only press the shown actuator or button, for example, and a compressed spring pushes open or closed Me vertical bars (depending upon how the spring is oriented), thus allowing a user to collapse or expand the luggage. FIG. 13 depicts an exemplary bottom plate of an exemplary piece of luggage according to exemplary embodiments of the present invention, utilizing the spring loaded locking mechanism of FIG. 12, shown in the locked position, corresponding to the fully opened state of the luggage.

Figure 14:
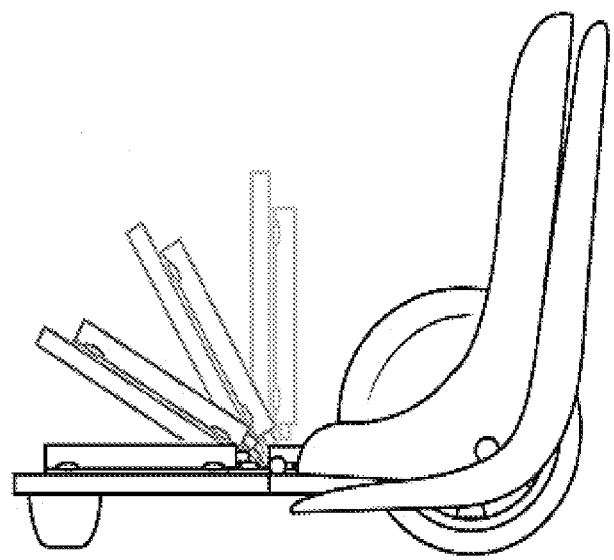
FIG. 14 depict side views of the exemplary bottom panel of FIGS. 12-13 in an extended (left panel) and folded (right panel) configuration according to an exemplary two-wheel embodiment of the present invention.
Figure 14:
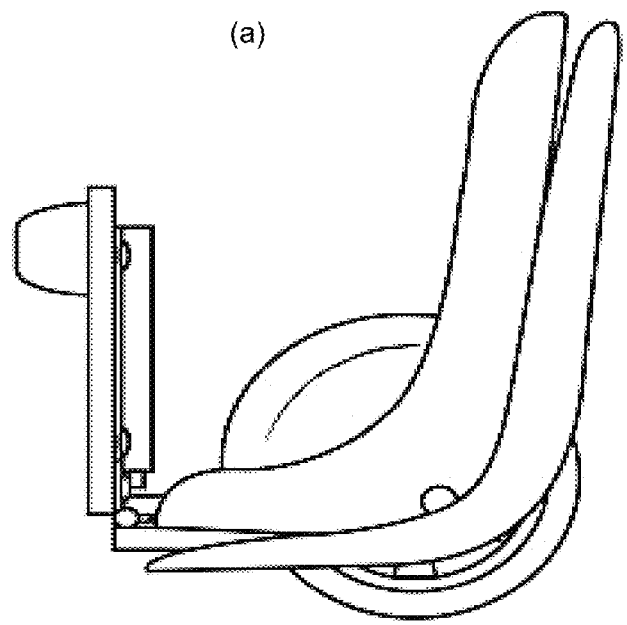
Figure 15:
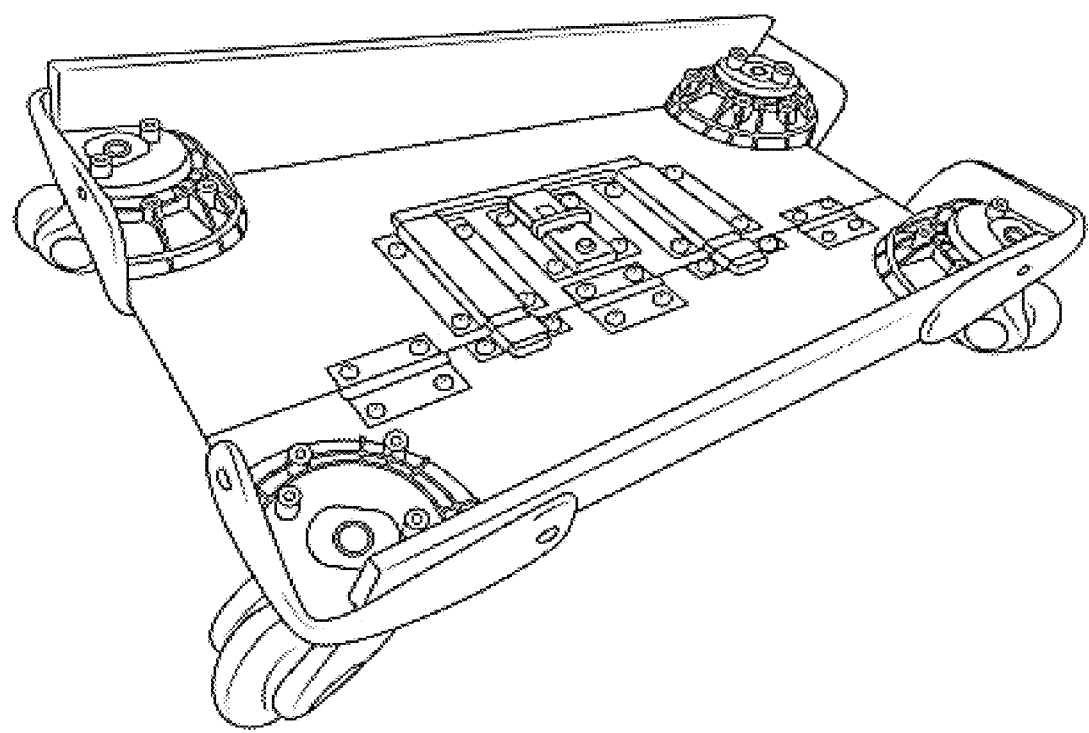
FIG. 15 depicts a perspective view of the exemplary locking system of FIG. 12 as installed in an exemplary hinged bottom panel according to an exemplary four-wheel embodiment of the present invention.

FIG. 14 depict an exemplary piece of luggage with two wheels using the locking mechanism of FIGS. 12 and 13 in various stages of compression (left panel) and as fully-compressed (right panel) according to exemplary embodiments of the present invention, and FIG. 15 shows an exemplary bottom plate of an exemplary piece of luggage according to exemplary embodiments of the present invention using the exemplary locking mechanism of FIG. 12 but here with four wheels.

Figure 16:
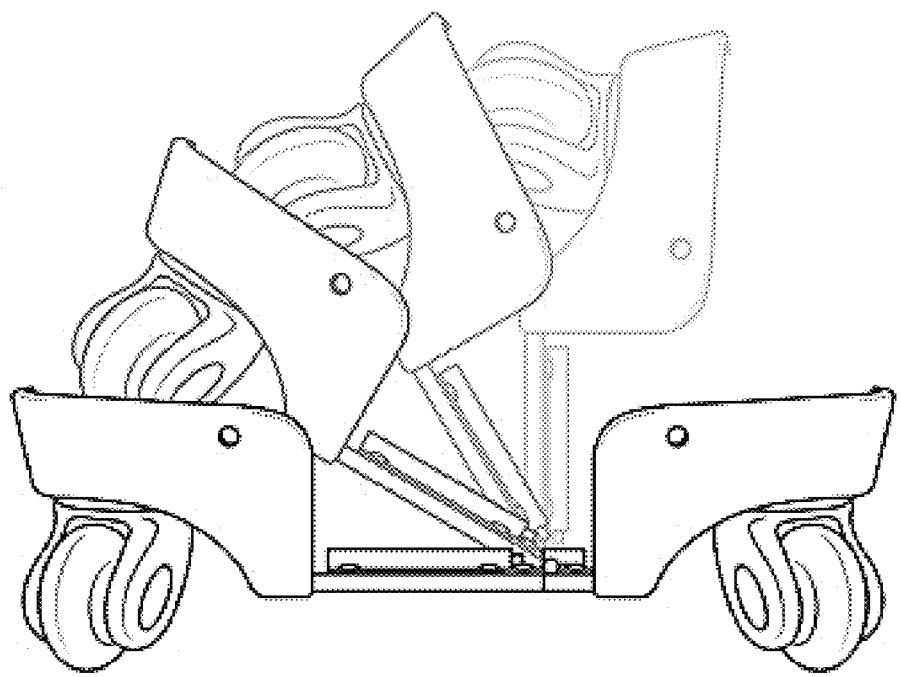
FIG. 16 depicts a side view of the exemplary bottom panel of FIGS. 14-15 in an extended configuration and various interim positions as it is folded according to an exemplary four-wheel embodiment of the present invention.

FIG. 16 show the exemplary bottom plate of FIG. 15 in various stages of compression (left panel) and in its fully-compressed state (right panel) according to exemplary embodiments of the present invention.

Figure 17:
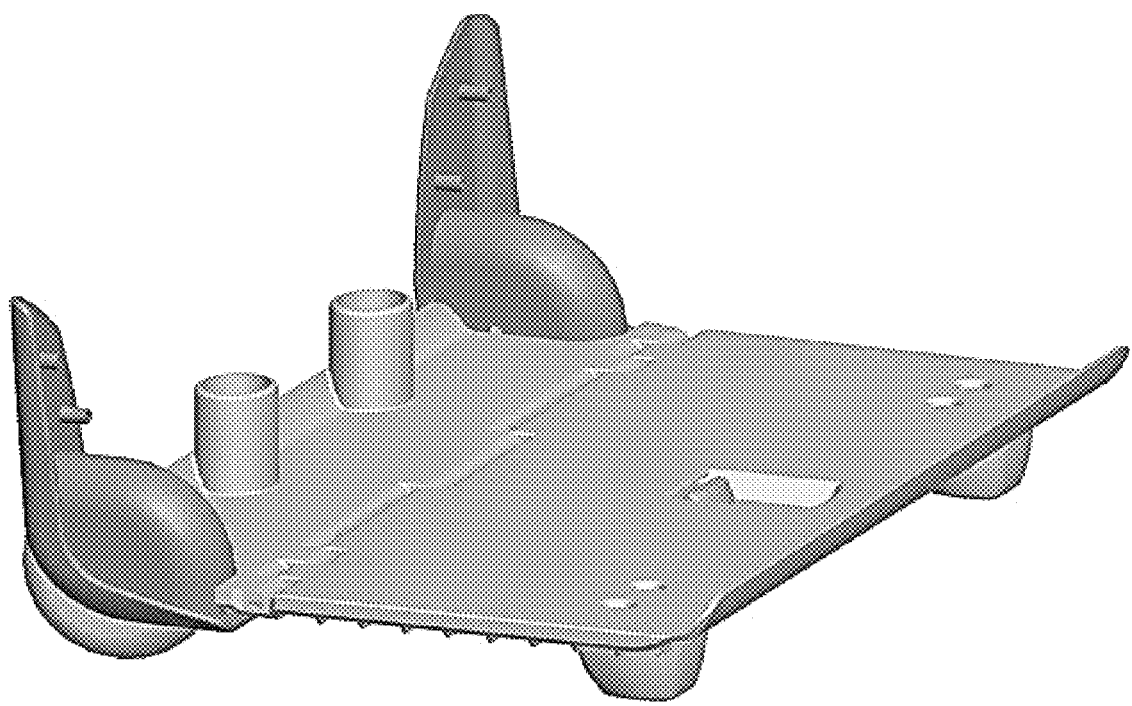
FIG. 17 depicts a perspective view of an exemplary injection molded bottom panel using an exemplary hinge-less locking system in an extended configuration according to an exemplary two-wheel embodiment of the present invention.
Figure 18:
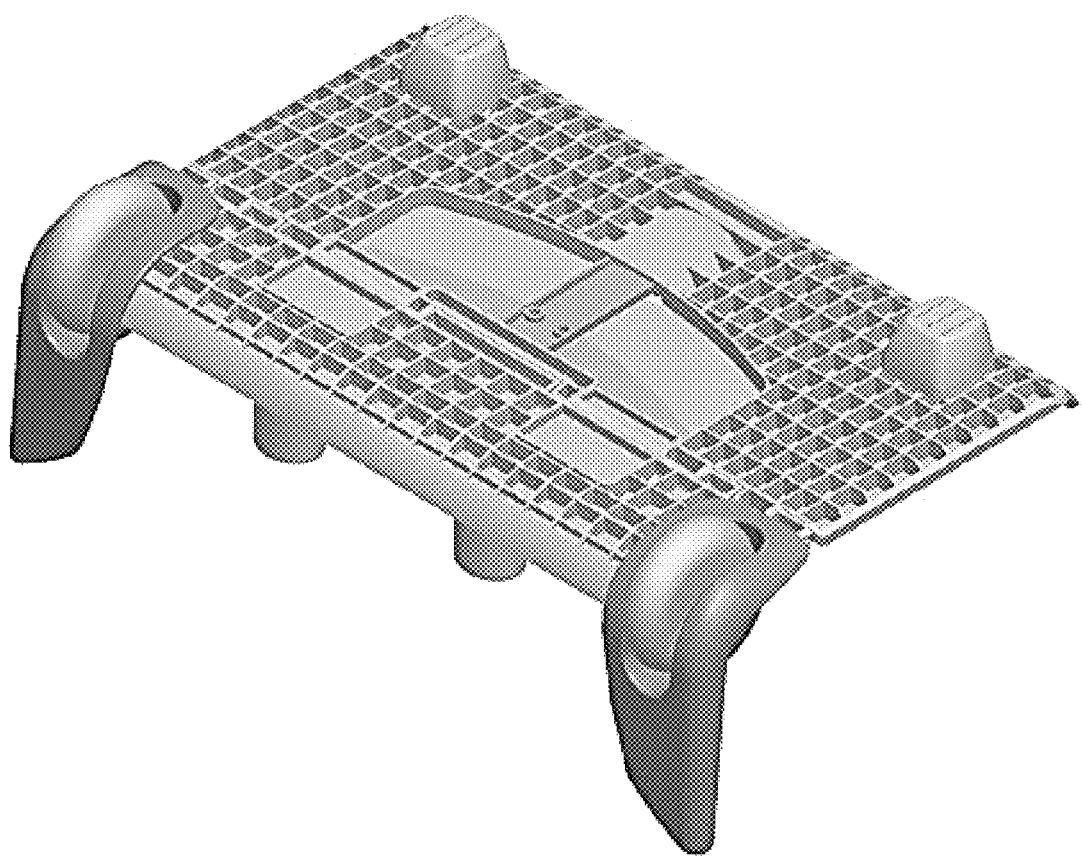
FIG. 18 depicts an underside view of the exemplary injection molded bottom panel of FIG. 17.

FIG. 17 depicts yet another alternate form of facilitating the compression or folding of the bottom panels according to exemplary embodiments of the present invention. In the exemplary system of FIG. 17, there are no hinges needed to be affixed to portions of the bottom plate of the exemplary piece of luggage. Rather, the bottom plate is composed of two interlocking plastic pieces, where such interlocking (e.g., via small protrusions of one of the portions fitting into matched receiving openings in the other) allows them to swivel relative to each other and, therefore, achieve the compression. A similar configuration could be used with a central axle around which the two portions of the bottom plate swivel. As can be seen in FIG. 17, on the right center of the front piece, and as can also be in FIG. 18 on the bottom, there is a red tab that can be pushed inwards/outwards so as to lock/unlock the two plastic pieces together. As can be seen in FIG. 17 and FIG. 18, the depicted piece of luggage is a two-wheel version and, therefore, the lighter turquoise colored front plate swivels up to achieve the compression, and the blue-violet colored back plate, to which the two wheels are affixed, and to which are affixed the plastic holders for the extendable handle, can remain in its original position even when the piece of luggage is collapsed or compressed.

Figure 19:
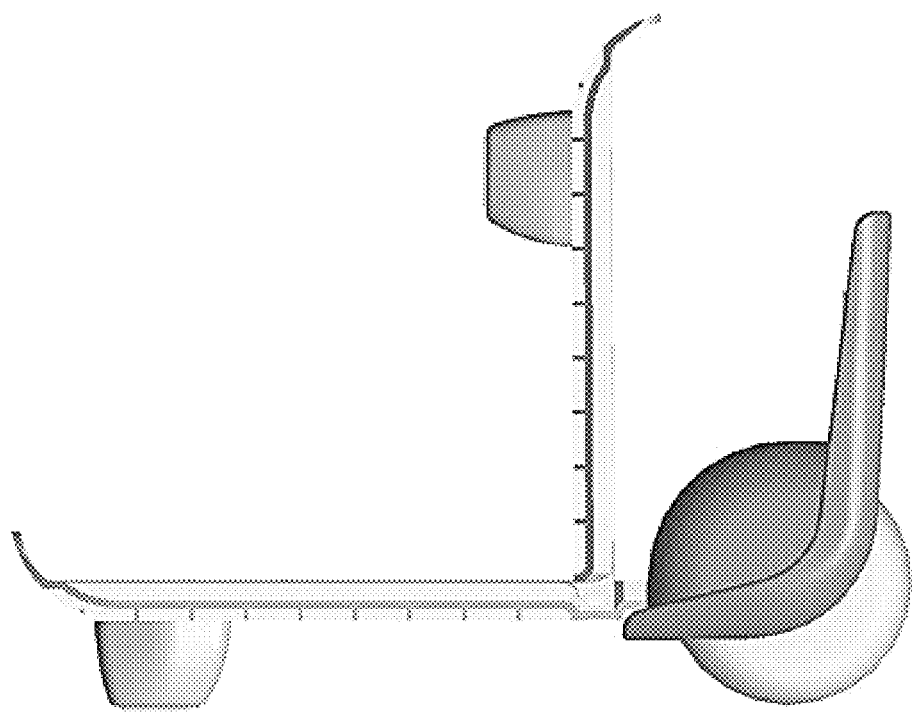
FIG. 19 depicts a side view of the exemplary bottom panel of FIGS. 17-18 with the front section in each of an extended and folded configuration according to an exemplary embodiment of the present invention.
Figure 20:
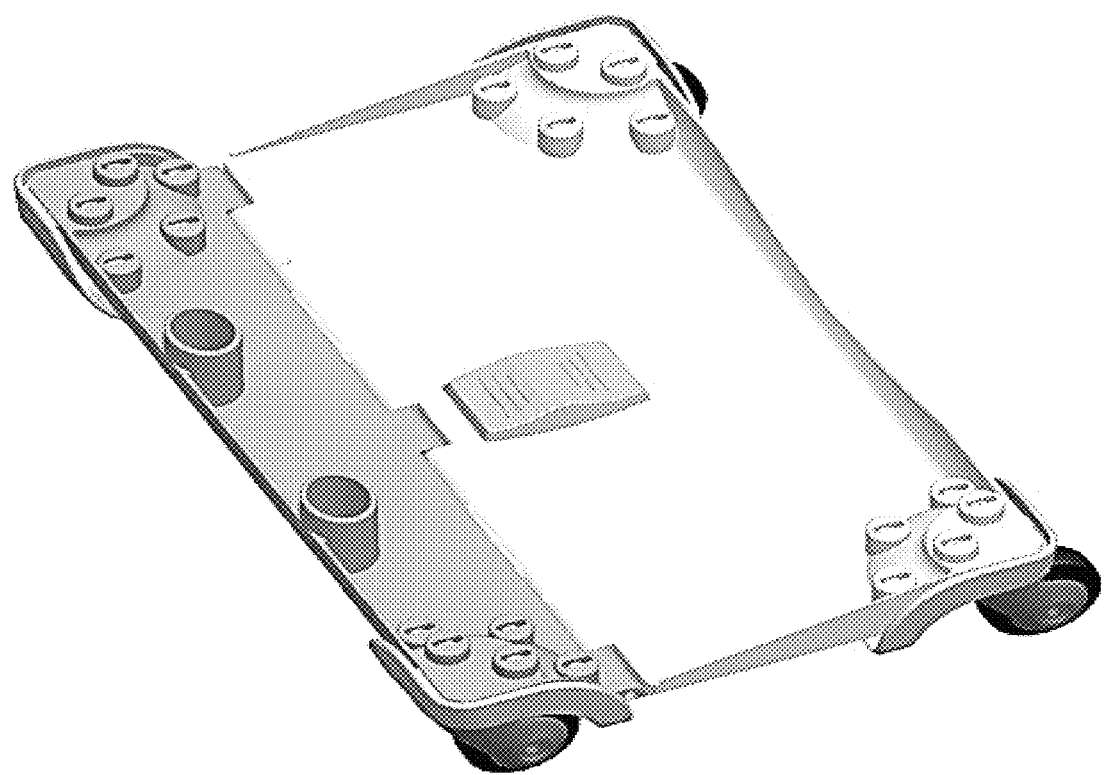
FIG. 20 depicts a top view of an exemplary injection molded bottom panel according to a four wheel embodiment of the present invention.

FIG. 19 shows the exemplary alternate "interlocking plastic" mechanism in various stages of compression ending with a full right angle between the back portion and the front portion of the exemplary bottom plate. FIG. 20 is a variation on the exemplary embodiment of FIGS. 17 through 19, where the button actuator is placed much closer to the axis of rotation of the two interlocking pieces. Additionally, the embodiment of FIGS. 20 through 22 has four wheels and, therefore the front plate (bone colored) has two wheels affixed to it as well. FIG. 22 depicts the exemplary four-wheeled version of FIGS. 20 and 21 in various stages of compression ending in a full right angle between the front plate and the back plate.

Figure 23:
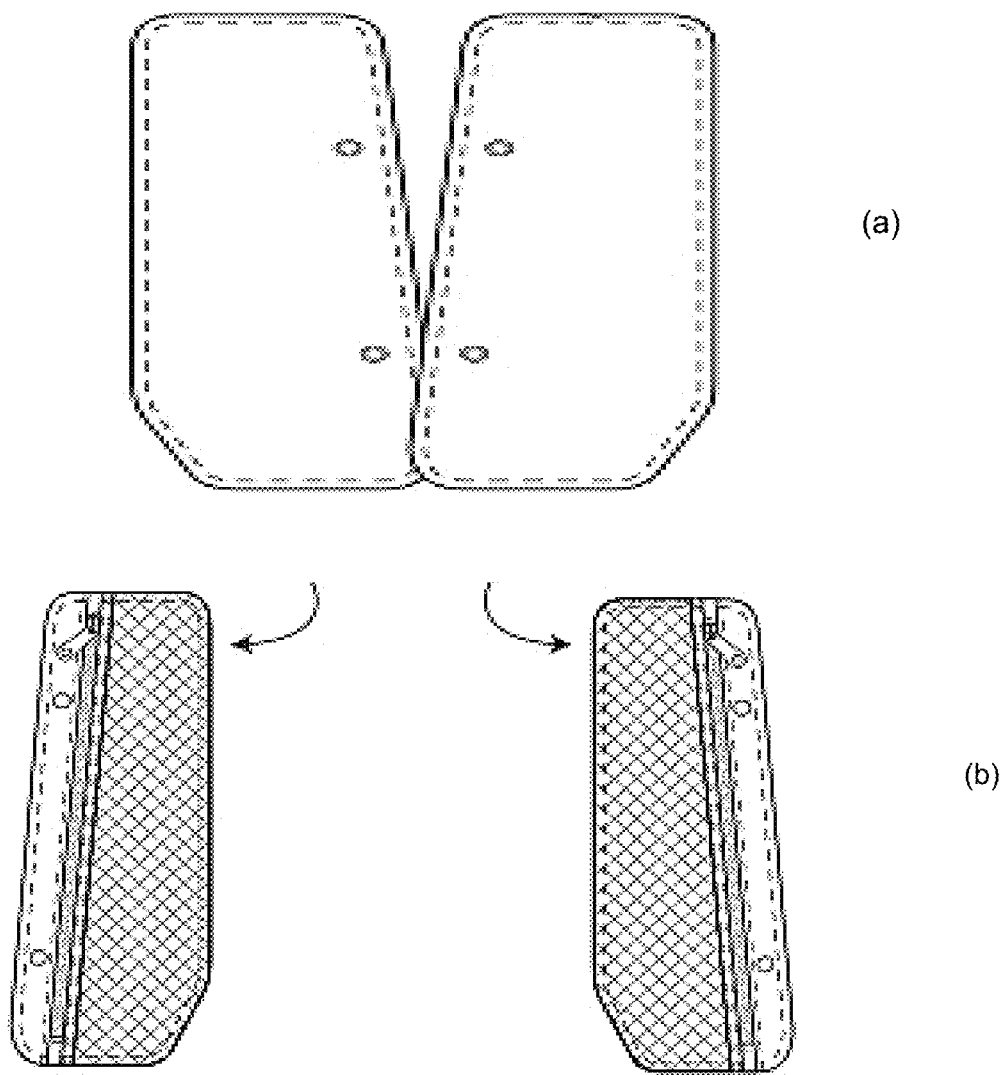
FIG. 23 depict exemplary foldable structural side panels in a folded (planar) configuration (left panel) and an extended (vertical) configuration (right panel) according to an exemplary embodiment of the present invention.

FIG. 23 depict exemplary wings in a compressed (left panel) and uncompressed (right panel) state according to exemplary embodiments of the present invention. As noted, in exemplary embodiments of the present invention, although significant compression of the volume of luggage can be achieved, in the fully open or uncompressed state exemplary articles of luggage can provide just as much support as standard non-compressible luggage does. In exemplary embodiments of the present invention, this can be achieved by using an ingenious innovation. The structure or framing found in conventional luggage can be removed from the actual outer periphery of the luggage and into wings which can be swiveled relative to the back panel and the side panels of the luggage so as to be compressed or opened as the case may be. FIG. 23 therefore, show two wings which can, for example, form the structural side panels of the luggage in its uncompressed state and when the luggage is not in use can be folded to be essentially parallel to the back panel of the luggage so as to be compressible. The exemplary side panels can be attached to the back edge of the interior of the luggage sides (or, alternately, the edges of the interior of the back surface), for example, and they can be formed of a fabric or material lined with a sewn in wire, carbon fiber or the like frame around the periphery of such side panels, as shown by the dotted line in FIG. 23. When fully extended, as in the right panel of FIG. 23, they can be attached to the front inner portion of the right and left sides of the luggage by any attachment mechanism, such as, for example, snaps, buttons, magnets, Velcro, zippers, overflap and snap, button, etc, as may be appropriate to a given design.

Figure 24:
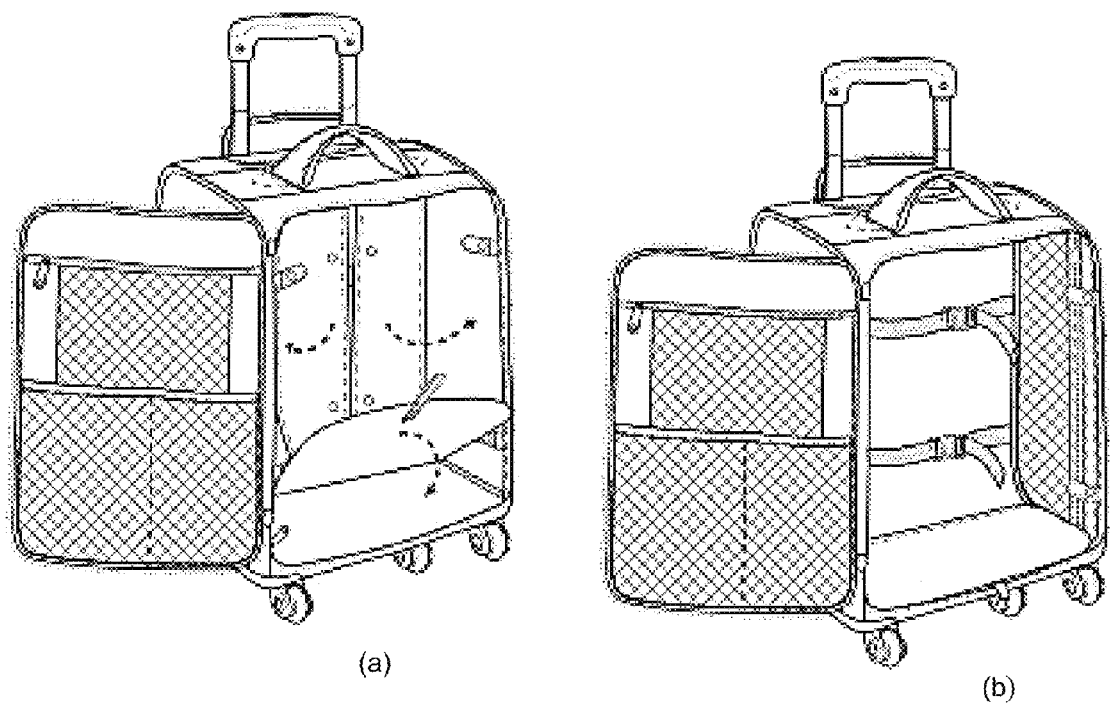
FIG. 24 depict an exemplary piece of luggage with the exemplary structural side panels of FIG. 23 and an exemplary structural base panel in folded and unfolded configurations according to an exemplary embodiment of the present invention.

In addition to side panels which provide structural support, there can, for example, additionally be provided an extendable bottom cover which can cover the exemplary hinged bottom panel described above when the luggage is in an uncompressed state. As can be seen with reference to FIG. 24, in the left panel is an exemplary piece of luggage being fully uncompressed. The way that this occurs is that the two side panels can be, for example, swiveled about their vertical axes at the sides of the rear face of the luggage, as shown by the arrows, so that they can connect with the side panels of the exemplary piece of luggage. Additionally, the bottom cover can be, for example, swiveled from its upright vertical state to its downward horizontal state covering the hinged bottom panel and providing support for the contents when the luggage is used, such as, for example, when rolled around on the four. The right panel of FIG. 24, therefore, shows both side panels attached to the side panels of the luggage and the bottom panel in its fully open horizontal configuration conveniently sliding into the bottom panel of the luggage. As can be seen therein, the underside of the side panel wings, i.e., that portion visible in the interior when the luggage is fully extended, can be provided with pockets, zippered pockets, accessory holders, and the like, as the case may be, for users to put the standard set of small items in the periphery of their suitcase. Additionally, FIG. 24 shows pullover snaps to hold the side wings in place, where there is a pullover piece of cloth or other material that remains attached to the side panel of the luggage and when the side wing is fully uncompressed the pullover tab is snapped or otherwise affixed such as, for example, using magnets or buttons, to the wing holding it in place.

FIG. 25 once again show the wings in a compressed and uncompressed state. It is noted that the left panel of FIG. 25 intends to show the wings in perspective; in this configuration in reality they would not be in the plane of the page but rather protruding vertically from it, coming out of the page so as to be perpendicular to the back plane of the luggage as in the right panel of FIG. 24. The particular embodiment depicted in FIG. 25 uses magnets sown into the edges of the side panels or wings and they can be mated with ferromagnetic metal also sown into the side panels of the luggage so that when you uncompress the luggage, and you rotate the side panels to their vertical final position, the magnets can clasp onto mating portions of the side panels of the luggage and are held in place thereby. As noted, alternatively, any reasonable affixation mechanism is fine, including, for example, snaps, buttons, clasps, Velcro™, pull over with any of those, etc.

Figure 25:
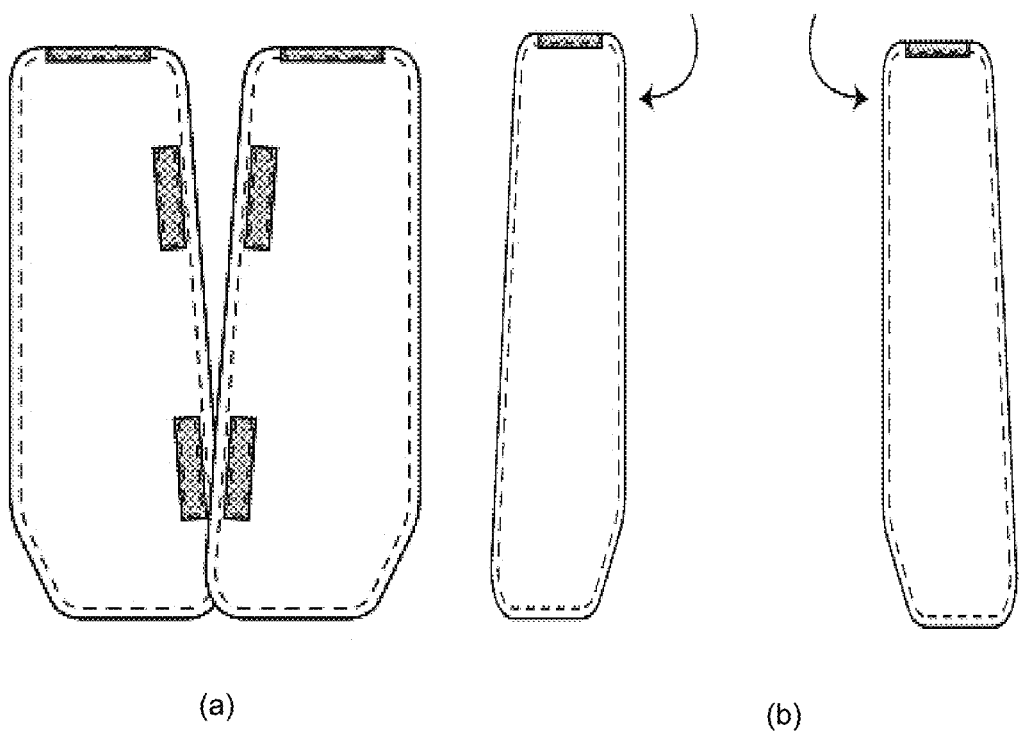
FIG. 25 depict exemplary side panels with velcro/magnetic attachment bands, in folded (left panel) and extended (right panel) configurations according to an exemplary embodiment of the present invention.
Figure 26:
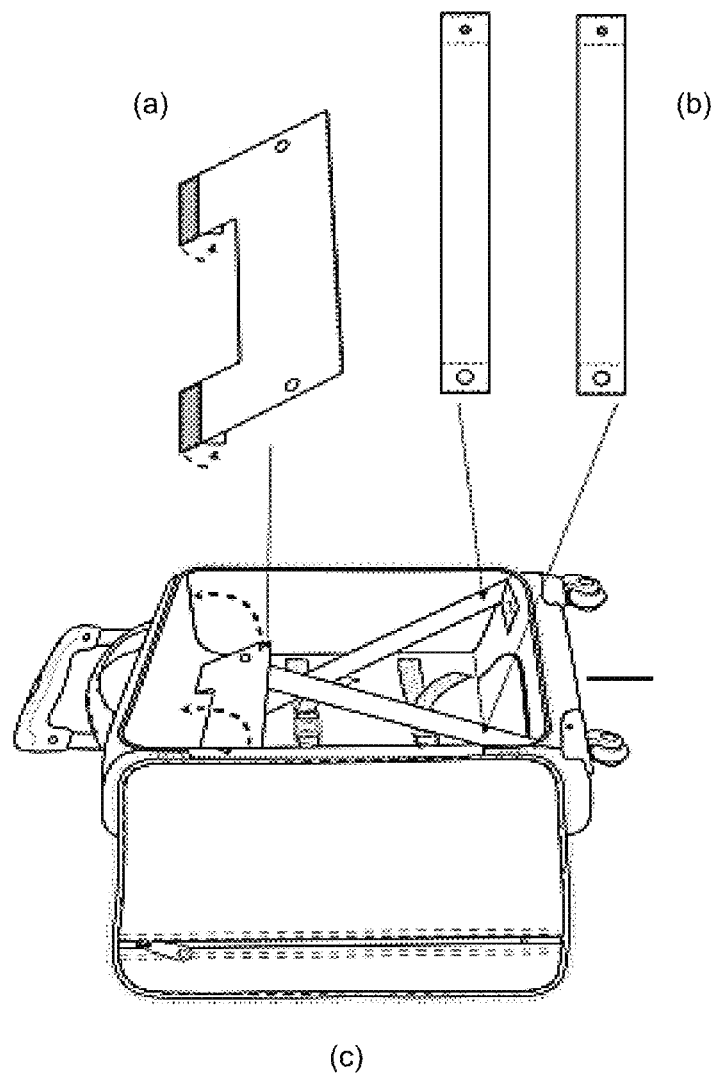
FIG. 26 depict exemplary collapsible structural top panel and sidebars according to an exemplary embodiment of the present invention.
Figure 27:
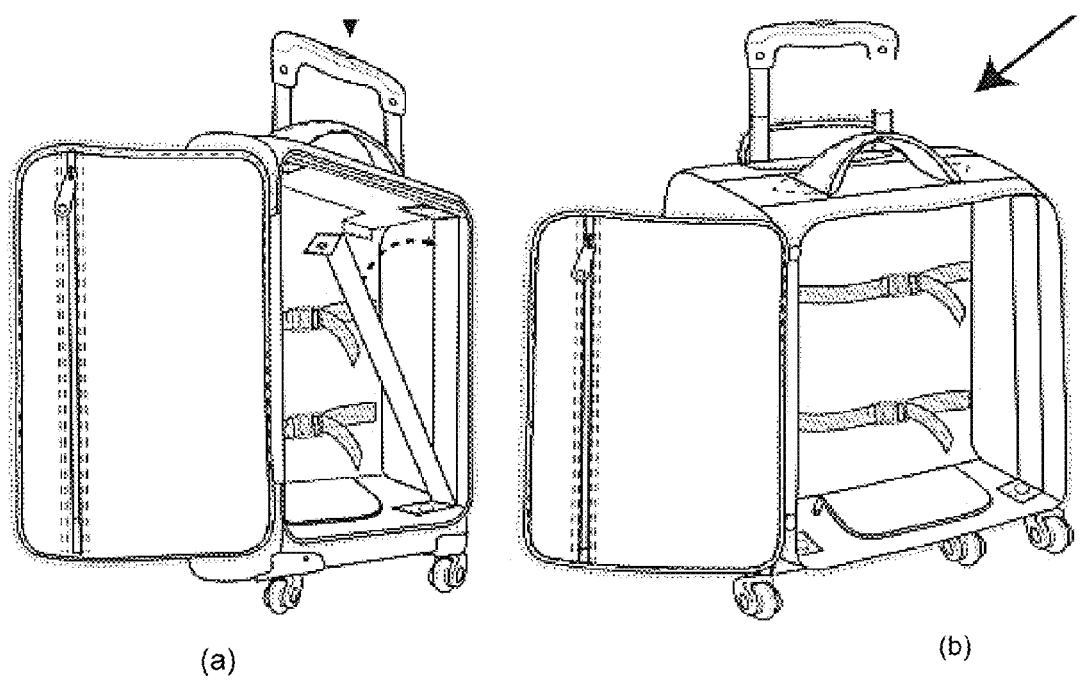
FIG. 27 depict exemplary affixation of the exemplary structural top panel and attachment bands of FIG. 26 in an exemplary article of luggage, and the fully extended configuration with these structural items installed according to an exemplary embodiment of the present invention.

FIG. 26 depicts an alternate exemplary embodiment of exemplary compressible luggage according to the present invention. With reference thereto, there is provided a top panel that swivels upwards, in essentially the same manner as the bottom panel depicted in FIG. 24 swivels downwards, to provide additional top support. Further there are support bars which can be affixed to the top panel in its fully horizontal or uncompressed state to thereby hold it and support it. FIG. 27 depict these support bars shown in their final positions at the top of or front face of the luggage holding the swiveling top panel in its horizontal state and they can be, for example, attached to both the top (literally the underside of the swiveling top panel) and bottom of the luggage to hold the top panel in place and structurally connect the bottom panel and the top panel so as to support a load. In this particular configuration, no wings are needed as shown in FIG. 25. The side support bars can be any rigid material covered with fabric, for example plastic, resin metal, etc. For example, the top panel and side bars can be of honeycomb board. Therefore, as shown in FIG. 27, the completed decompressed piece of luggage in this exemplary embodiment has the side support bars, the swiveling top panel, and there can also be seen in the bottom plate a zipper. This is for a user to unzip and manually push the two portions of the bottom plate into the locked position, where a manually locking/unlocking mechanism is used. This would thus use one of the exemplary embodiments shown in FIG. 5, 17-18 or 20-21, for example, where the two pieces of the bottom plate are manually locked and unlocked, using, for example, one of the manual locking mechanisms of FIG. 5, 12, 17-18 or 20-21. Alternatively, a self-locking hinge mechanism could be used, which would obviate the zipper pouch of FIG. 27

Figure 28:
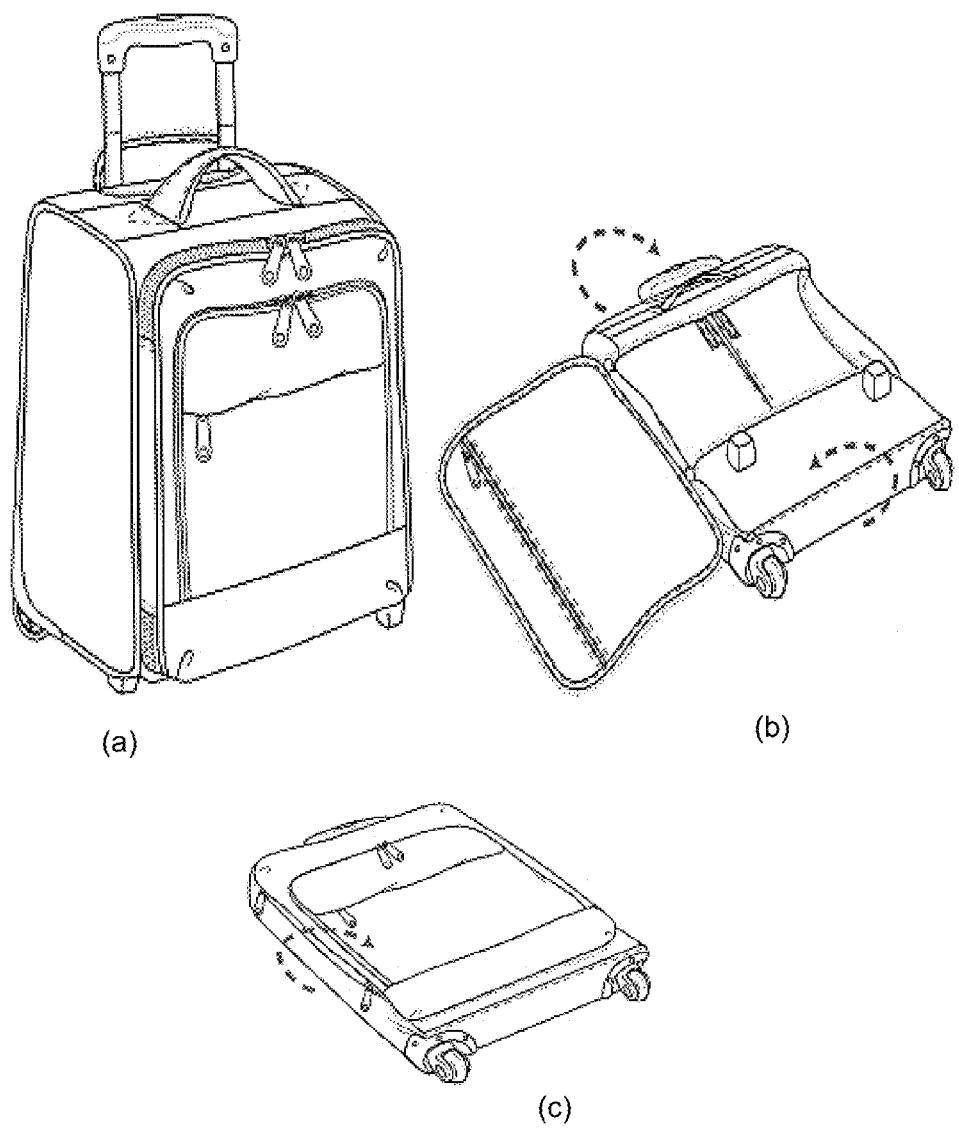
FIG. 28 depict an exemplary fully extended piece of luggage and stages in collapsing it to a fully folded configuration according to an exemplary two-wheel embodiment of the present invention.
Figure 29:
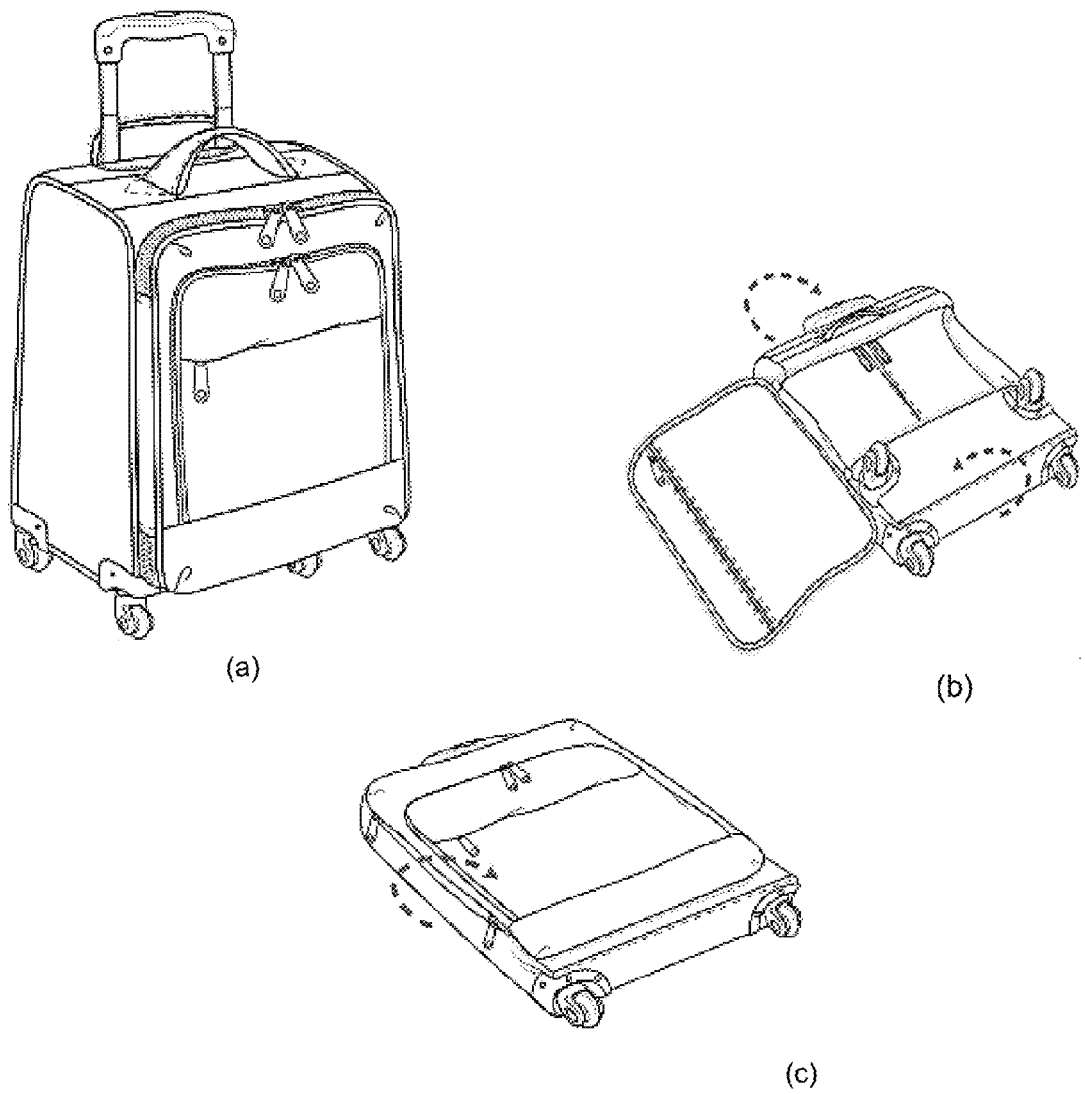
FIG. 29 depict an exemplary fully extended piece of luggage and stages in collapsing it to a fully folded configuration according to an exemplary four-wheel embodiment of the present invention.

FIGS. 28 and 29 illustrate various steps involved in compressing or collapsing exemplary articles of luggage according to the present invention. With reference thereto, FIG. 28 shows an exemplary two-wheel article of luggage, where the two wheels are placed at the back of the luggage. Thus, at the front portion of the luggage there are simply two rubber stops which support the luggage in a standing state when it is not tilted back and being pulled along on its rear wheels. With reference to FIGS. 28(b) and (c), the suitcase is now placed on the floor or other surface with the two pipe telescoping handle compressed, and the top and bottom plates are folded so that the front portions of each of them are now oriented approximately vertically. This divides the bottom plate into two pieces along the hinges or other interconnecting attachment mechanism as the case may be, as described above. It also divides the top plate, if used, into two pieces, as described below in connection with FIG. 30. After compressing the top and the bottom plates, the soft cover front zippered on portion can be folded over as shown in FIG. 28(b), and the luggage can thus be compressed to a fraction of its original size as shown in FIG. 28(c). This fraction varies for different sizes of luggage, and depends upon the dimensions of the luggage, the length by which the front stops protrude from the bottom plate, whether they are recessed, and various other factors.

Figure 30:
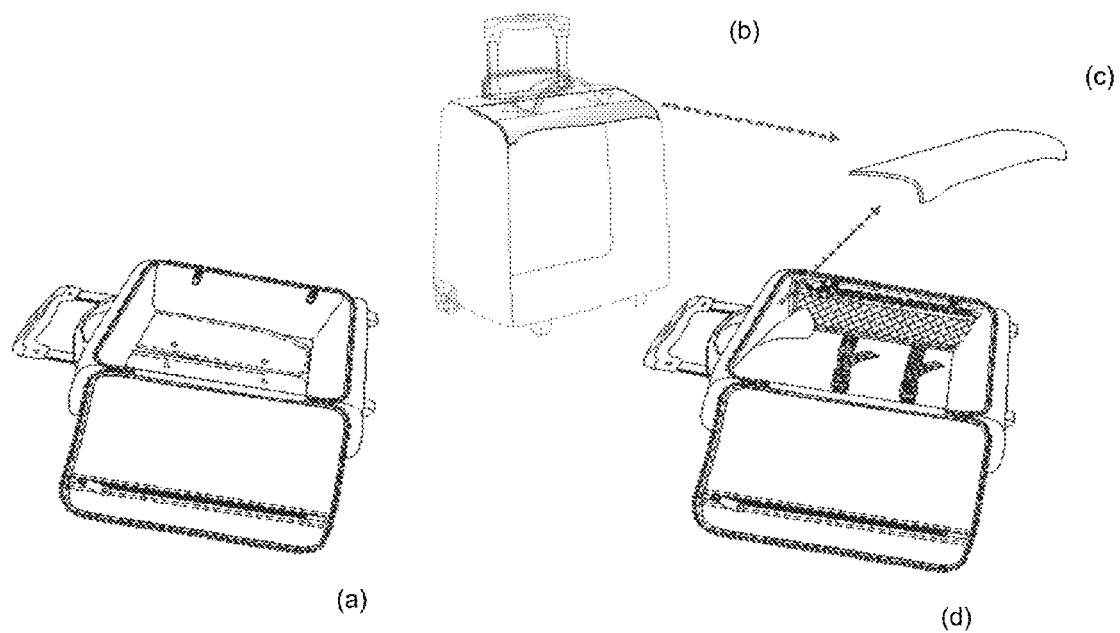
FIG. 30 illustrate the use of an embedded structural top plate that folds down so as facilitate collapsing the luggage according to certain exemplary embodiments of the present invention.
Figure 31:
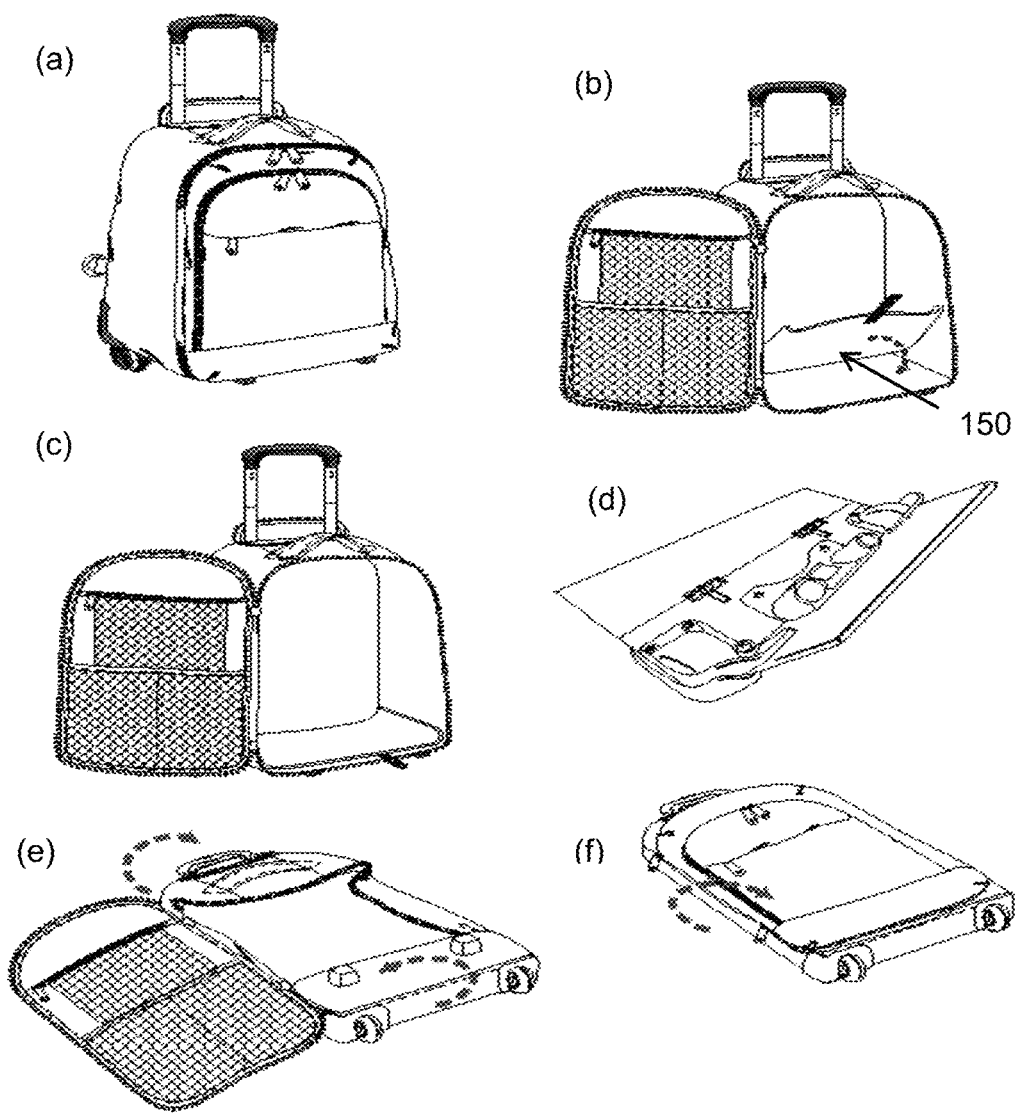
FIG. 31 depict an exemplary duffle bag type article of luggage, using only a structural foldable bottom panel, and various stages in collapsing it, according to exemplary two wheel embodiments of the present invention.
Figure 61:
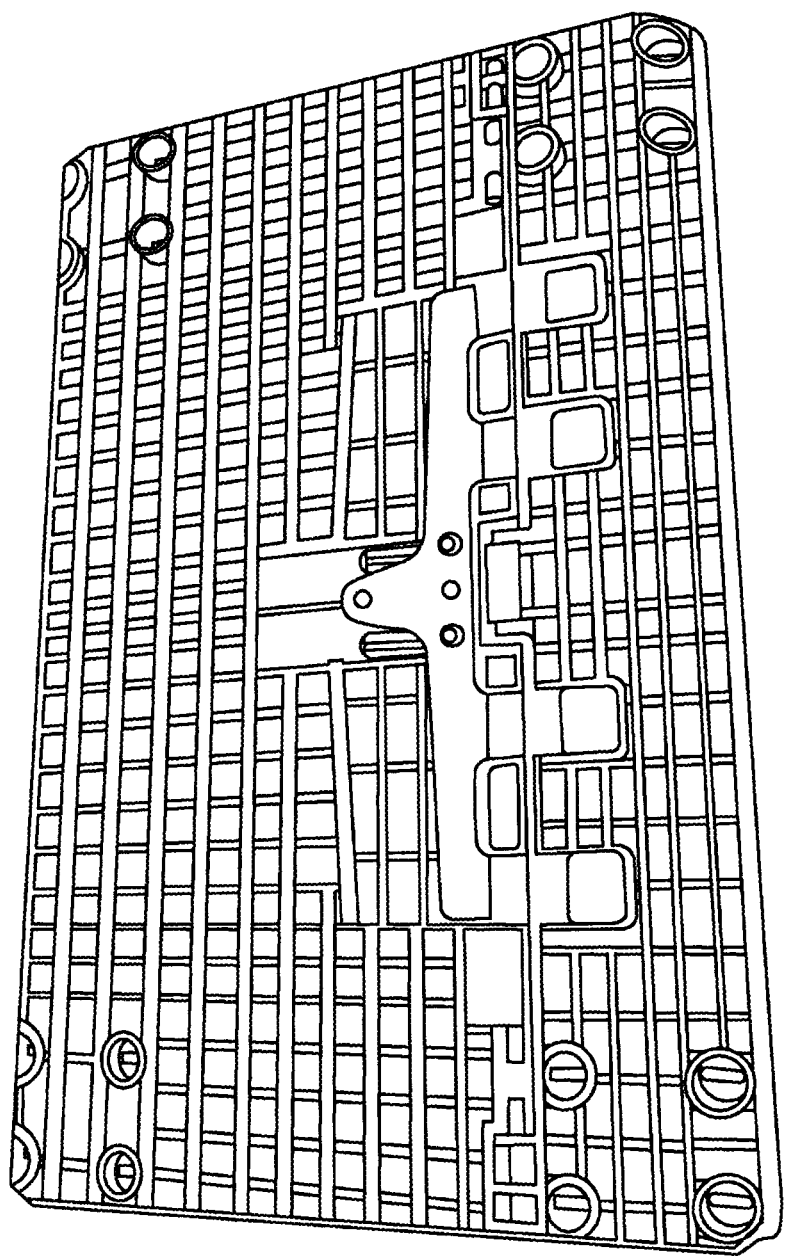
Figure 61A:
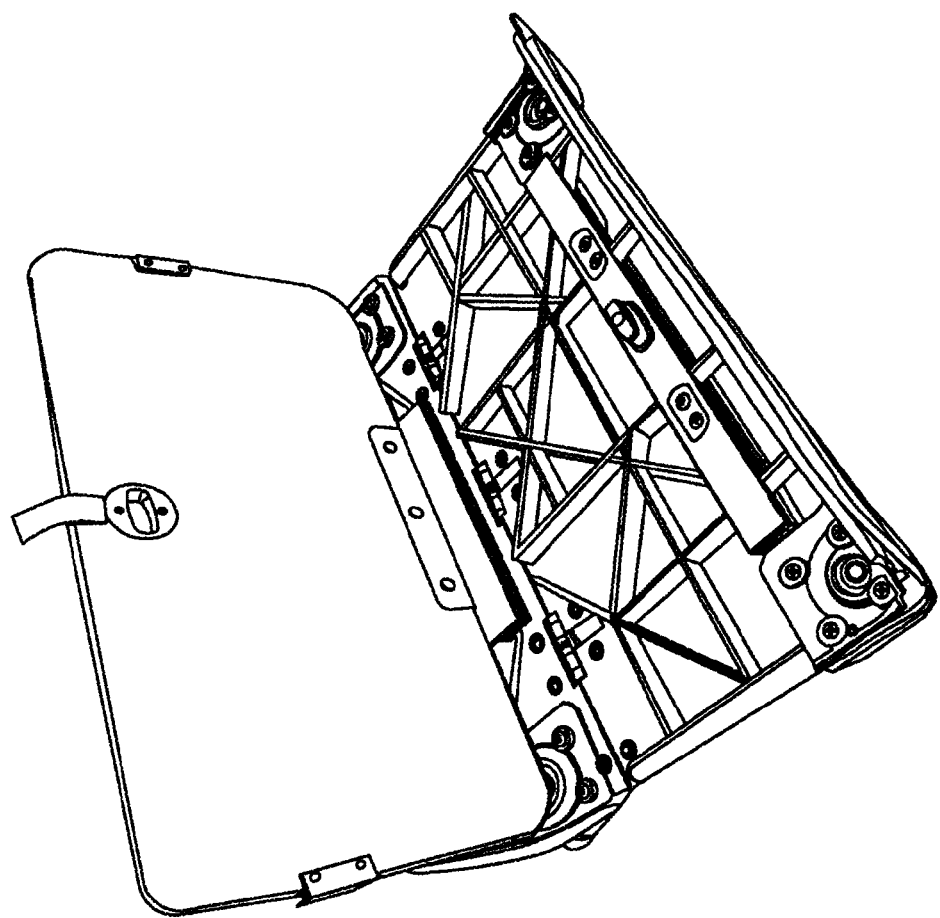
FIGS. 61A and 61B depict an alternate exemplary bottom plane with bottom cover plate attached thereto by a built in clasp.
Figure 61B:
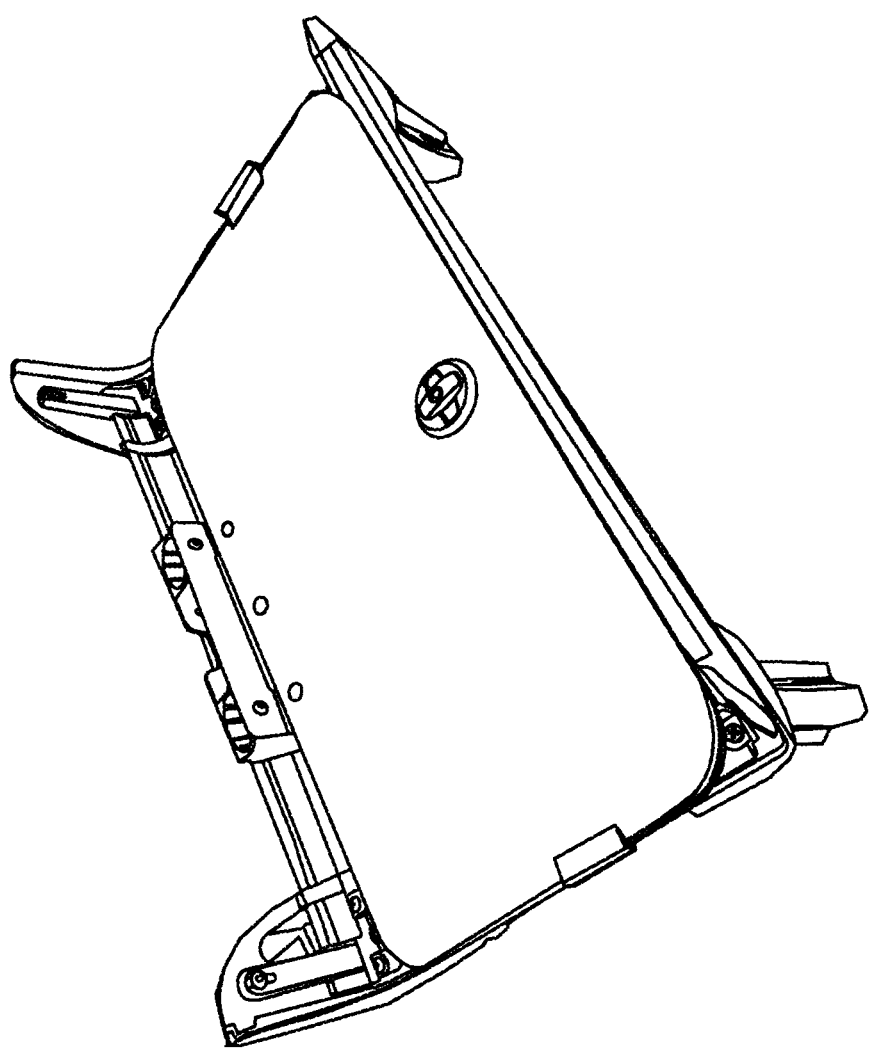

Similarly, FIG. 29 show the exact same set of steps with an exemplary four-wheeled embodiment of the luggage. It is noted regarding exemplary four-wheel embodiments in general, that due to the protrusion of the front wheels from the bottom plate there is a further limit on the compressed volume of the luggage, and thus the compressed depth of the piece of luggage as a whole, because not only is the dimension of the rear portion of the bottom plate contributing to the height of the compressed state, but also the protrusions of the two forward wheels from the now vertically oriented front portion of the bottom plate, as shown in the top right view of FIG. 29. Nonetheless a substantial compression can be achieved. Depending on the size of the bag, and the position of the hinges in the bottom plate (an extreme approach to which is seen in FIGS. 61A-B), compressions to as much as 25-40% of the original volume can be achieved Exemplary Luggage Dimensions and Space Savings FIG. 30 illustrate the use of a two piece top plate according to exemplary embodiments of the present invention. Referring to FIG. 30(a), there is shown an exemplary article of collapsible luggage, as described above, according to exemplary embodiments of the present invention. As can be seen in the image, the side wings are in their folded state, thus allowing the luggage to be collapsed. FIGS. 30(b), (c) and (d) show the placement and mode of insertion of a front piece of the top plate. As noted above, one of the novel structures that facilitates the compression of the luggage to its collapsed state is a hinge mechanism placed in the bottom plate of the luggage such that the bottom plate can be folded into a much smaller depth than in its fully extended configuration. In order for the luggage to collapse, however, a similar folding needs to be facilitated at the top plate unless it is totally non-rigid. Thus, in exemplary embodiments of the present invention, both rigidity and collapsibility can be facilitated, for example, by using two separate structural portions to comprise the top plate of the luggage: a front piece as shown in FIG. 30(c), and a back portion (not shown) which remains fixed, and which can be used to hold the telescoping handle mechanism hardware, and zipper pouch for stowage of said handle when not in use. The two portions need not be connected at all, for example, but can simply be covered in fabric or flexible material and sewn adjacent to each other, separated by a seam. The two portions of the top plate, being the rear portion (not shown) and the front portion, as shown in FIG. 30, can thus be bent or folded relative to one another in similar manner as described in connection with the bottom plate. Alternatively, for example, the front and rear portions of the top plate can also be, for example, hinged or interconnected using any of the methods described above in connection with the bottom plate. Such a variation can be useful where more robust structure is desired.

Thus, when a user desires to collapse the luggage, he or she can push on the bottom plate such that the two portions of the bottom plate move and ultimately subsume an approximately 90 degree angle between them, and the top plate can similarly be pushed on such that the front portion of the top plate is positioned at an approximately 90 degree angle relative to the plane of the rear portion of the top plate, thus facilitating the compression of the volume of the luggage.

Duffle Bag Type Embodiments

FIGS. 31-35 depict an exemplary collapsible duffle bag according to exemplary embodiments of the present invention. A duffle bag does not have side structure, and therefore the entire bag, except for the back plane and the bottom plate, can be made of soft materials. With reference to FIG. 31(a) a fully expanded version of the exemplary duffle bag is presented. With reference to FIG. 31(b) the bag has been opened and there is illustrated the direction in which an exemplary folded bottom cover 150 can be rotated downwards so that the bottom portion of the duffle has some supporting structure. FIG. 31(c) illustrates the situation following the folding down of the bottom cover as shown in FIG. 31(b), and FIG. 31(d) is a perspective view of a bottom plate provided with the exemplary self-locking hinge mechanism as described above. This same mechanism can be used in the exemplary duffle bag, and thus compression can be achieved by folding upwards the front portion of the bottom plate so that it is positioned vertically. FIG. 31(e) shows the configuration of the exemplary duffle bag once the bottom cover has been swiveled upwards, the front portion of the bottom plate has been rotated to its vertical position and the top portion (all soft) has been collapsed, it having no structure whatsoever and easily collapsible. Finally, FIG. 31(f) shows the bag in its fully collapsed form with the front flap having been folded over the now collapsed top and now collapsed bottom portion of the exemplary duffle bag. It is noted that the only support elements in the expanded state are therefore the bottom plate folded down and covered by the bottom cover, there not being any structure in the top plate and there being no side wings.

Figure 32:
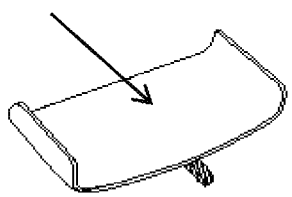
FIG. 32 depict an exemplary bottom panel (a) provided with side panel stops at its edges, and an exemplary article of luggage utilizing it in connection with structural side panels according to exemplary embodiments of the present invention.
Figure 32:
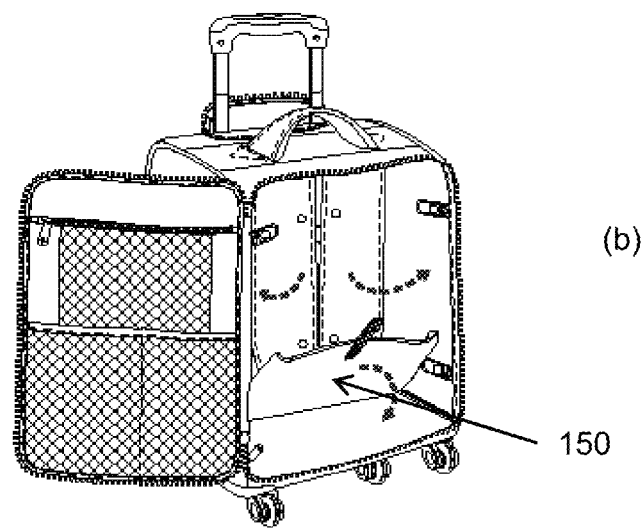
Figure 32:

FIG. 32 depict a novel feature according to various exemplary embodiments of the present invention, a bottom plate with side lips or "stoppers." In exemplary embodiments of the present invention, in order to provide a stopping point for the side wings or side panels once they are fully extended such that they remain in a proper position so as to support the top plate and transfer the load down to the rigid bottom plate, lips can be provided on the lateral sides of the bottom cover into which the side panels or "wings" can rest once they are in their fully opened position. Accordingly, with reference to FIG. 32(a) the top image shows just such an exemplary bottom cover 15 with such exemplary "lips" at its sides. FIG. 32(b) shows how the bottom cover 150 can be rotated downwards, and following that the side wings rotated outwards such that the configuration of FIG. 32(c) is seen, in which the two side wings have been stopped in their outward rotation by the lips or stoppers laterally provided on the bottom cover 150, thus ensuring that the support provided by the bottom cover and hinged bottom plate can be transmitted by the wings up to the top plate.

Figure 33:
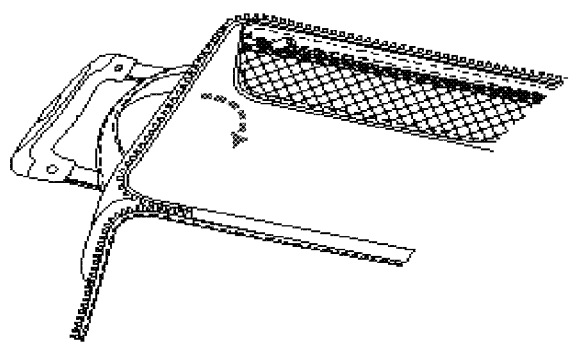
FIG. 33 depict the rotation downwards of a front portion of an exemplary bisectional top plate as illustrated in FIG. 30 according to exemplary embodiments of the present invention.
Figure 33:
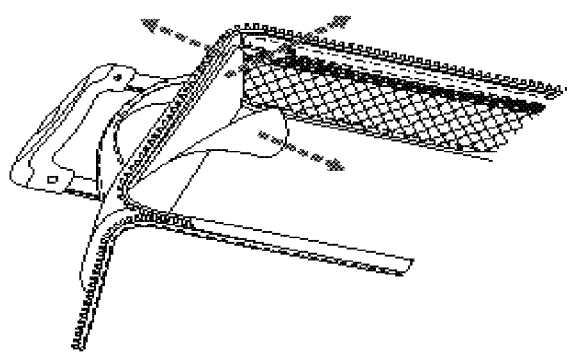
Figure 33:
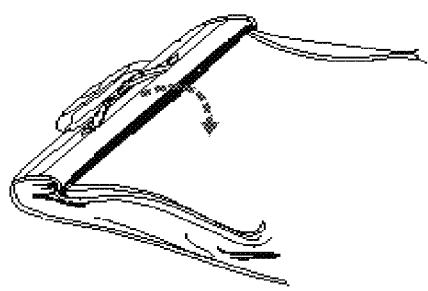

FIG. 33 show the rotation downwards of the bisectional top plate as illustrated in FIG. 30. FIG. 33(a) shows the direction of rotation to collapse the top portion of the piece of luggage. FIG. 33(b) is a cut away showing the forward portion of the top plate that can be folded down. In this example it is not at all attached to the rear portion of the top plate, and the bottom image shows the fully collapsed top portion of the luggage according to exemplary embodiments of the present invention.

Figure 34:
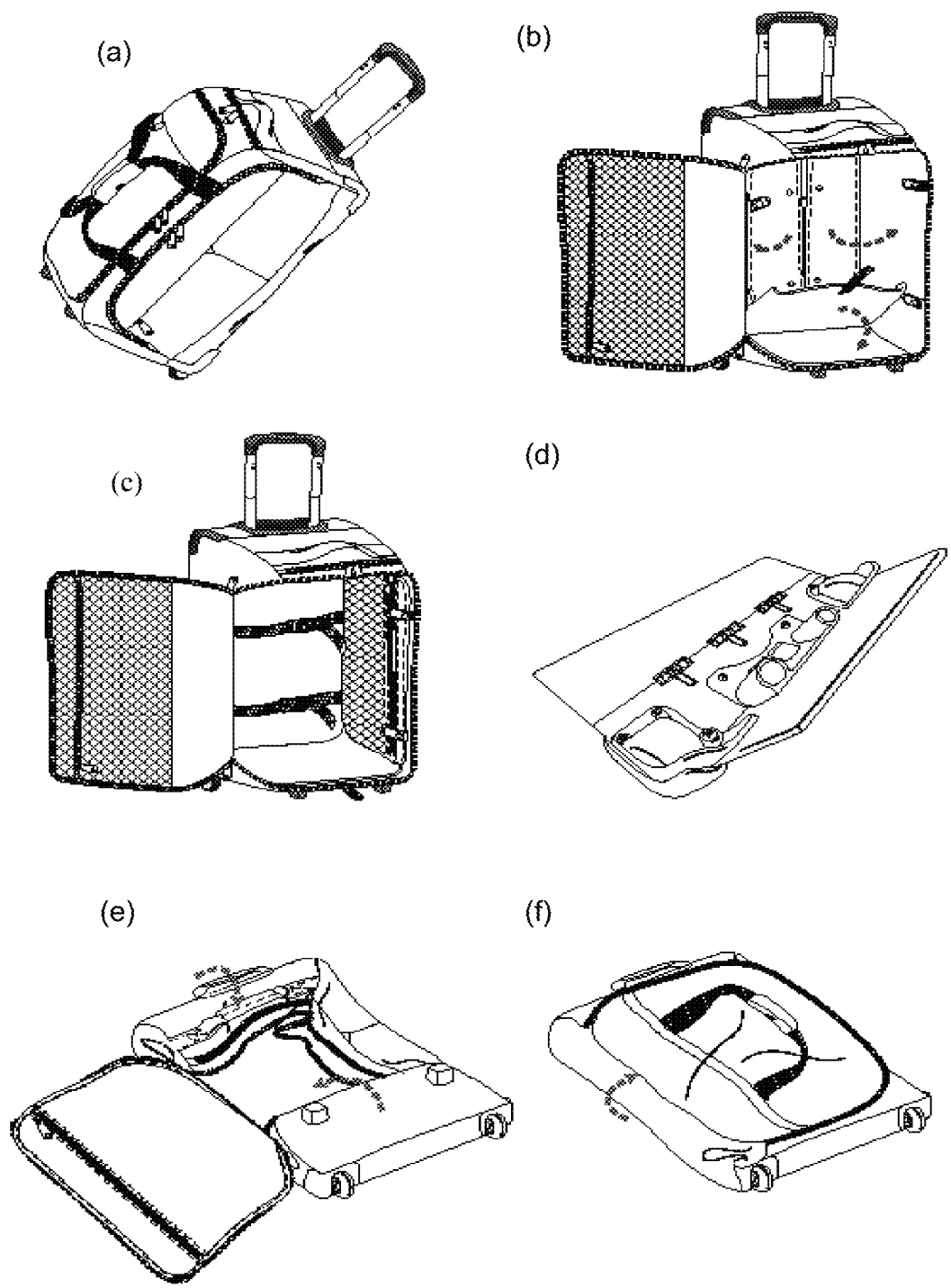
FIG. 34 depict a two wheel version of an exemplary collapsible duffle bag according to exemplary embodiments of the present invention.

FIG. 34 illustrate a two wheel version of another exemplary duffle bag, here with side panels, according to exemplary embodiments of the present invention. As can be seen in FIG. 34(a) there is a duffle bag to which has been added a telescoping handle along its rigid bottom portion. The user can either pull the duffle by the telescoping handle or can stow the telescoping handle into its container and carry the duffle bag by the shown handles along the top portion of the duffle bag.

FIG. 34(b) shows the now familiar unfolding, or expanding, of the exemplary duffle bag shown in FIG. 34(a). Again, the bottom cover has the lips or "stoppers" provided at its lateral edges, as shown in FIG. 32, so as to correctly position the side wings in their fully opened position, and have them attached to the interiors of the right and left sides of the luggage via a pull over snap mechanism, as described above. FIG. 34(c) thus shows the now fully expanded exemplary duffle bag of FIGS. 34(a) and 34(b), and FIG. 34(4) illustrates the now familiar construction of the hinged bottom portion of the bag allowing the two constituent portions to rotate relative to each other. It is also noted that, as above, the stationary (rear) portion of the bottom portion of the luggage can also have a vertical back portion which can be used to support the base of the telescoping handle and also provides a rigid structure into which can be affixed the rear wheels.

Figure 35:
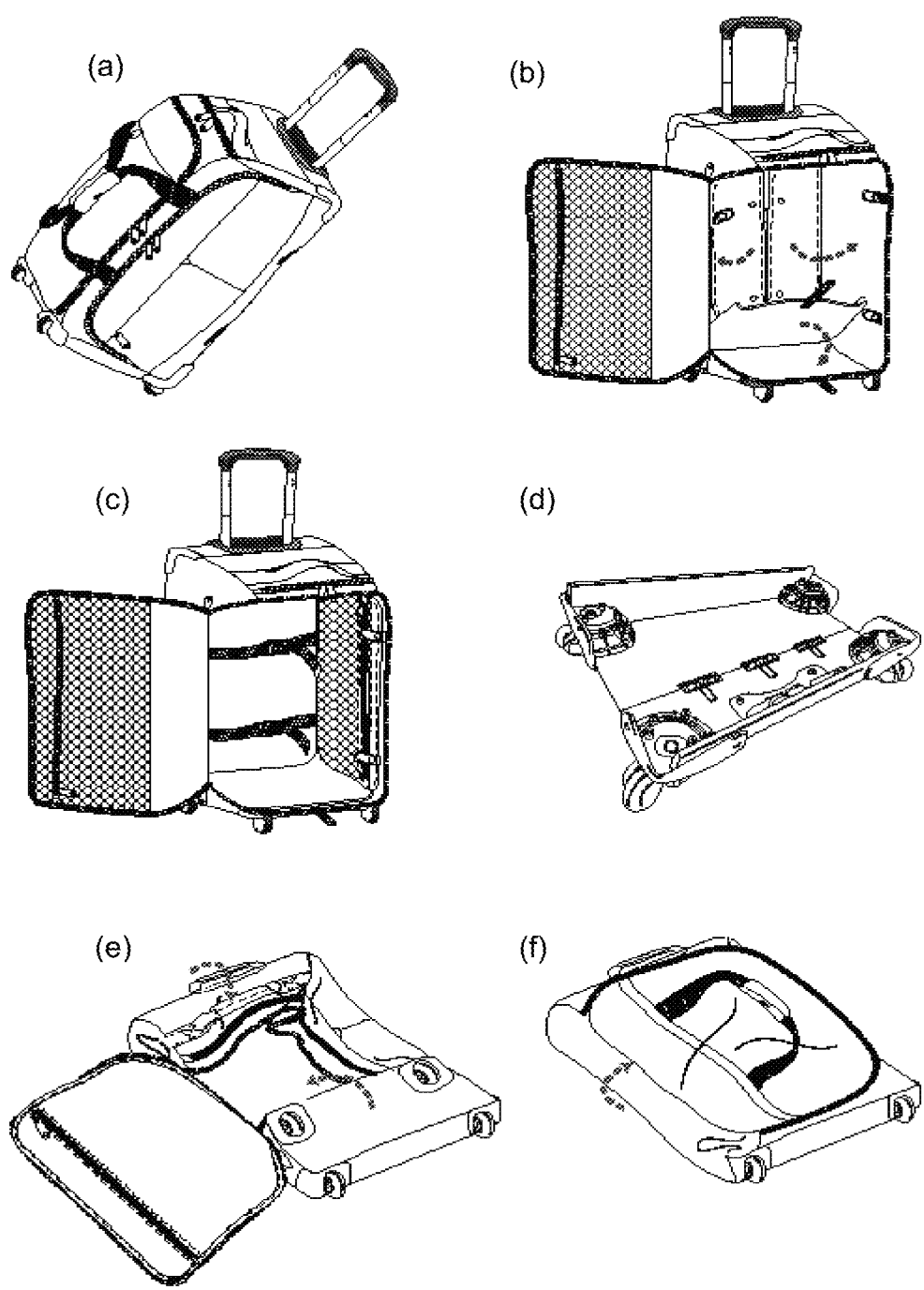
FIG. 35 depict an exemplary duffle essentially similar to that of FIG. 34, in a four wheeled embodiment.

FIGS. 34(e) and 34(f) illustrate how the exemplary duffle can be collapsed, using the familiar steps of (i) collapsing the front portion of the top panel and the bottom panel, respectively, and then (ii) folding over the front flap, which here contains the handle and top pocket of the duffle. Finally, FIG. 35 depicts an exemplary duffle essentially similar to that of FIG. 34, except that here an exemplary duffle having four wheels is shown. It collapses in the same manner as described above for the two wheel duffle of FIG. 34

Figure 36:
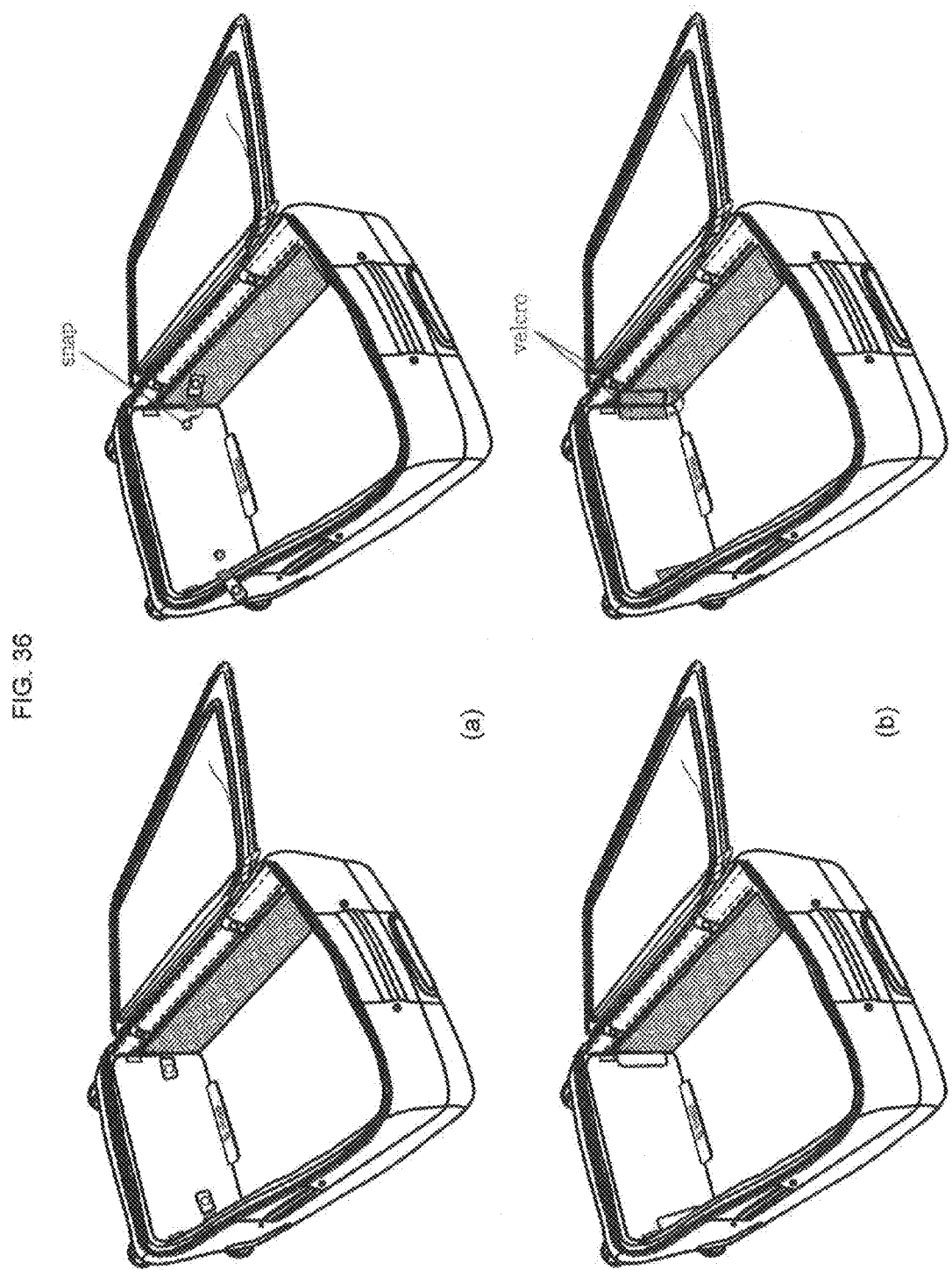
FIG. 36 depict exemplary side panels and an exemplary bottom plate, as temporarily attached by snaps or Velcro type materials according to exemplary four-wheel embodiments of the present invention.

FIG. 36(a) shows side panels as attached to an exemplary bottom cover plate via snaps or Velcro.

Figure 37:
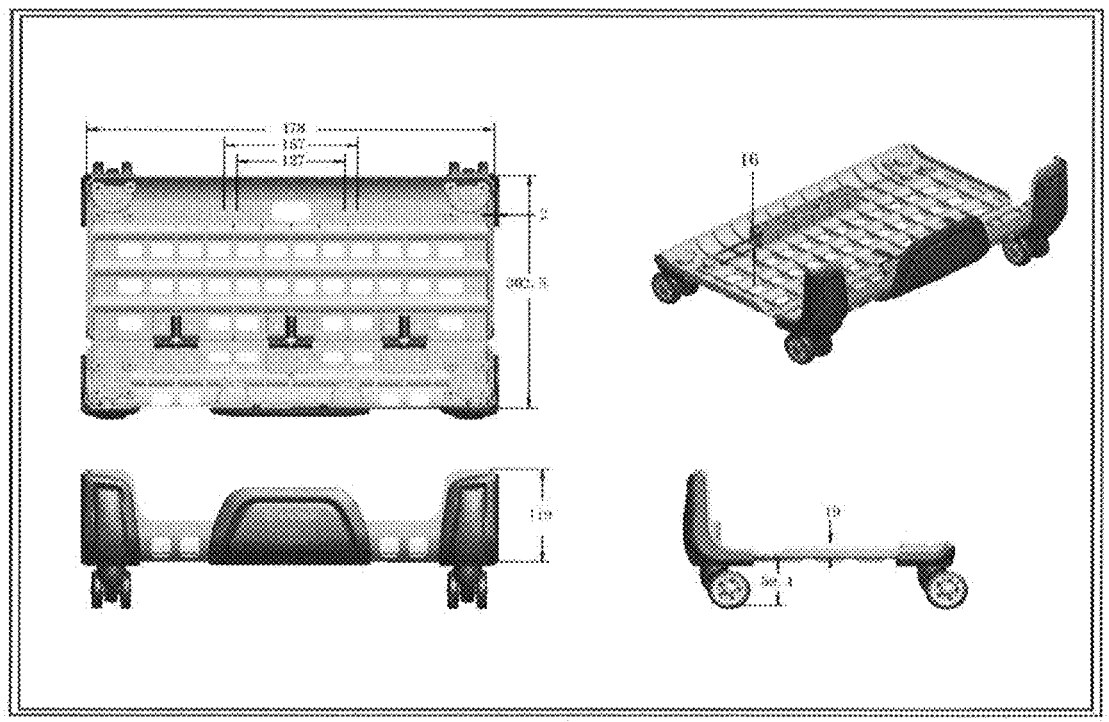
FIG. 37 depicts an exemplary lightweight support structure that can be used with exemplary self-locking barrel hinges according to exemplary embodiments of the present invention.

FIG. 37 depicts an ejection molded support structure that can be used in connection with various hinges according to exemplary embodiments of the present invention to facilitate foldable and collapsible luggage. Exemplary dimensions are provided, and as can be seen, there are three single barrel hinges used to connect the two portions of the bottom board. These hinges are of the 90 degree type, given a four wheel folding luggage embodiment, thus allowing the considerably longer front portion of the bottom board to fold upwards when the luggage is collapsed, thus reducing the depth of the piece by about two-thirds. This material presents a new way to reduce the weight, and yet maintain the strength of bottom board support, relative to heavier materials such as, for example, ABS. The exemplary structure can be molded from polypropylene, for example, or other polyolefins, or other thermoplastics, which can resist the cold and yet still remain strong. Alternatively, for heavier duty applications, carbon fiber, or polycarbonate can be used as well. Use of this novel bottom board in this way can make production more efficient, and maintain consistent quality.

Details of Exemplary Self-locking Hinge Mechanism

Figure 38:
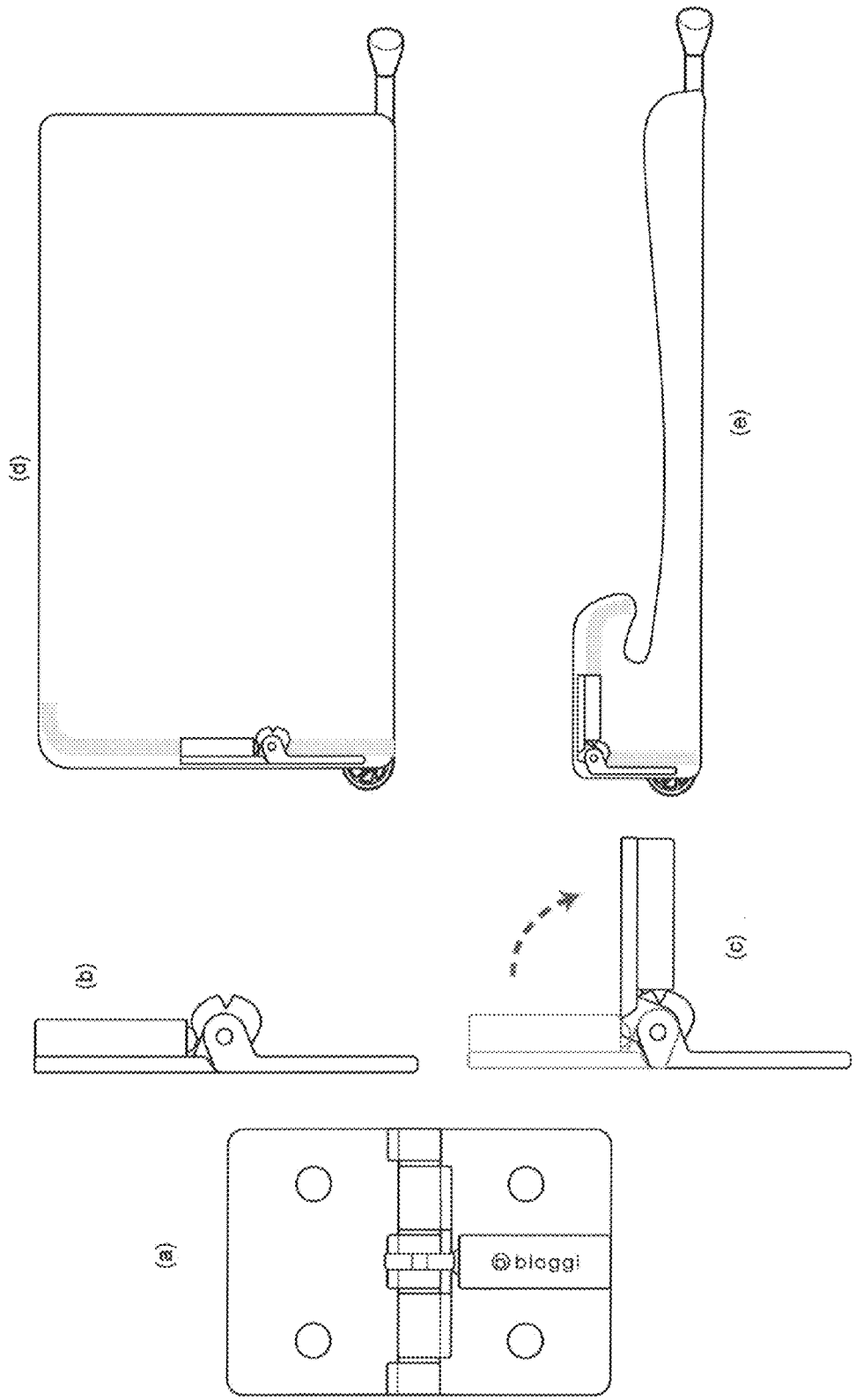
FIG. 38 is a schematic representation of an exemplary 90° self-locking barrel hinge and its use in an exemplary article of luggage according to exemplary embodiments of the present invention.

FIGS. 38-41 illustrate various details of the novel self-locking hinge mechanism described above in connection with FIGS. 8-11. FIG. 38 illustrates an exemplary use of a 90 degree hinge according to exemplary embodiments of the present invention. Visible in FIG. 38(a) is a single barrel hinge (bearing the trademark "Biaggi") according to an exemplary embodiment of the present invention. Shown in FIG. 38(b) is the same hinge in the 0 degree position. This hinge configuration corresponds to a piece of luggage, as shown in FIG. 38(d), in a fully extended state. Thus, the bottom panel—shown in yellow—comprises two portions connected by the hinge in substantially the same plane. With reference to FIG. 38(c) the barrel portion of the hinge has been rotated upwards approximately 90 degrees, and the ball then rests in the concavity at approximately 90 degrees as shown. This corresponds, as shown in FIG. 38(e), to the article of luggage now having the majority portion of its bottom plate rotated upwards so as to be perpendicular to the rear portion of the bottom plate. It is noted that in FIGS. 38(d) and 38(e) the luggage is shown with an extendable handle (at the bottom right of each article).

Hinges that have a fully open, or "flat" position (approximately a 180 degree angle subsumed between the two sides of the hinge) and a fully closed position (approximately a 0 degree angle subsumed between the two portions of the hinge) are well known. However, there is no conventional hinge which has a fully open position and also has a stopping position that is not fully closed but rather is at some angle to the horizontal. For example, the hinge shown in FIG. 38 has a stop at the fully open position and at a position where the two portions of the hinge subsume a 90 degree angle between them, thus allowing it to be placed in a flat configuration as well as in an "L" type configuration. It is precisely this "L" type configuration (at, for example, 90 degrees to the horizontal, but similar angles can, for example, also be utilized) that the hinge can be put in when an exemplary piece of luggage according to an exemplary embodiment of the present invention is compressed. In the fully extended or uncompressed state, the bottom panel of an exemplary piece of luggage has the hinge in the flat position as shown in all FIG. 38(b), and described in detail with reference to FIG. 39.

The second position of the hinge, used when the luggage is compressed, is shown, for example, in FIG. 38(c). Thus, the exemplary hinge used in FIGS. 8 through 11 is the novel 90 degree hinge depicted in detail in FIGS. 38 (and 39-41).

As can be seen in FIG. 39(d), the hinge can be, for example, a spring loaded device. One side of the hinge, in the depicted examples of FIGS. 8 and 10, is the portion that remains stationary, and the other can move. For example, one side can have a barrel or cylinder along its center which holds a tensioned spring with a ball at the end. The cylinder can be positioned, for example, perpendicularly to the axis of rotation of the hinge. In exemplary embodiments of the present invention, such a ball and spring can be made from stainless steel, for example, or various steel alloys, or other metallic compositions, and the plates of the hinge itself can be made from, for example, a resin such as polyacetel, a thermoplastic such as polypropylene, for example, or other appropriate materials as maybe known. The ball can be placed under tension as a result of the compression of the spring, such that, for example, when the front portion of the hinge (i.e., that part of the hinge that is affixed to the front portion of the bottom plate) is swiveled upward to an approximately 90 degree angle from the horizontal, as shown FIG. 38(*e*), the ball is latched into a "U" or "V" shaped notch or cut-out of a vertically positioned flange or cam that is concentric with the axis of the hinge. The side with the barrel containing the spring and ball can be moveable relative to the flange, and the flange can thus be fixed relative to the side of the hinge without the barrel. As the hinge plates move relative to each other, the tensioned ball moves along the flange perimeter. Thus, if the cam's radius drops, such as where a notch or cut-out is provided, the ball moves towards the hinge axis, reaching a resting point. Moreover, adjacent to the notch, but closer to the moveable side of the hinge (the one with the barrel, spring and ball), there can be provided, for example, a vertically protruding portion of the cam, arranged so that it prevents further motion of the hinged plates towards each other, thus creating a natural stop, as shown in FIG. 38(*a*) and FIG. 38(*b*).

This can be done, for example, by providing the flange with a radius at that portion that is large enough to be occluded by the top of the spring barrel, and thus stop the hinge in the position where the ball fits into the notch or cut-out on the cam and not allowing the angle between the hinge plates to become less than the specified angle of the hinge plates at the "natural stop" that is determined by the position of the notch or cut-out. Accordingly, for example, the hinge locks in place and cannot move beyond the angle for which it is designed. In the exemplary embodiment of FIG. 38 that angle is 90 degrees, thus resulting in a self-locking position in said 90 degree orientation when the luggage is compressed. Because a vertical position of the front portion of the bottom panel is ideal for maximum compression, this self-locking hinge achieves a natural collapsed position for luggage that utilizes it.

Figure 39:
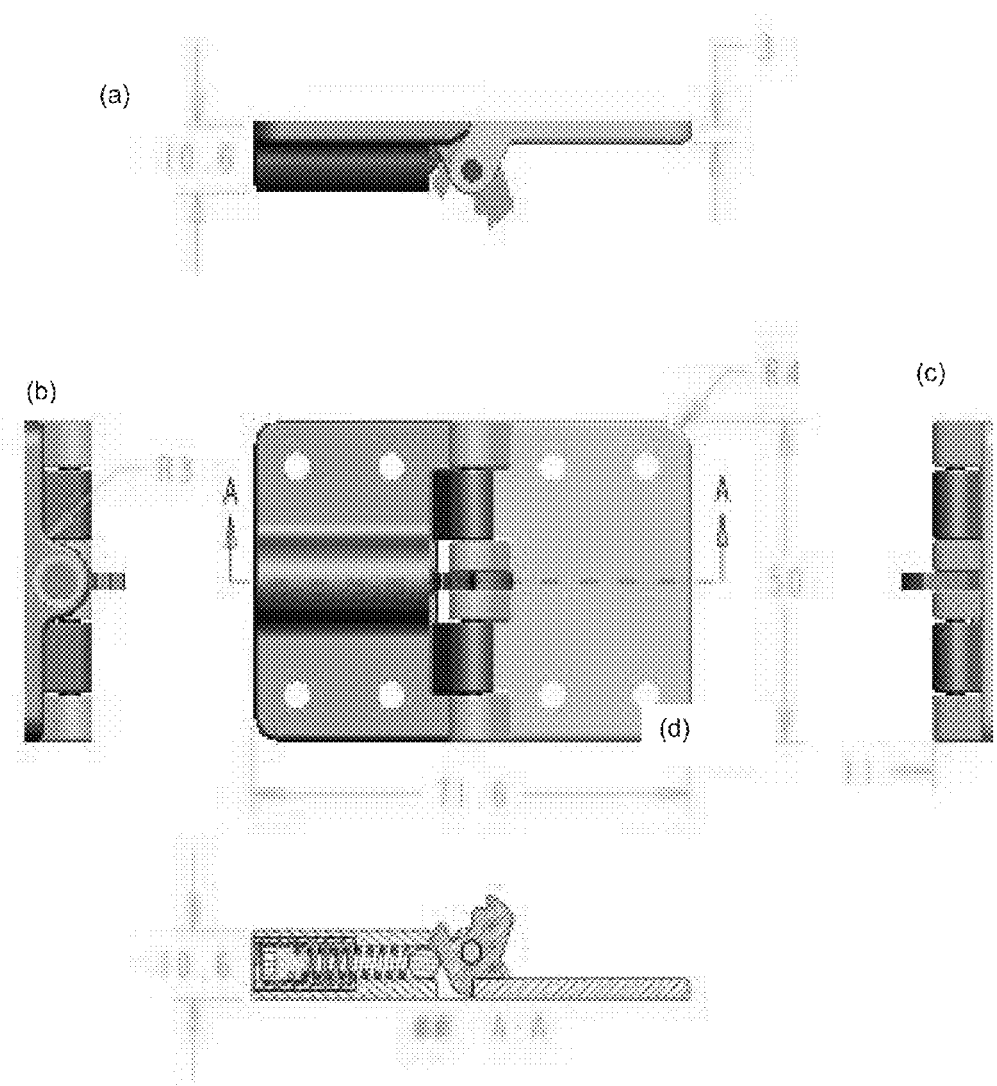
FIGS. 39 and 39A show various top and side views and exemplary dimensions and details of the exemplary 90° self-locking barrel hinge of FIG. 38.
Figure 39A:
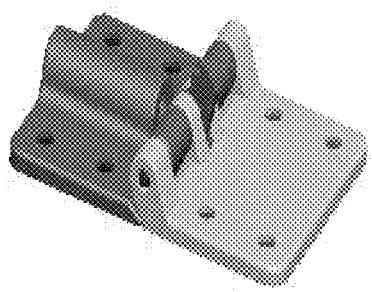
Figure 39A:
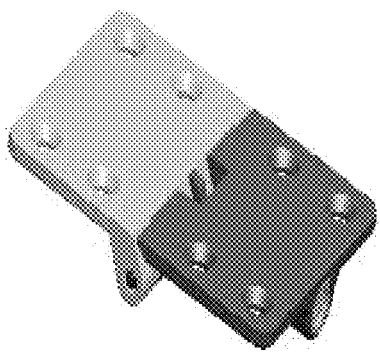
Figure 39A:
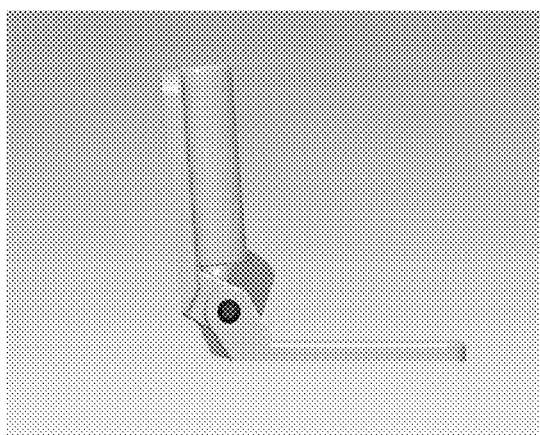

The other stop position for the hinge can thus be the flat, or position of 180 degree subsumed angle between the hinge plates. This stop can be achieved, for example, not by the cam, spring and ball structure, but rather by the shape and interaction of the hinge plates themselves. As shown in FIG. 39(*a*) and FIG. 39A(*a*)-(*b*), the two plates of the exemplary hinge are depicted in black and grey respectively, and both a top view, FIG. 39A(a), and a bottom view FIG. 39A(b) are shown. As can be seen therein, when fully flat, the two plates touch along an angled face such that they can be rotated only in one direction, i.e., such that the top plates move closer together. They cannot move such that the bottoms of the plates move closer to each other from the flat position. Thus there is a second natural "stop" at a subsumed angle of 180 degrees, as shown in FIGS. 39(*a*) and 39A(a). This is also known as the 0 degree position, inasmuch as the plates have not been rotated towards each other at all, hence a 0 degree rotation. With two natural stops at an essentially co-planar configuration and an essentially perpendicular configuration of the hinge plates, such a hinge is a good choice for use in a bottom plate according to exemplary embodiments of the present invention.

Additionally, such a self-locking hinge is most useful inasmuch as a user does not have to see inside the mechanism or open up a zippered, or other closed pocket, on the bottom panel of the luggage so as to access a manually actuated locking mechanism, but rather, can easily determine when an exemplary piece of luggage is in each the compressed and the non-compressed states by simply hearing the clicks of the self-locking hinge mechanism. One hears a click when it is in the compressed state and one hears another click when it is in the fully open state. The clicks can be generated by the ball moving in and out of the "U" or "V" shaped cut-out, and the two hinge plates abutting against each other in the co-planar configuration, for example. Other signals, both tactile and audible, to indicate to a user when the natural "compressed" state and the natural "expanded" state of an exemplary self-locking hinge can also be implemented in various exemplary embodiments. Additionally, various other configurations of a hinge besides the barrel spring and ball assembly can be used. The key functionality is the ability to maintain two portions of a luggage supporting or structural plate in each of a (i) planar and a (ii) relatively folded with some angle between them position. This allows the supporting or structural plate of the luggage to perform "double duty" and thus assume an open configuration where it functions as if it were one integrated plate, without division, and another closed or compressed configuration where the depth or length has been significantly shortened.

Figure 40:
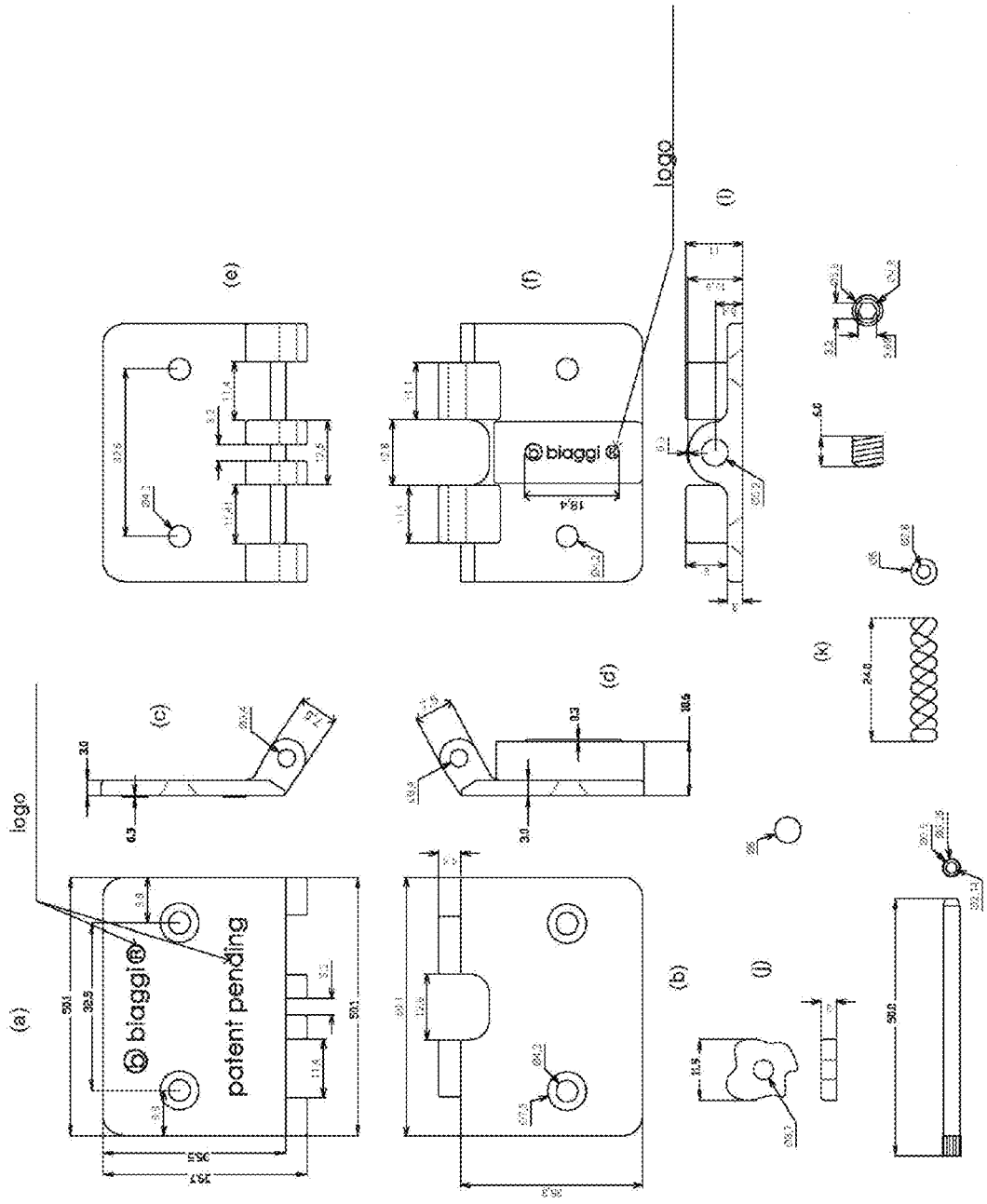
FIGS. 40 and 40A provide details of an exemplary single-barrel 90°/180° self-locking hinge according to exemplary embodiments of the present invention.
Figure 40A:
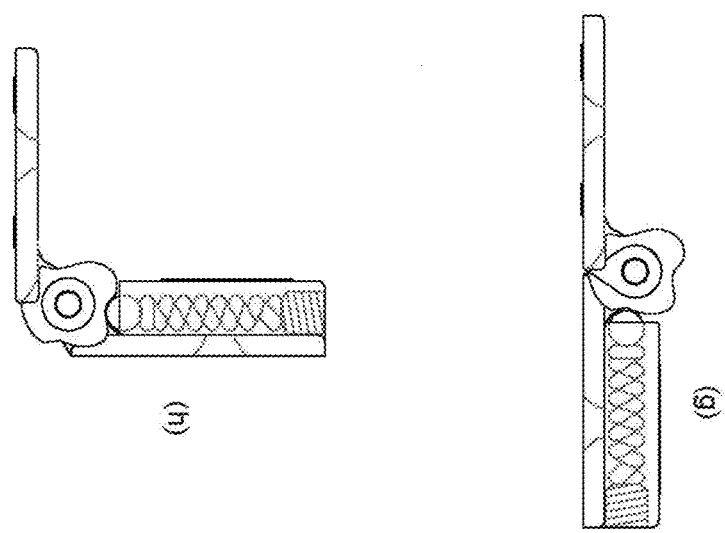
Figure 40B:
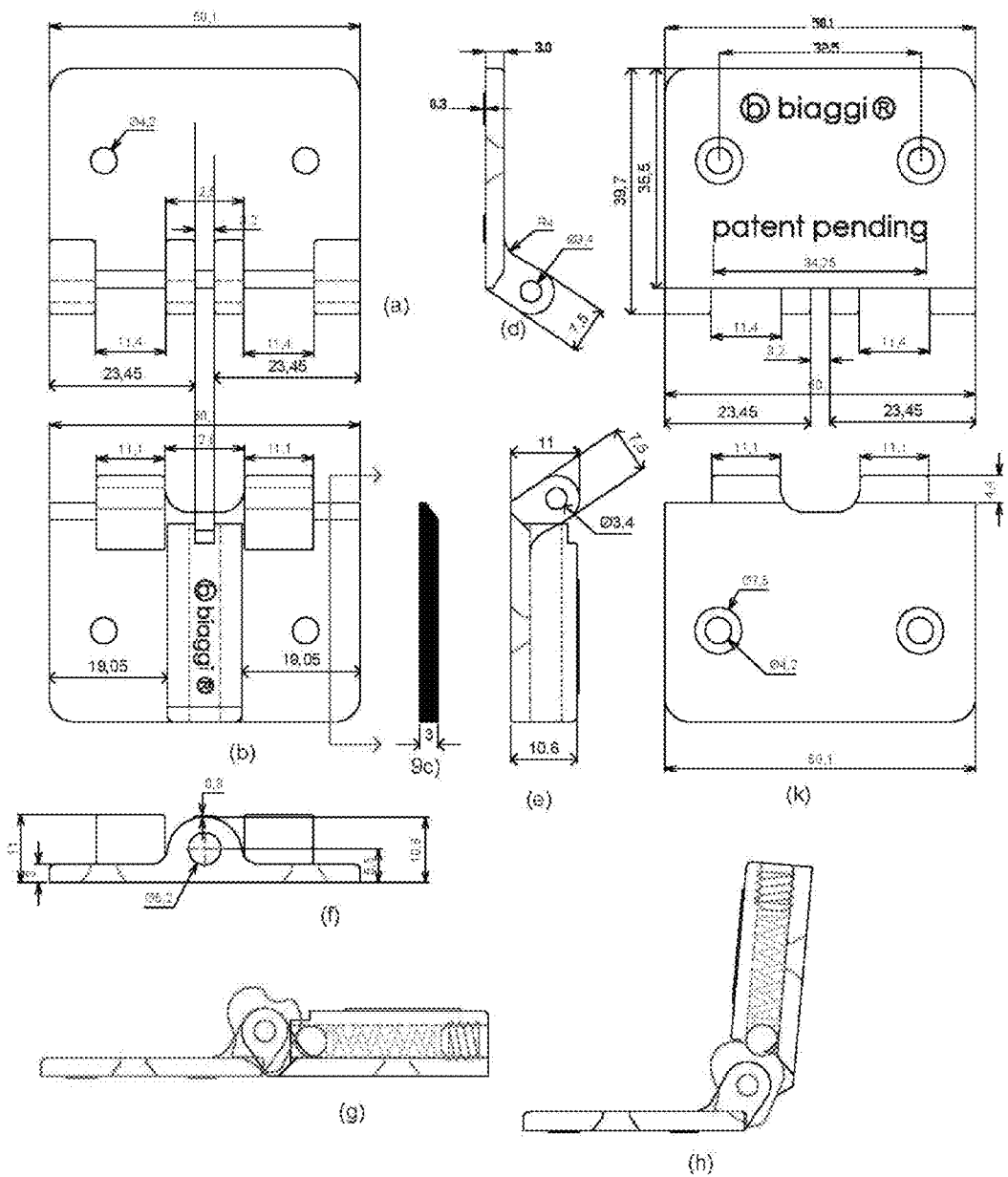
Figure 40C:
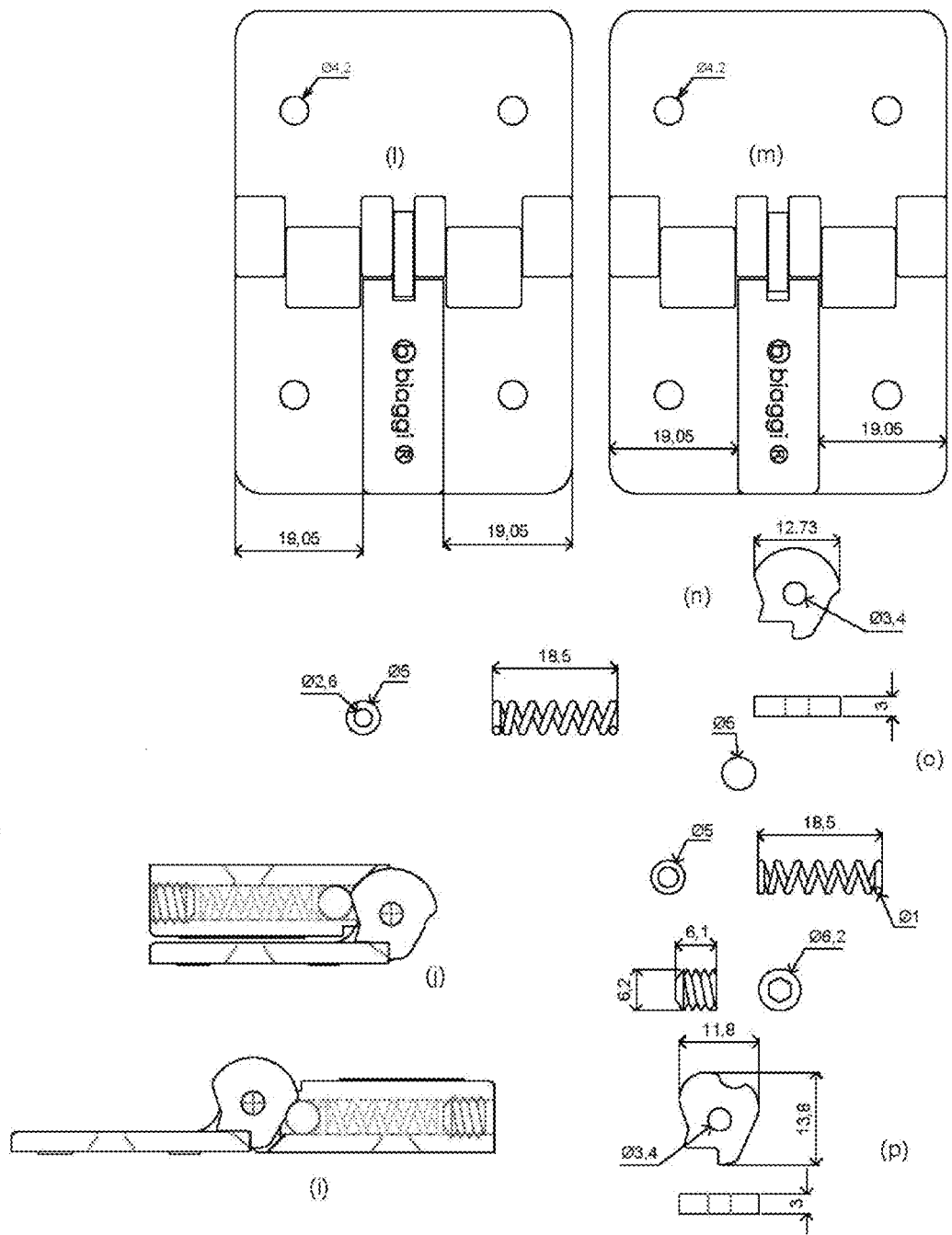
Figure 41:
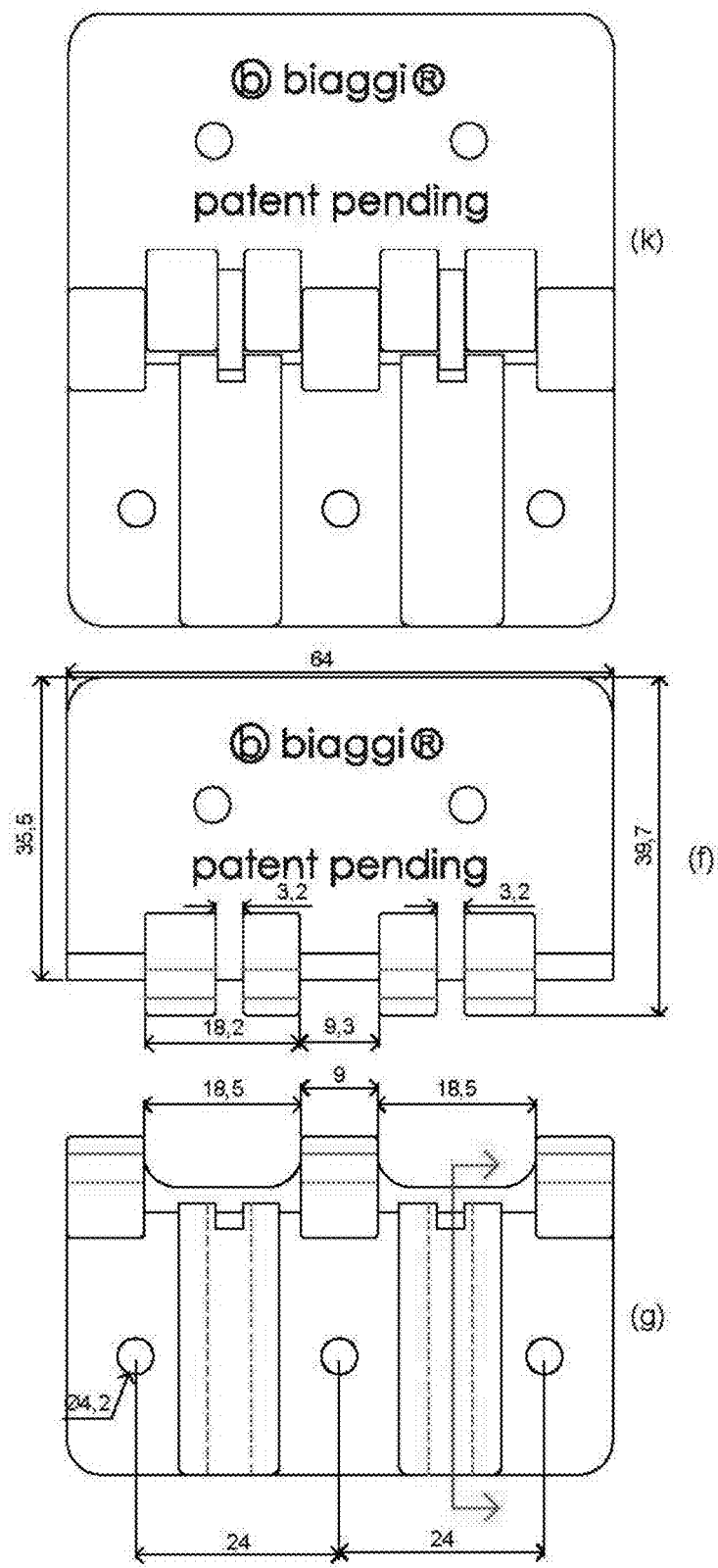
FIGS. 41 and 41A provide details of an exemplary double-barrel 90°/180° self-locking hinge according to exemplary embodiments of the present invention.
Figure 41A:
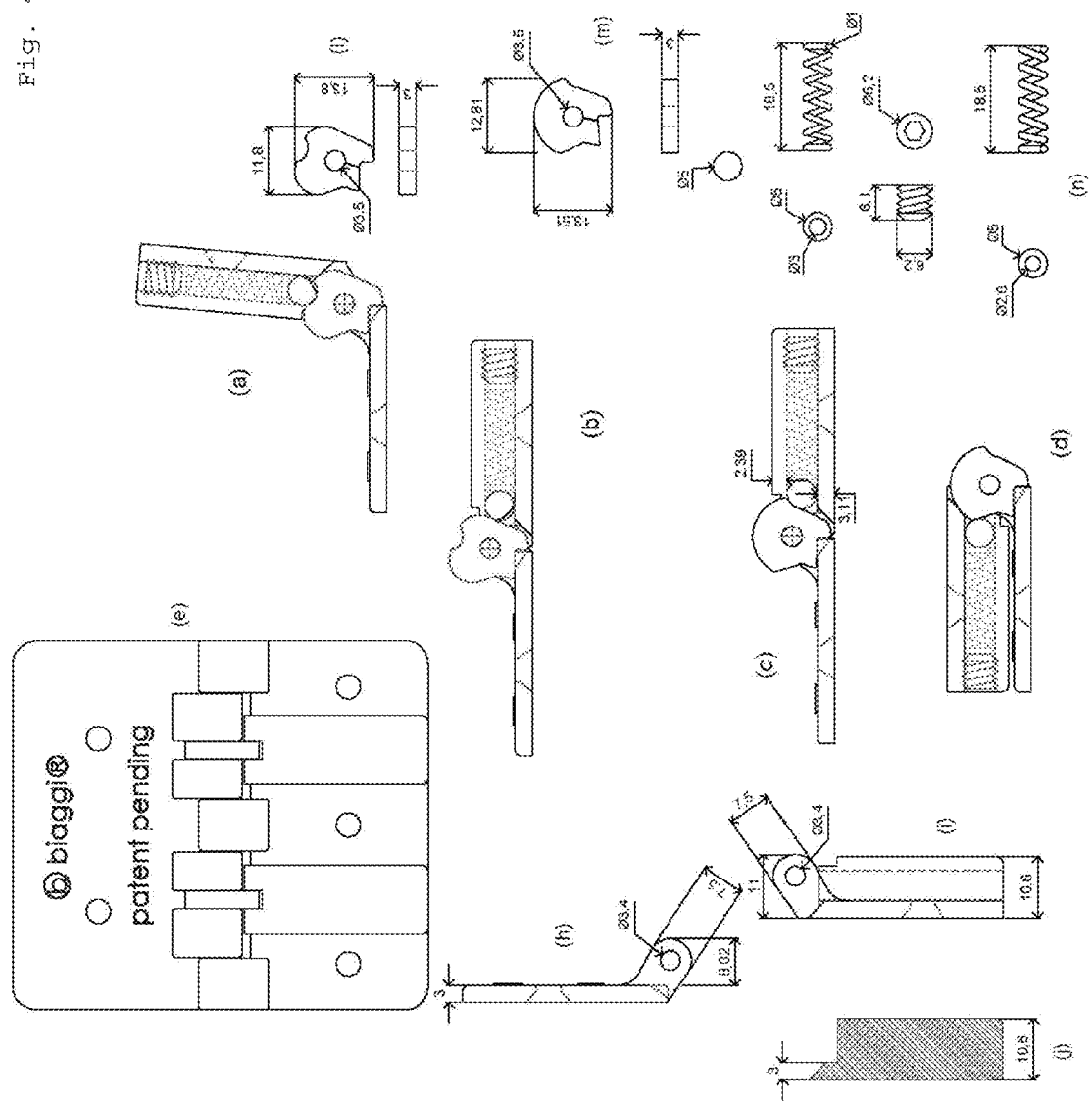

In exemplary embodiments of the present invention, two or more hinges of the type of FIG. 39 can be integrated. Thus, FIGS. 40 and 40A show various exemplary details of one example 90 degree hinge design, and FIGS. 41 and 41A show similar details for a double barrel integrated hinge mechanism. These exemplary dimensions are for illustration only, and are understood not to be limiting in any way. FIG. 41 will first be described, and then FIG. 40.

With reference to FIG. 41 a double barrel version of each of a 90 degree hinge and a 180 degree hinge are shown. FIG. 41(*a*), FIG. 41(*b*) and FIG. 41(*l*) show aspects of an exemplary 90 degree hinge according to exemplary embodiments of the present invention. FIG. 41(*a*) shows the hinge in the 90 degree configuration, and FIG. 41(*b*) shows the hinge in a 0 degree configuration, where the hinge is fully flat and planar. It is noted that as a matter of nomenclature, in the following disclosure the 0 degree position of a hinge is the term given to a hinge when it is completely flat such that its two arms or surfaces on either side of the central axis are substantially the same plane corresponding to a "normal" or fully open orientation. This is the configuration when the hinge is fully opened and the plate, or panel, whatever article of luggage it is provided within, for example, is in a fully extended and open position. In exemplary embodiments of the present invention, by rotating the hinges by a certain number of degrees so as to bring the two surfaces to which the hinges are attached closer together, such as, for example, in a perpendicular relationship (90° rotation), a folded on themselves relationship (180° rotation), or a small angle between them, like a bellows in a collapsed state (160° rotation, 150°-170° rotation), the folding or collapsing of the luggage can be facilitated.

Figure 41B:
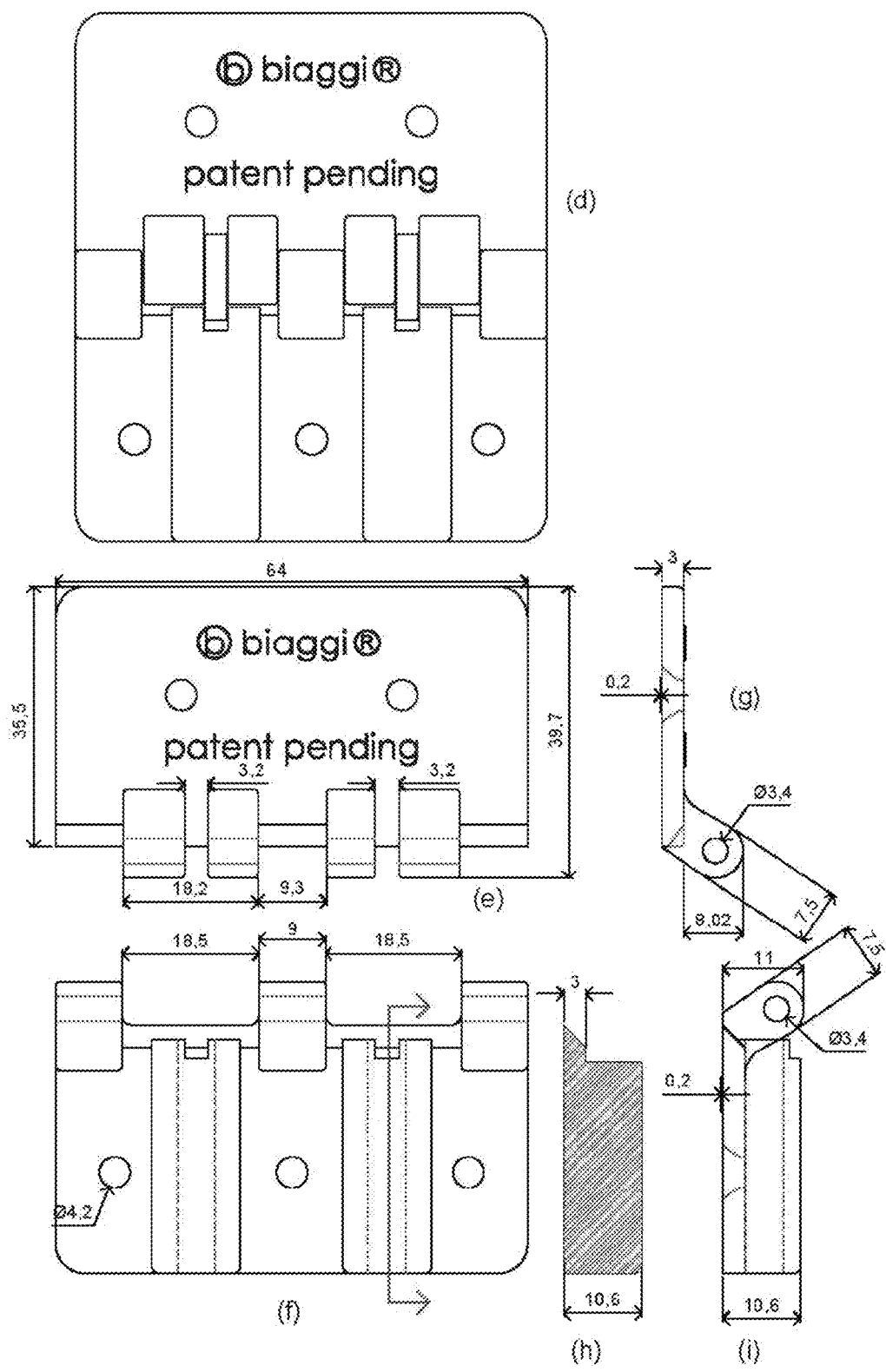
Figure 41C:
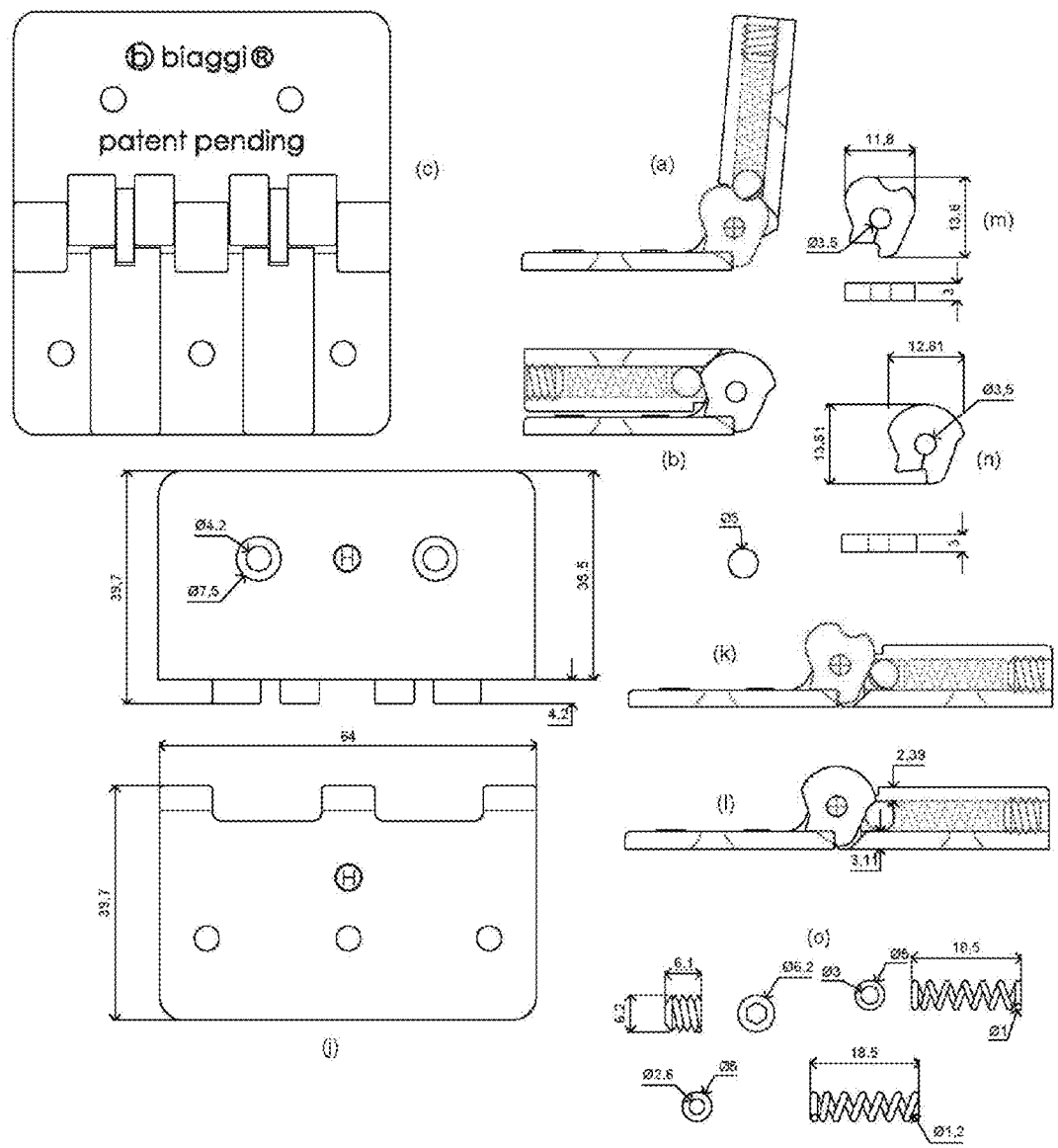

FIG. 41(*l*) provides exemplary dimensions for the flange of such a 90° hinge. Similarly, FIGS. 41(*c*) and 41(*d*) illustrate the 0° degree and 180° positions, respectively, of an exemplary 180 degree hinge. It is noted from careful inspection of FIGS. 41(*a*) and 41(*b*), and FIGS. 41(*c*) and 41(*d*), that what determines the available "set" positions of an exemplary hinge is precisely where the cutouts or concavities are placed along the outer arc of the axial flange. The flange can be fixed with respect to the arm of the hinge without the barrel, so that the barrel and its spring loaded ball are free to rotate relative to it. As the barrel and ball that is spring loaded within it move along the axial flange, the ball naturally falls, under the force of the spring, into any concavities on the surface of the flange located at various positions along its arc. As can be seen in FIGS. 41(a) and 41(b) there is a concavity into which the ball can fit into at approximately 90 degrees rotation upwards from the horizontal. In FIGS. 41(c) and 41(d) there is no such concavity until one reaches the complete other side of the flange, or a rotation of 180 degrees from the original position. FIG. 41 also shows exemplary dimensions of various constituent elements of the hinges. For example, FIG. 41(m) shows exemplary dimensions of the flange of FIGS. 41(c) and 41(d), and FIG. 41(n) provides detail of the spring and screw that holds it in place within the barrel. FIGS. 41(e) and 41(k) show the two arms of the hinge as mutually connected, and FIGS. 41(f)-(j) show exemplary details and dimensions of the two arms of the hinge as disconnected one from the other.

It is noted that, as shown in FIGS. 41(g), 41(i) and 41(j), the lower portion of the hinge in FIG. 41 is the arm provided with the barrels. Thus, by placing the concavities at various angles of arc along the flange, various positions can be assumed by the hinge, and thus corresponding relative positions of two panels of a luggage plate. As noted, these can be exploited to conveniently open and compress luggage.

FIG. 41A shows the exemplary double barrel hinges of FIG. 41 with some additional detail. In particular, FIG. 41A(j) shows the underside of FIGS. 41A(e) and 41A(f). The exemplary dimensions for the underside are shown in FIG. 41A(j) as well. In all other respects the figures in FIG. 41A are essentially the same as those shown in FIG. 41, and will not be described again.

FIGS. 40 and 40A show the hinges of FIGS. 41 and 41A in a single barrel configuration, with exemplary dimensions for such single-barrel embodiments. FIG. 40A thus shows, in FIGS. 40A(l) and 40A(m), exemplary dimensions of the single-barrel 90° hinge. These figures show a top view. FIG. 40A(n), similar to FIG. 41(m), shows exemplary dimensions of the 180° flange. All exemplary dimensions are in millimeters, it is noted. FIGS. 40A(g), 40A(h) and 40A(p) illustrate details of the 90° hinge. In that regard, it is noted that FIG. 40A(p) is analogous to FIG. 41(l) and they have approximately identical dimensions, but not exactly so. As is noted in all of the figures of the flanges, the flange thickness is shown in a drawing immediately below each of FIGS. 40A(n), 40A(p), 41(l) and 41(m). In each case, the thickness of the flange is shown to be, for example, three millimeters.

FIG. 40A(o), analogous to FIG. 41(n) once again shows details of the spring and the screw which holds the spring in place within the exemplary barrel. FIG. 40A(o) shows identical exemplary dimensions to those shown in FIG. 41(n) with some small variation. FIGS. 40A(a) and 40A(b), being analogous to FIGS. 41(f) and 41(g) respectively, show the top and bottom portions of the exemplary single barrel self-locking hinges according to exemplary embodiments of the present invention. Each of FIGS. 40A(a) and 40A(b) provide exemplary dimensions and FIG. 40A(c) shows the thickness of the portion of FIG. 40A(b), the bottom of the hinge, where there is no barrel structure. Similarly, FIG. 40A(e) is a view into a cross section through the bottom portion of the hinge shown in FIG. 40A(b) and it shows the full thickness of 10.6 millimeters of the barrel at its side. Analogously, FIG. 40A(d) is a cross section through the upper portion of the hinge with the same 3 millimeter thickness and provides dimensional details of the portions of the hinge that are connected via a central axis.

Finally, FIG. 40A(f) is an end view from the bottom of the page looking upwards into the lower portion of the hinge shown in FIG. 40A(b). It shows the exemplary dimensions of the central barrel in which the spring and ball are provided, and other exemplary dimensions.

Similarly, FIG. 40 shows similar details of the single barrel 90 degree hinges of FIG. 40A. Thus, FIGS. 40(g) and (h) are exactly analogous to FIGS. 40A(g) and (h), FIG. 40(i) is exactly analogous to FIG. 40A(f), and so on. The spring is drawn schematically in this figure, as a squiggly line. FIGS. 40(a) and (b) are exactly analogous to FIG. 40A(k), and FIGS. 40(e) and (f) are exactly analogous to FIGS. 40A(a) and (b), Exemplary dimensions in the exemplary embodiment of FIG. 40 are close to, but not always the same as, those shown in FIG. 40A, especially as regards the exemplary screw, spring and related assemblies. These dimensions are all exemplary, and are provided of illustrate various possible options.

Next described are photographs of various exemplary prototypes according to exemplary embodiments of the present invention, which further illustrate the features and functionalities described above.

Exemplary Prototype Using Self-Locking Hinge

Figure 42:
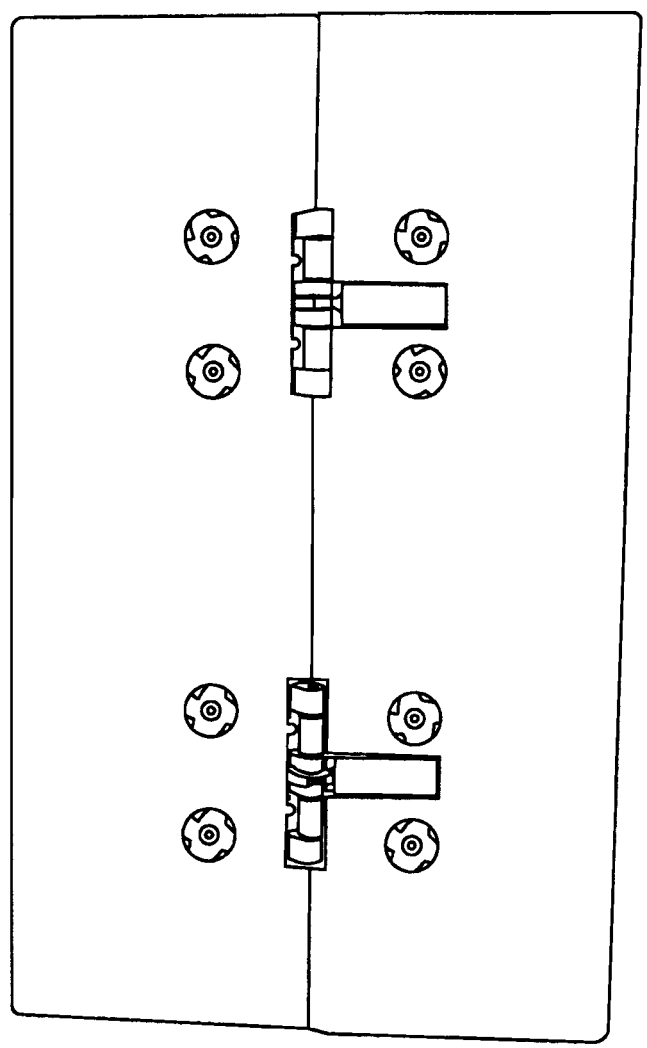
FIGS. 42-46 depict various views of exemplary prototypes of the self-locking hinge of FIG. 39 mounted in a hinged plate according to an exemplary embodiment of the present invention.

FIGS. 42-46 depict various views of an exemplary prototype of the self-locking hinge of FIGS. 38-41 according to an exemplary embodiment of the present invention. FIG. 42 shows a top view of an exemplary prototype of an exemplary hinge according to an exemplary embodiment of the present invention. Seen in the lower portion of the figure is the side of the hinge having the cylinder and in the top portion of the figure, shown in a kind of rusted metal color, are the cams which are coaxial with the axes of the hinges and which abut against the ball (difficult to see) which is being pushed against the cam by the spring in the cylinder.

Figure 43:
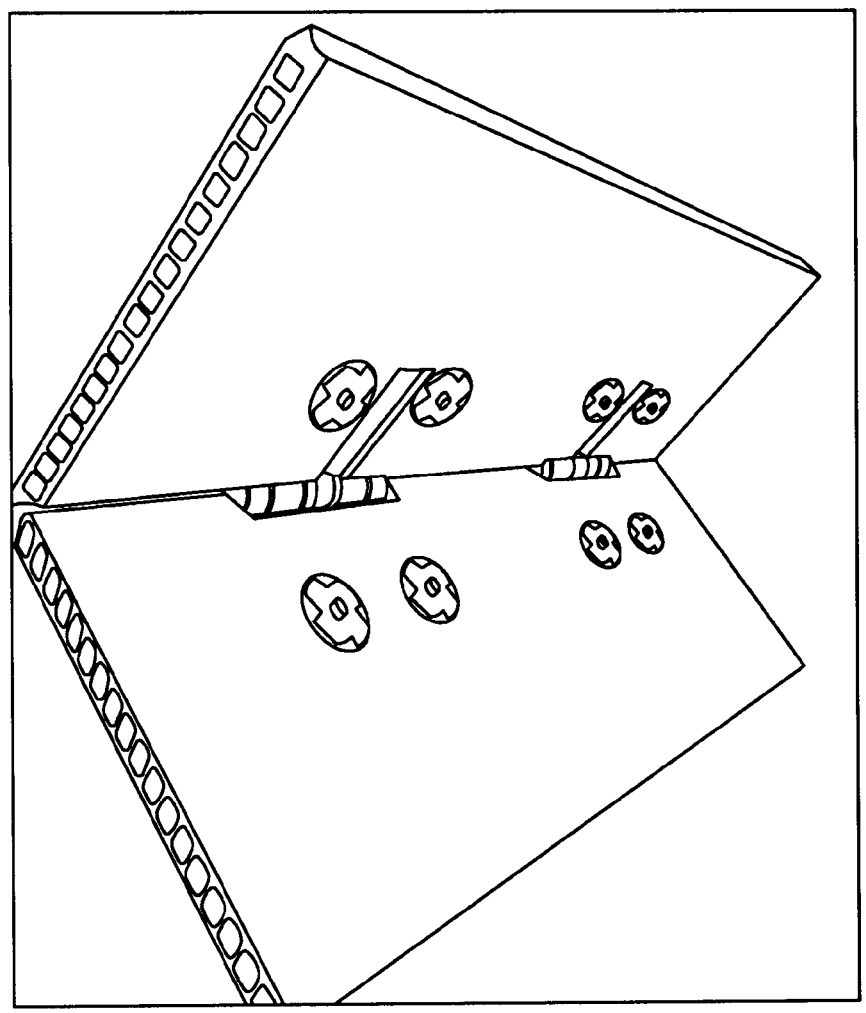
Figure 44:
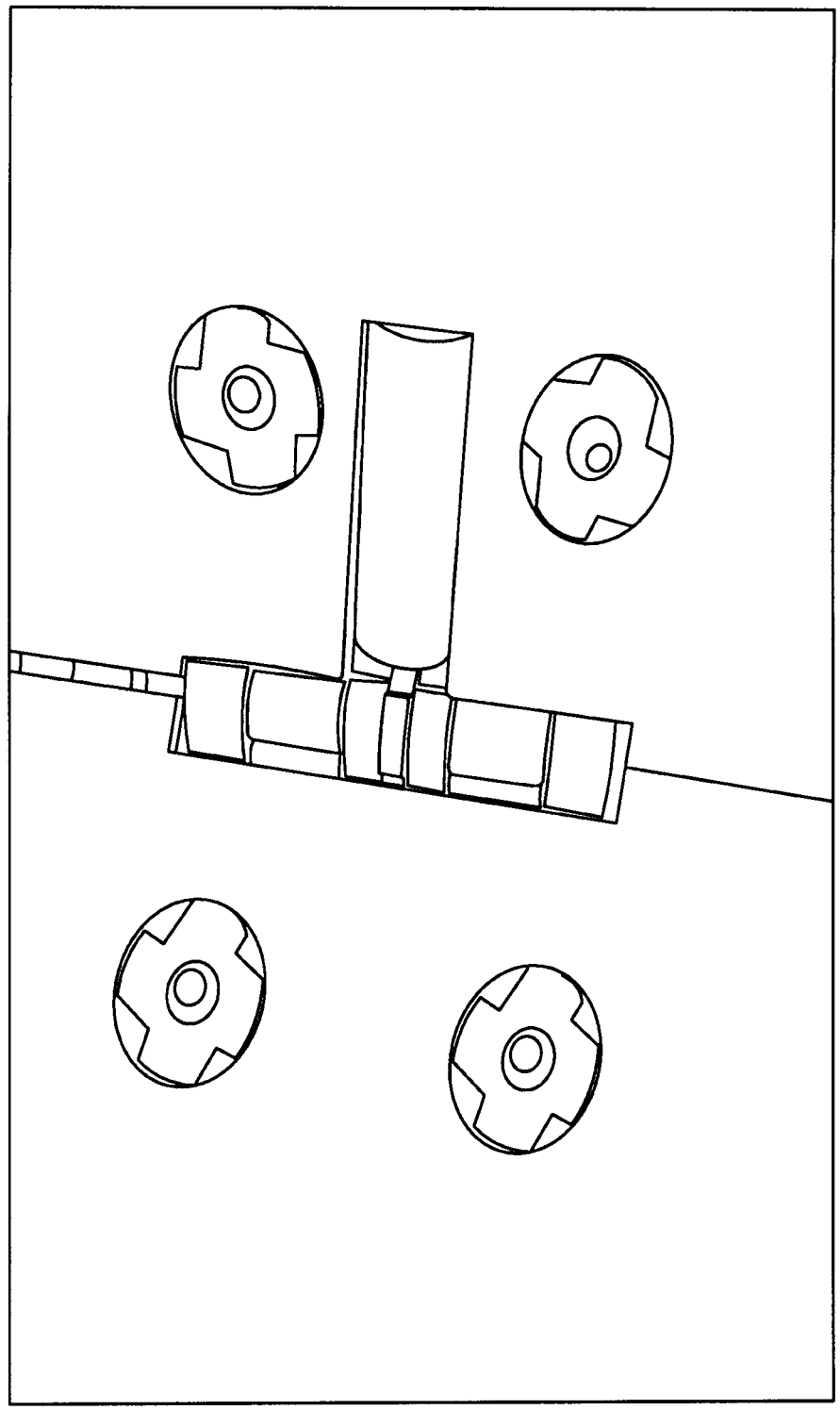
Figure 45:
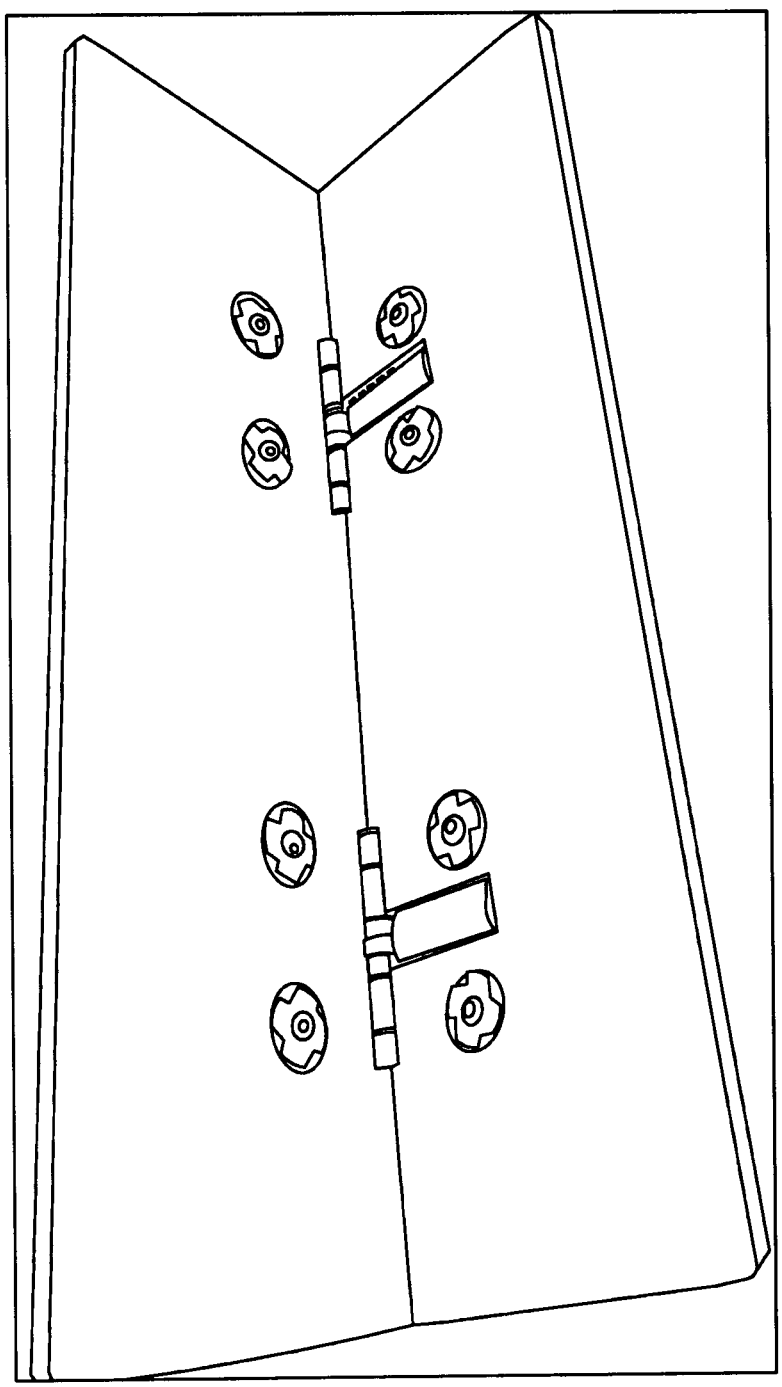
Figure 46:
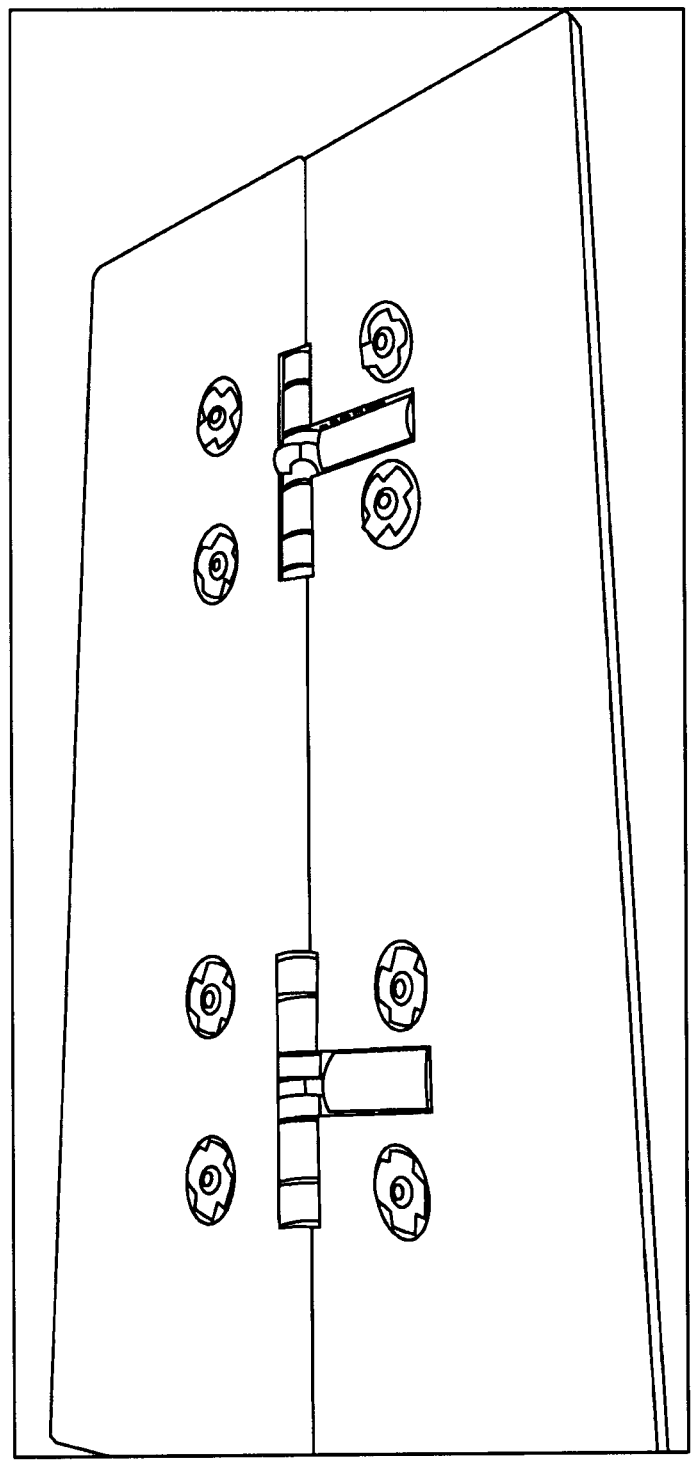

FIG. 43 shows the exemplary hinge in an "L" configuration. In fact, as noted, the ball entering into the U-shaped cutout can emit a sound, for example, a kind of a click, so that the user knows he or she has reached the second stopping position of the hinge. FIG. 44 is a close up view of the hinge just before the ball is latched into the U-shaped cutout. In fact the U-shaped cutout is visible just to the left of the spring cylinder and the hinge is here positioned at approximately 110° angled between the two plates. FIG. 45 depicts the same hinge again in the "L" configuration, and FIG. 46 once again shows a close up of the hinge in the first stopping position, the so-called flat or 180 degree orientation of the two panels. Here one can easily see the cam with the U-shaped cut out approximately at a 90° angle from the horizontal, as well as the fact that the portion of the cam that mates with the spring loaded ball here has a normal and not recessed radius.

The example prototype of FIGS. 42-46 uses a metallic hinge. This can add weight, and is generally not desired. Thus, as next described, an exemplary self-locking hinge can be made of plastic or resin, for example, and operate essentially in the same fashion.

Figure 47:
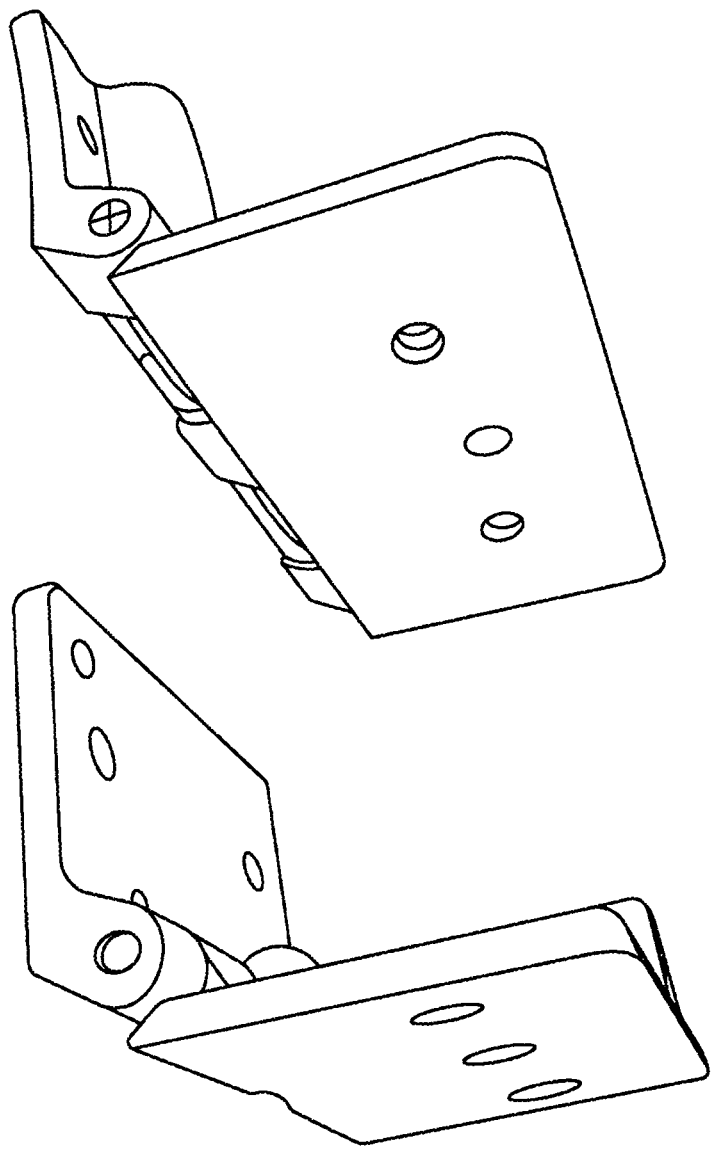
FIG. 47 shows two exemplary 90° hinges in their 90° position according to exemplary embodiments of the present invention.
Figure 48:
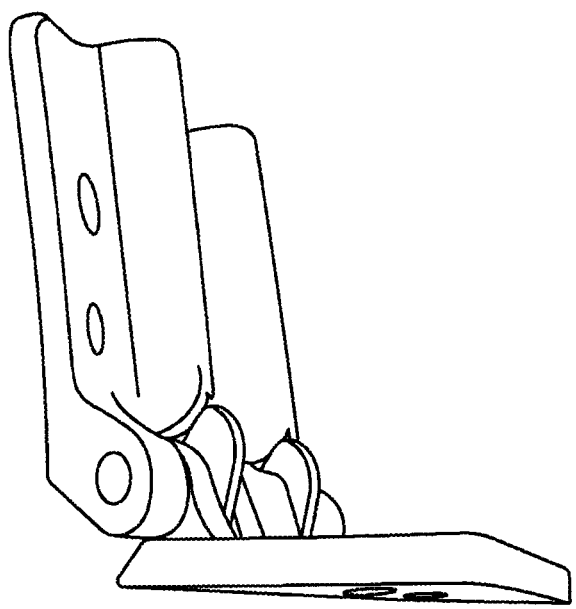
FIG. 48 is a side view of the same hinges from FIG. 15 showing detail of the barrels.
Figure 48:
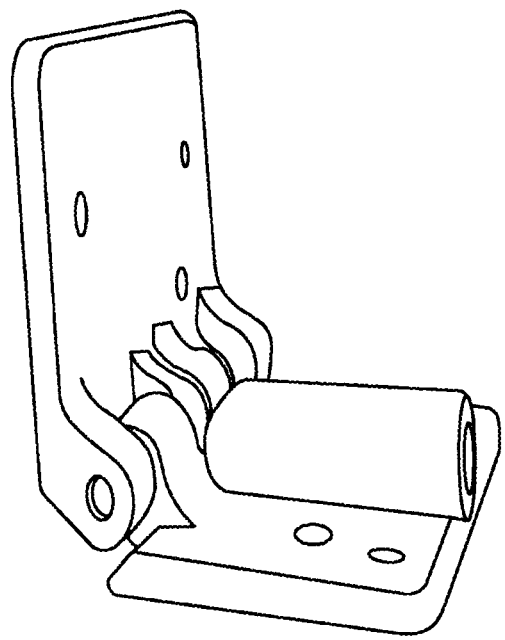
Figure 49:
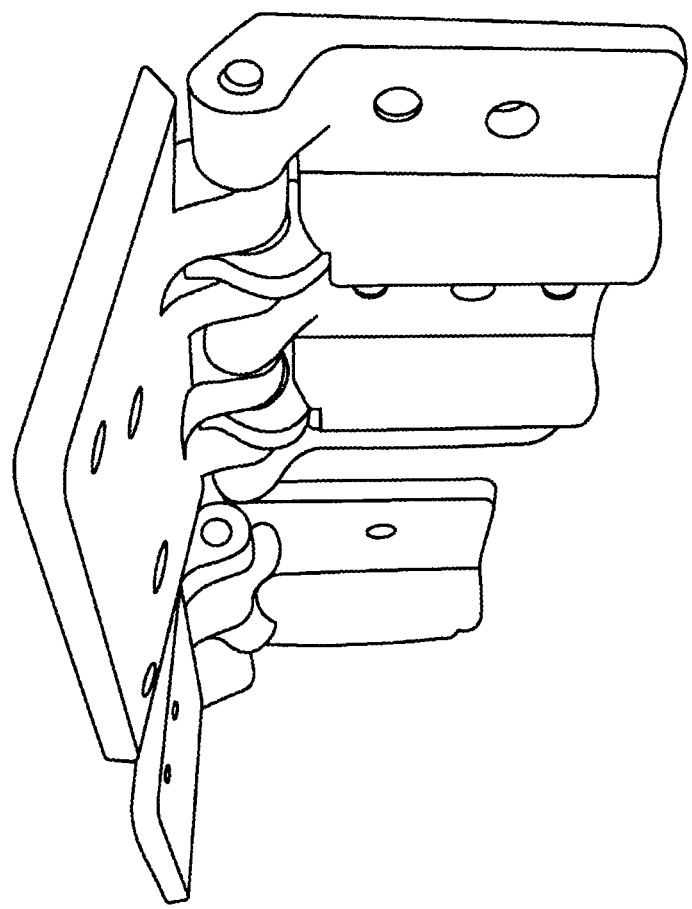
FIG. 49 is an alternate side view of the exemplary 90° hinges of FIG. 15 now shown as they would normally be positioned in an article of luggage.
Figure 50:
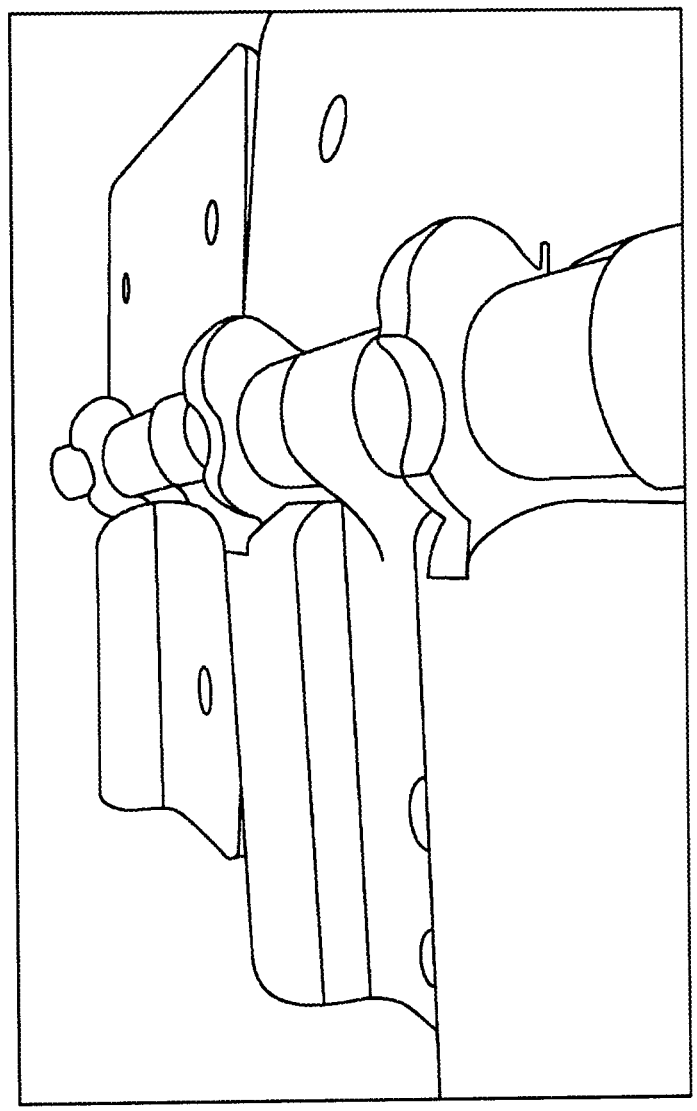
FIG. 50 illustrates a side view along the axes of the two exemplary hinges of FIG. 17 with the two hinges in the zero degree position.

FIGS. 47 through 50 thus show plastic versions of 90 degree hinges according to exemplary embodiments of the present invention. Visible in FIG. 47 are a single barrel version and double version of the 90 degree hinge. This is seen more completely in the view presented in FIG. 48, where the camera has moved from the left of the hinge to the right side of the hinge and therefore the barrels are now visible. FIG. 49 shows the exemplary 90 degree hinges as provided on a horizontal surface simulating the configuration they would have when fastened to a plate in a piece of luggage. Finally, FIG. 50 is a close up view of the double barrel 90 degree self-locking hinge in the foreground, and in the background a single barrel 90 degree self-locking hinge is shown. The concavity in the cam is precisely at the 90 degree position.

Exemplary Prototype Manually Locked Hinge

Figure 51:
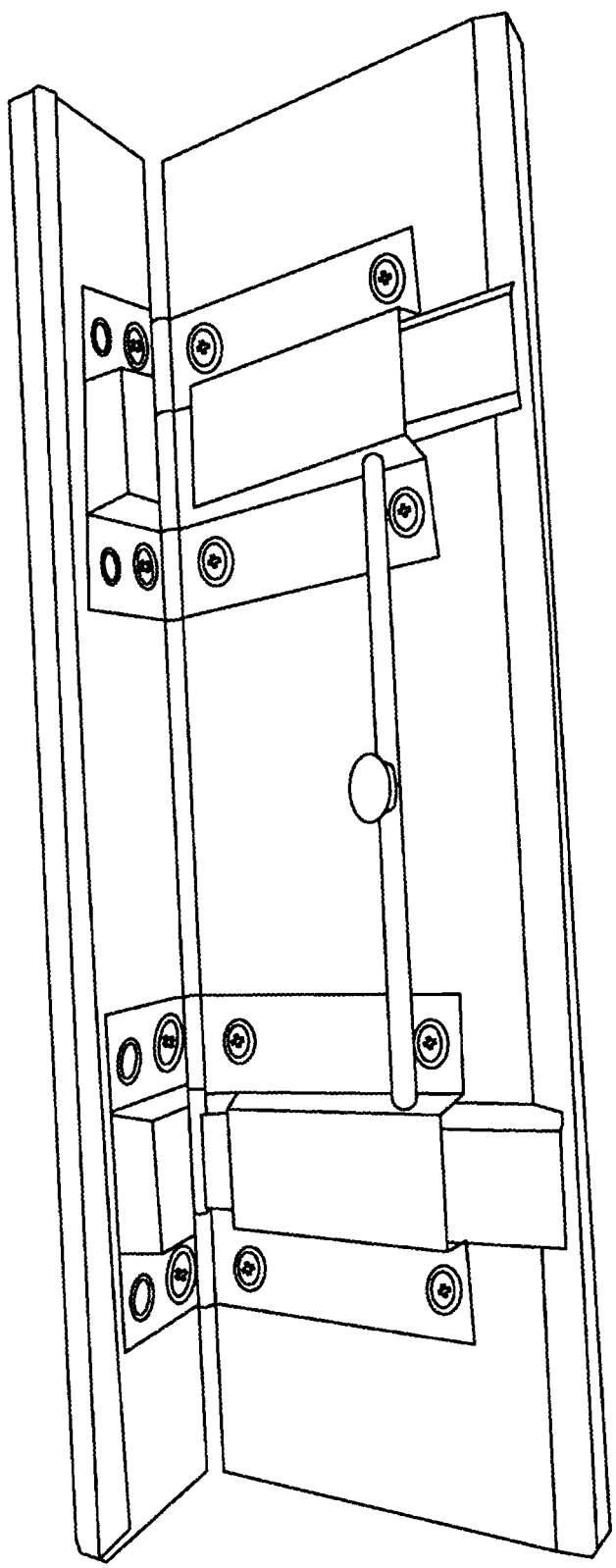
FIGS. 51-56 depict various views of an exemplary prototype of the hinge of FIGS. 2,3 and 5 according to an exemplary embodiment of the present invention.

FIGS. 51-56 depict various views of an exemplary prototype of the hinge of FIGS. 2, 3 and 5 according to an exemplary embodiment of the present invention. This is a manually activated hinge and locking mechanism and therefore there would have to be, for example, a zippered flap or other access panel provided in the bottom of the luggage so that a user could open or unzip it, reach in and lock or unlock the mechanism as necessary to expand or collapse the luggage. As can be seen in FIG. 51 there are two vertical bars that move in and out of corresponding receiving holsters on the other side of the hinge. To activate a user pushes on the button shown on the bottom center of the image to lock or unlock those vertical bars into or from their respective receptacles.

Figure 52:
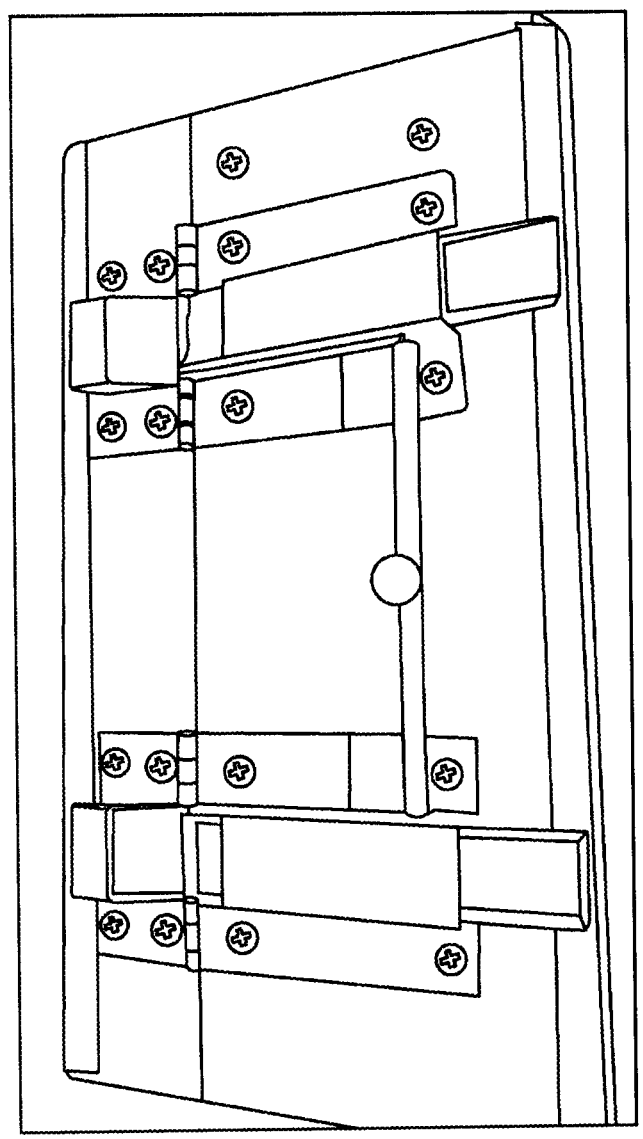
Figure 53:
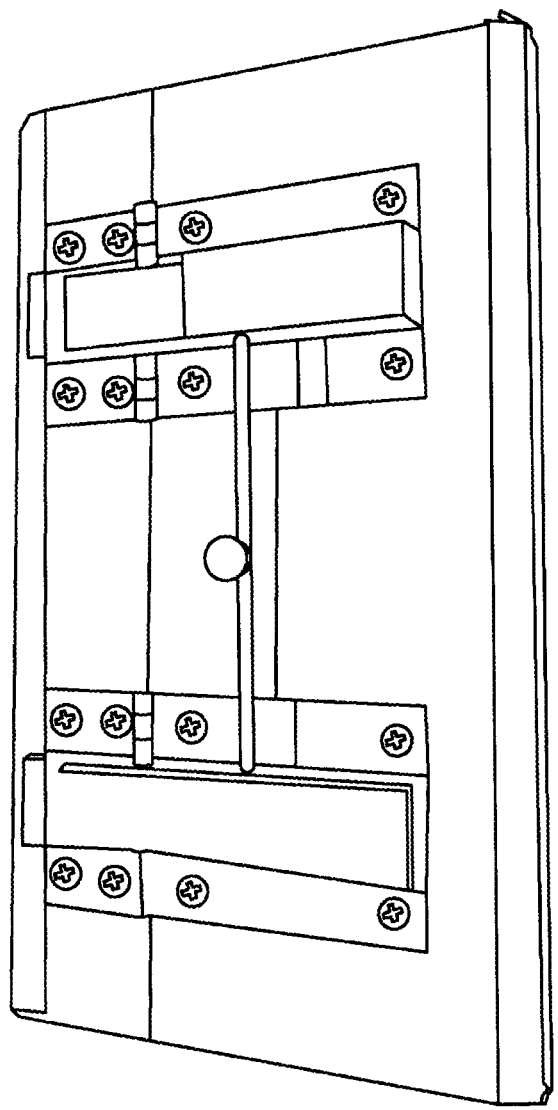

FIG. 52 shows the exemplary hinge in the coplanar but unlocked position, and FIG. 53 shows the effect of the user pushing on the button and locking the vertical bars into their receptacles. Now the luggage is in the fully expanded state.

Figure 54:
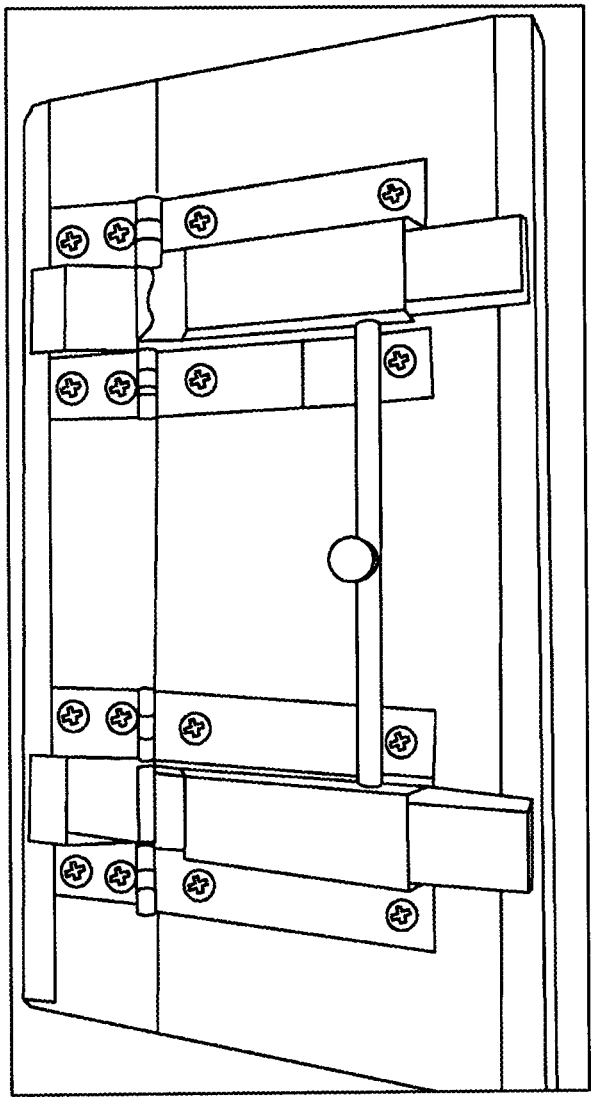
Figure 55:
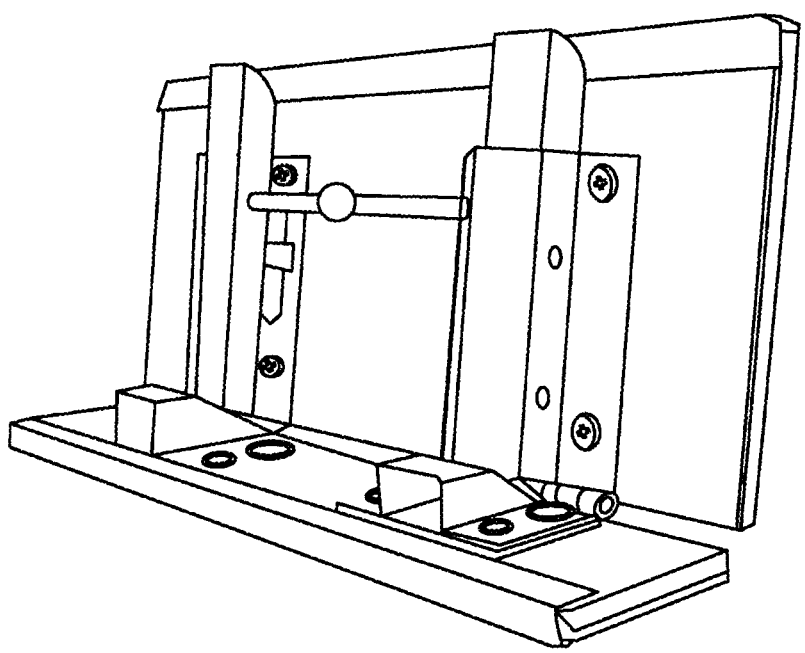

FIG. 54 shows the exemplary luggage being collapsed. The first step, as shown, is to unlock the two portions of the bottom plate. FIG. 55 shows the bottom plate now having been rotated essentially vertically to assume the collapsed position. It is noted that in FIG. 55, the portion that actually sits vertically is the one that is laying horizontally in the photograph. Here, for ease of illustration the hinge has been placed on its side to take advantage of the viewing angle, but in actuality for maximum compression it is the shorter portion of the bottom plate that remains stationary and the longer portion that is rotated upwards (and thus subtracted from the compressed depth) Given the relative size of the vertical bars and the locking mechanism and the receptacles, it is clear that the panel on the short side of the hinge is the one that remains stationary.

Figure 56:
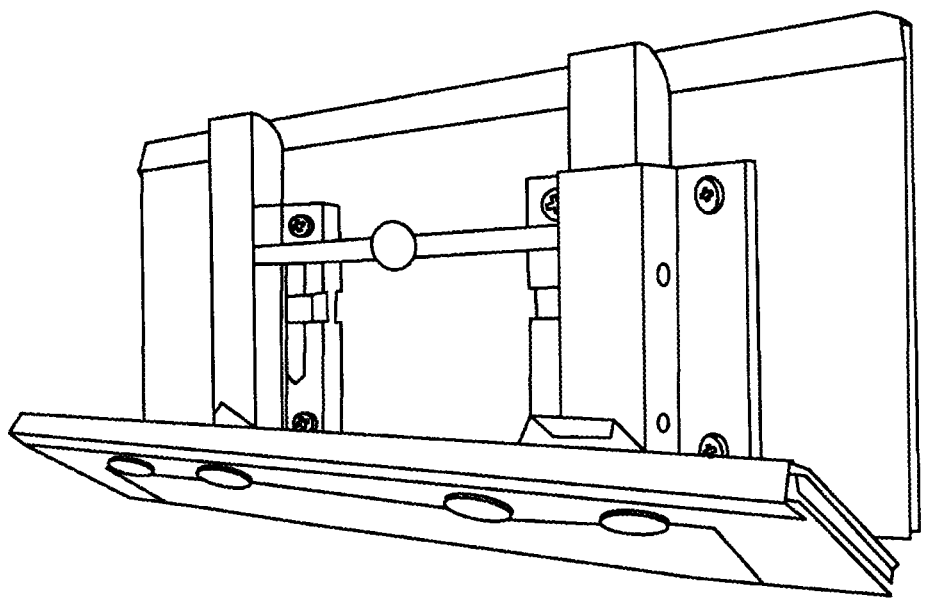

FIG. 56 shows one of the possible drawbacks of manual type hinges of the kind shown. Unlike the self-locking mechanism, there is no hard stop at a 90° angle—or any angle for that matter. Thus, although the luggage can easily be compressed using this type of hinge locking mechanism, a user does not know when she is done pushing on the bottom of the luggage so as to fold it upwards and she may push farther than is necessary to achieve compression. It can be seen how having a natural "stop" provided in such a hinge is most useful.

Exemplary Prototype Injection Molded Bottom Panel

Figure 21:
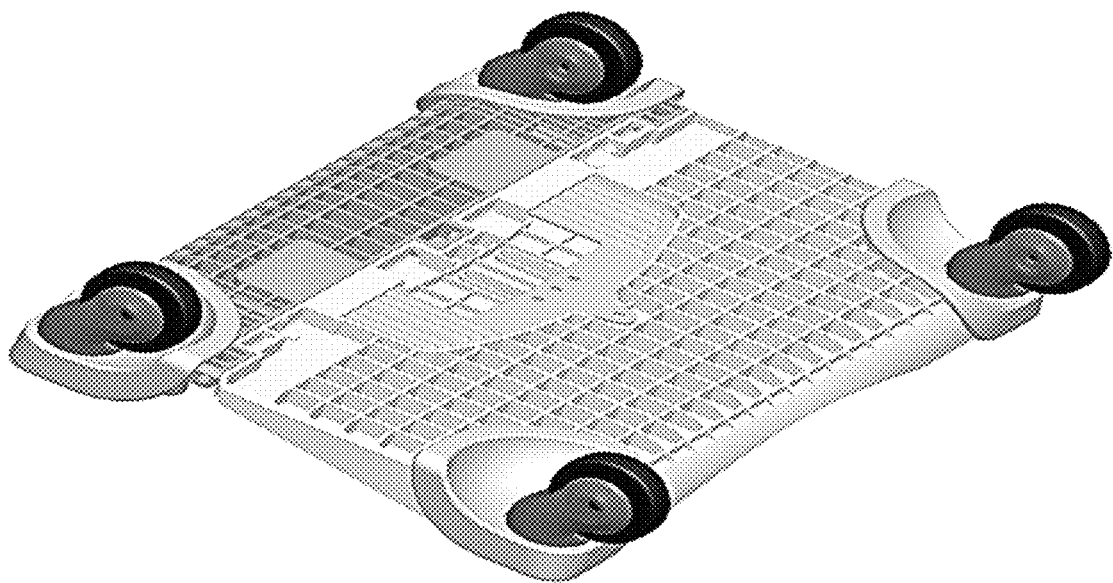
FIG. 21 depicts an underside view of the exemplary injection molded bottom panel of FIG. 20.
Figure 22:
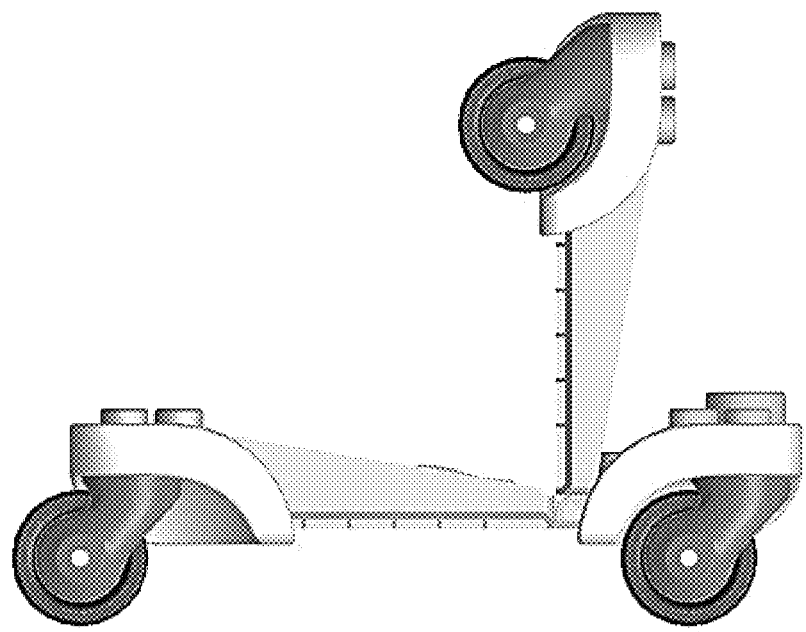
FIG. 22 depicts a schematic side view of the exemplary bottom panel of FIGS. 20-21 with the front section in each of an extended and folded configuration according to an exemplary embodiment of the present invention.
Figure 57:
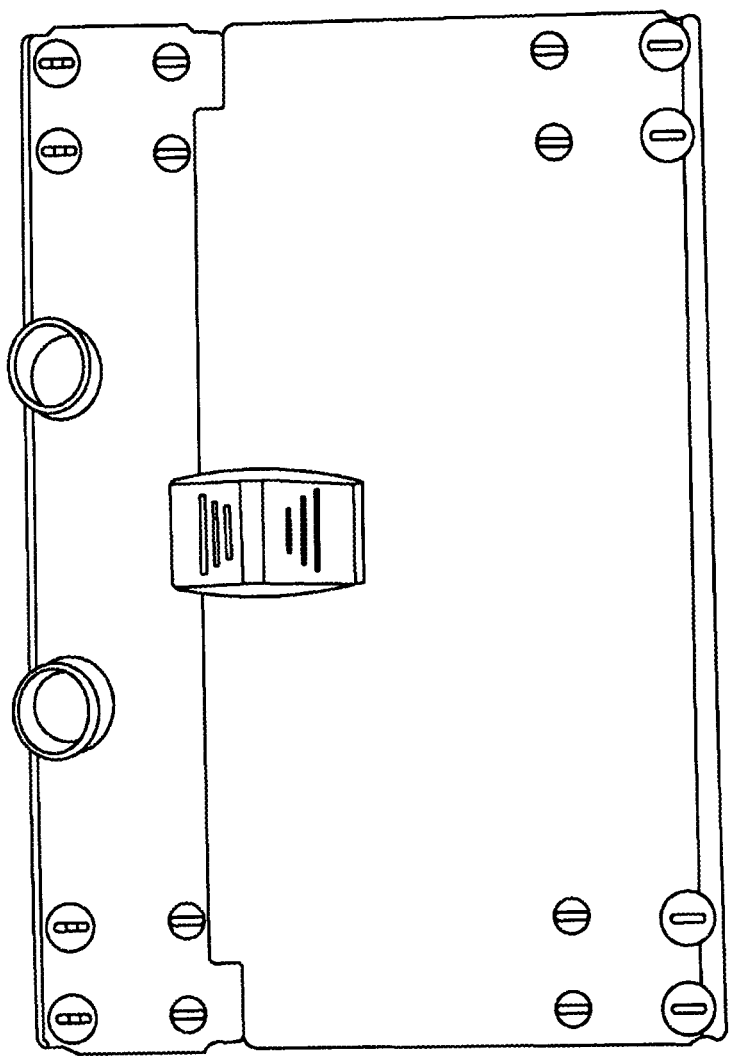

FIGS. 57-61 depict various views of an exemplary prototype of the injection molded bottom panel of FIGS. 20-21 according to an exemplary embodiment of the present invention. With reference to FIG. 57, the short portion of the bottom plate is the one that will remain stationary. It is also the one provided with the receptacle base for the telescoping handle. The tab shown in the center of the image is used to lock and unlock the two plates into and from the rigid bottom plate configurations so that collapse or expansion can occur.

Figure 58:
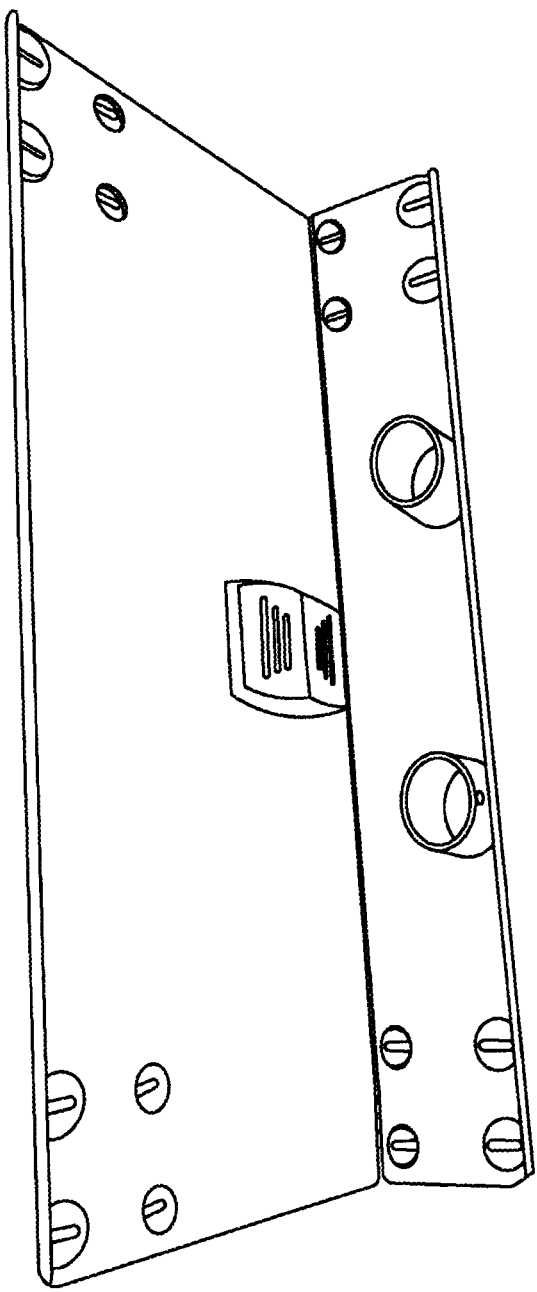
Figure 59:
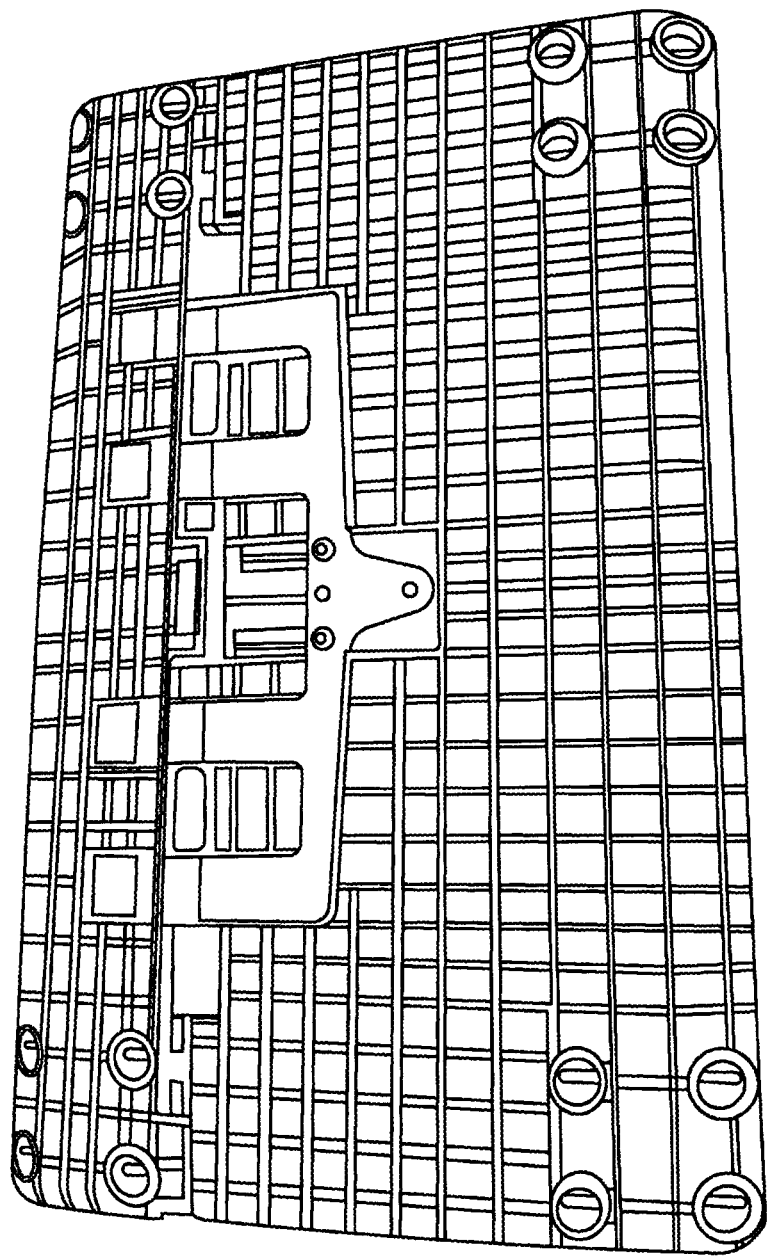
FIGS. 59-61 depict various views of an exemplary prototype of the injection molded bottom panel of FIGS. 20-21 according to an exemplary embodiment of the present invention.
Figure 60:
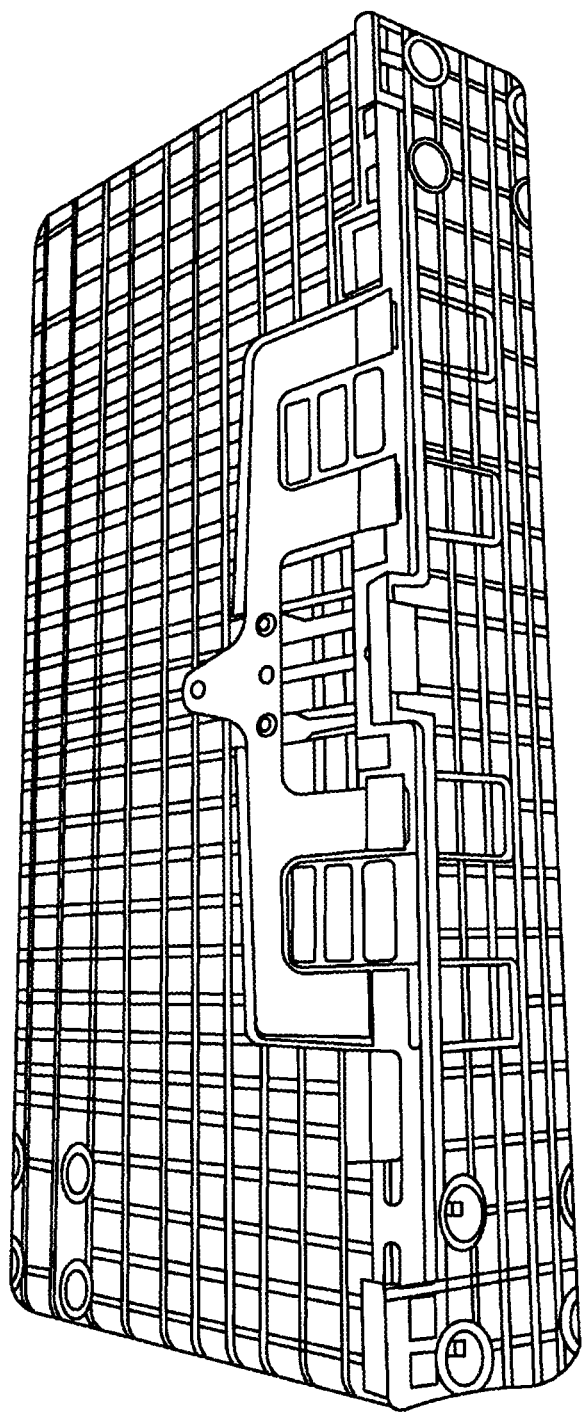

FIG. 58 shows the configuration of the exemplary bottom plate in a collapsed position. The long part of the bottom plate has been rotated upward to essentially a vertical position. FIG. 59 depicts a bottom view of the configuration of FIG. 57. Thus, there is seen a metal plate with four vertical bars which can be pushed through to the other side of the plate by the button shown in FIG. 57 to thereby lock or unlock the four bars into or from their corresponding mating receptacles. It is noted that the two pieces of this bottom plate are held together by two metal type axels at the right and left sides, respectively, and then in the center, the protruding center piece of the short side of the plate has an interlocking plastic connection with the larger side of the bottom panel, as seen in the underside view of FIG. 59. Other alternate connection schemes are also implementable. Finally, FIG. 60 shows an underside view of the configuration of FIG. 58, and FIG. 61 provides an alternate rotated view of the locked configuration of FIG. 59.

FIGS. 61A and 61B depict an alternate exemplary bottom plane with bottom cover plate attached thereto by a built in clasp, in each of an open and closed configuration, respectively. As can be seen in FIG. 61A, the three single barrel hinges that connect the two portions of the bottom plate are rather far back, near the back edge of the plate, and thus when the front portion of the bottom plate is rotated upwards, there is significant reduction in the depth dimension, causing a significant compression of volume. This is facilitated by the strong integrated double plate effect that ensues when the cover plate is closed and locked in the expanded configuration. At the same time, due to the use of the small vertical supporting ridges, the structure remains lightweight.

Exemplary Collapsible Luggage Prototype I

Figure 62:
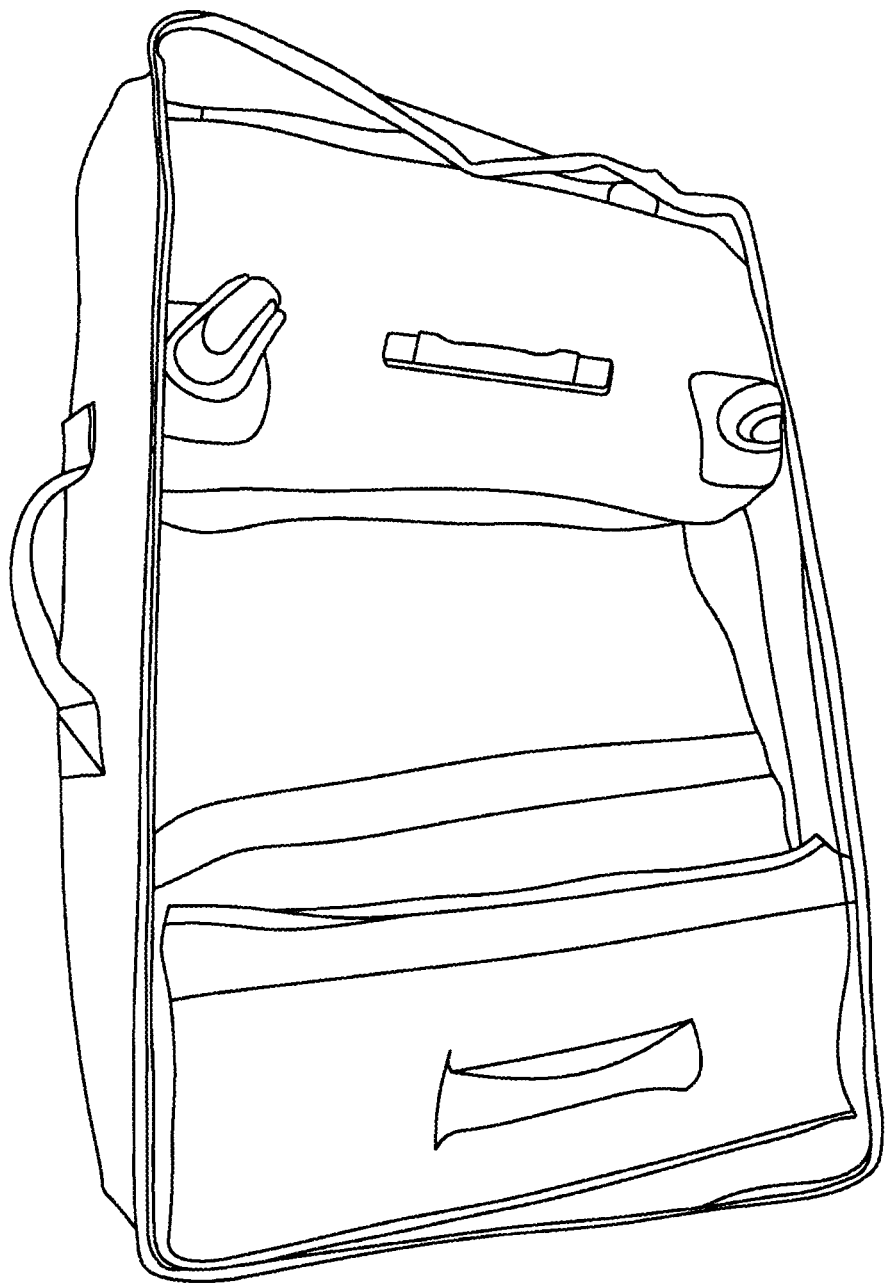
FIGS. 62-71 depict an exemplary prototype according to an exemplary embodiment of the present invention in various stages of expansion from a collapsed or folded configuration to a fully expanded configuration.
Figure 63:
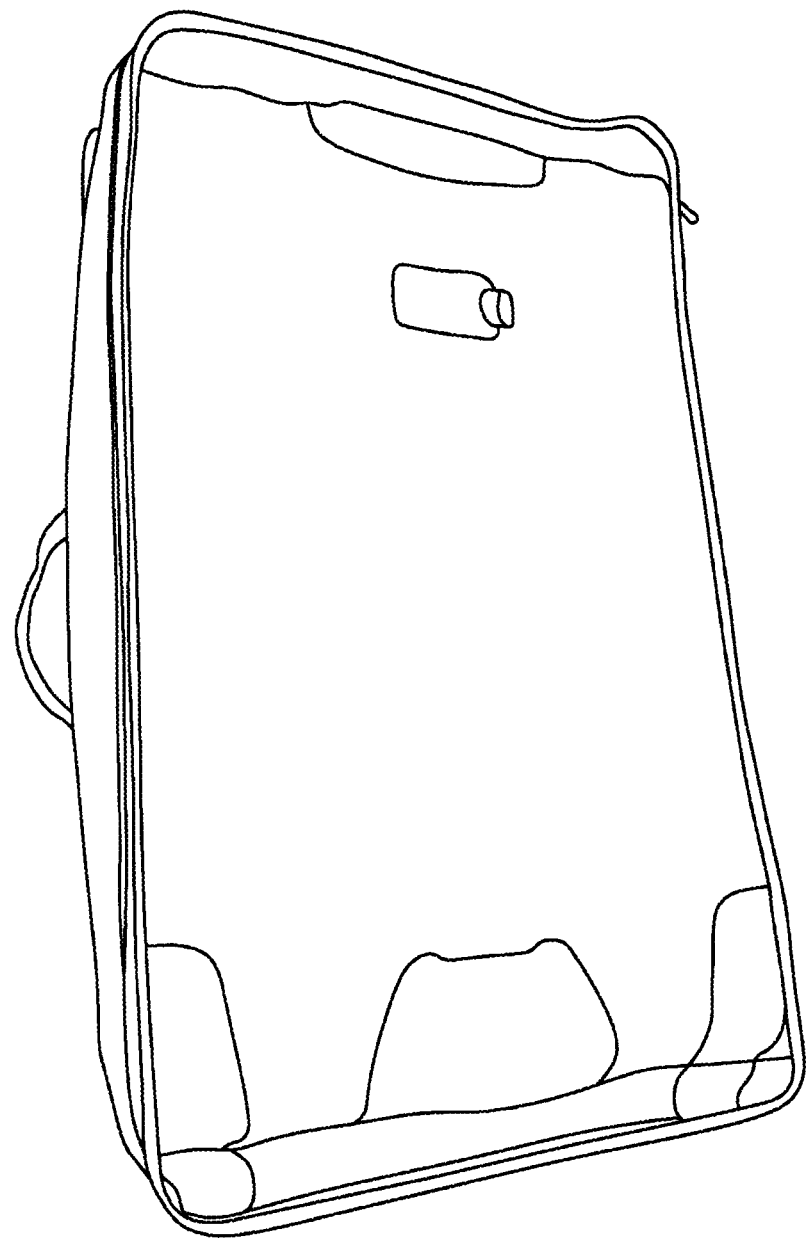
Figure 69:
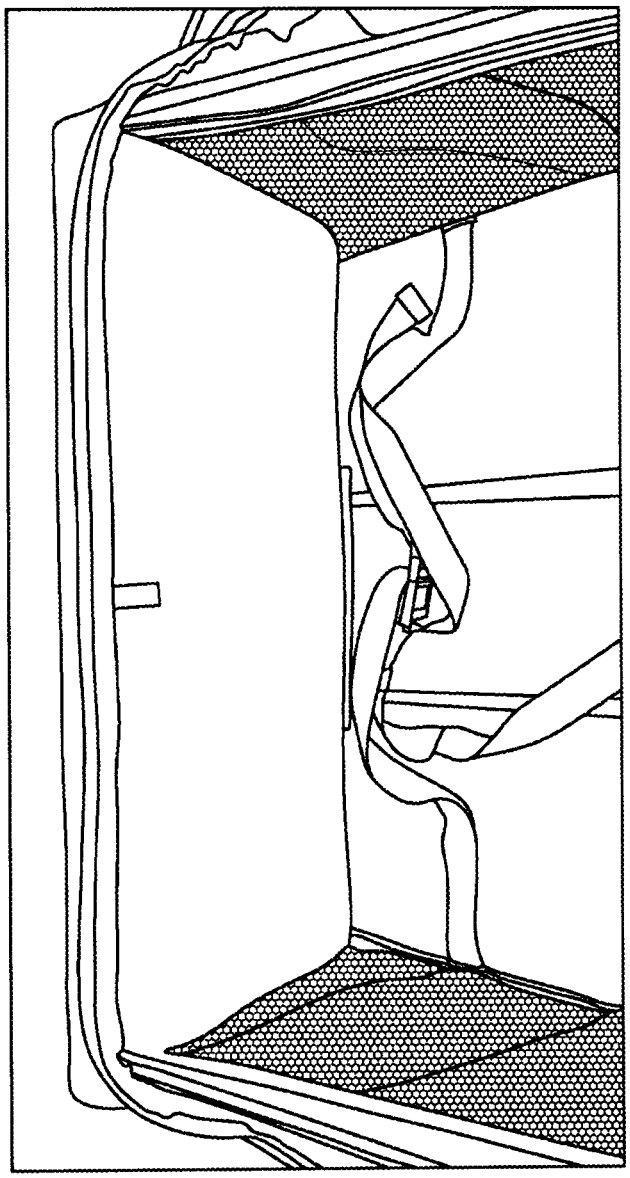
Figure 70:
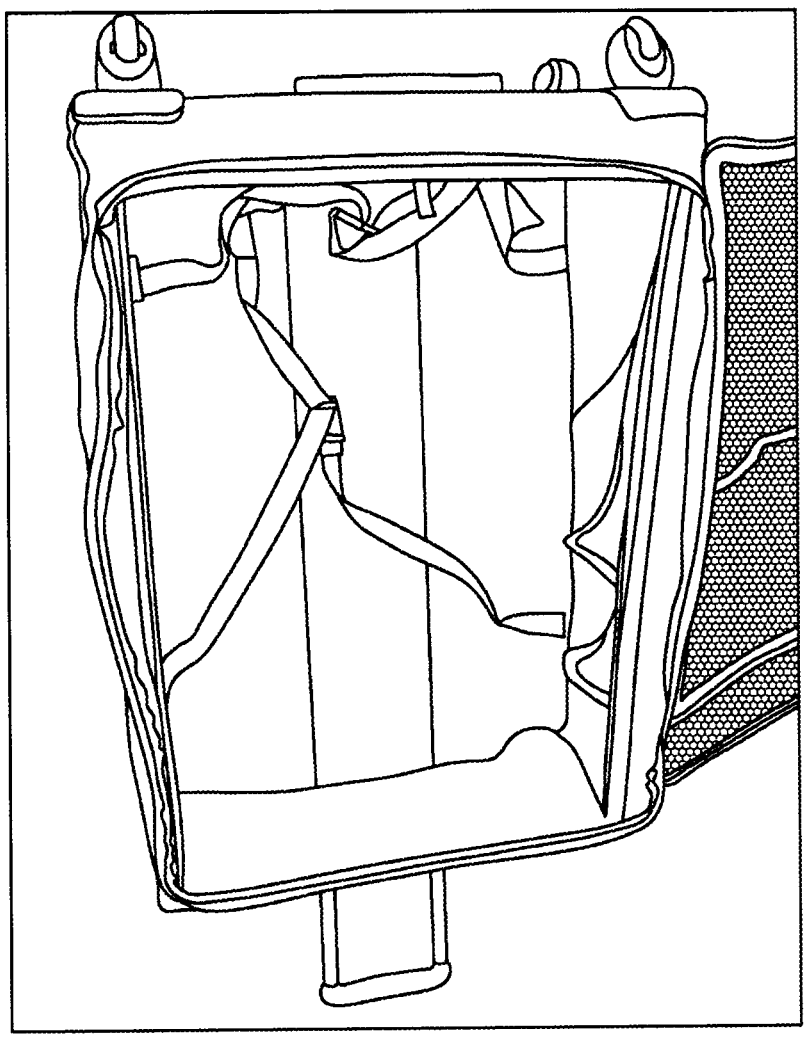
Figure 71:
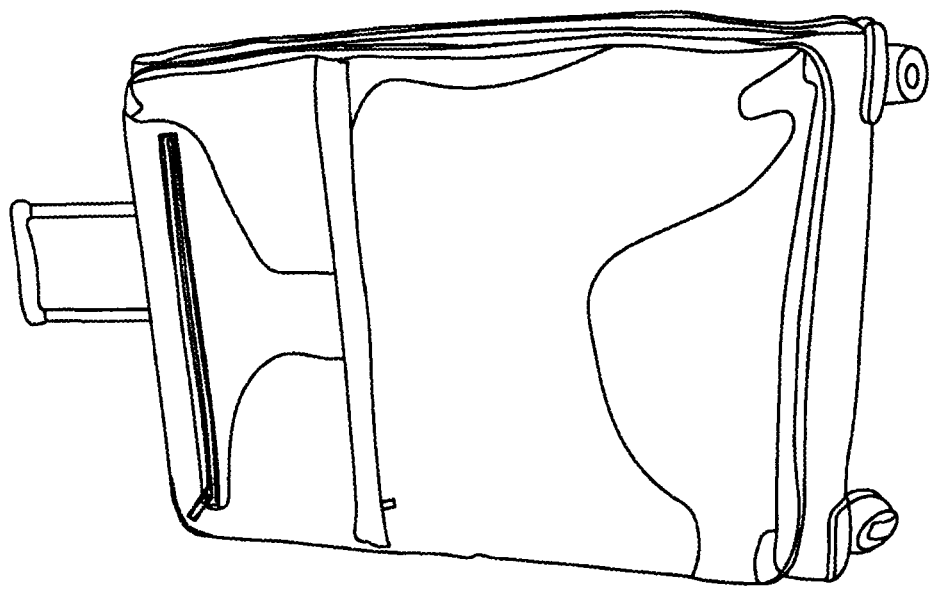

FIGS. 62-71 depict an exemplary prototype according to an exemplary embodiment of the present invention in various stages of expansion from (i) a collapsed or folded configuration as shown in FIG. 62, to (ii) a fully expanded configuration as shown in FIG. 71. With reference thereto, FIG. 62 shows a fully collapsed exemplary prototype according to an exemplary embodiment of the present invention within a transparent carrying case, and FIG. 63 shows the reverse of this view. The article of luggage depicted is a four wheeled prototype as can be seen by the front bottom wheels protruding from the now folded over bottom plate of the luggage.

Figure 64:
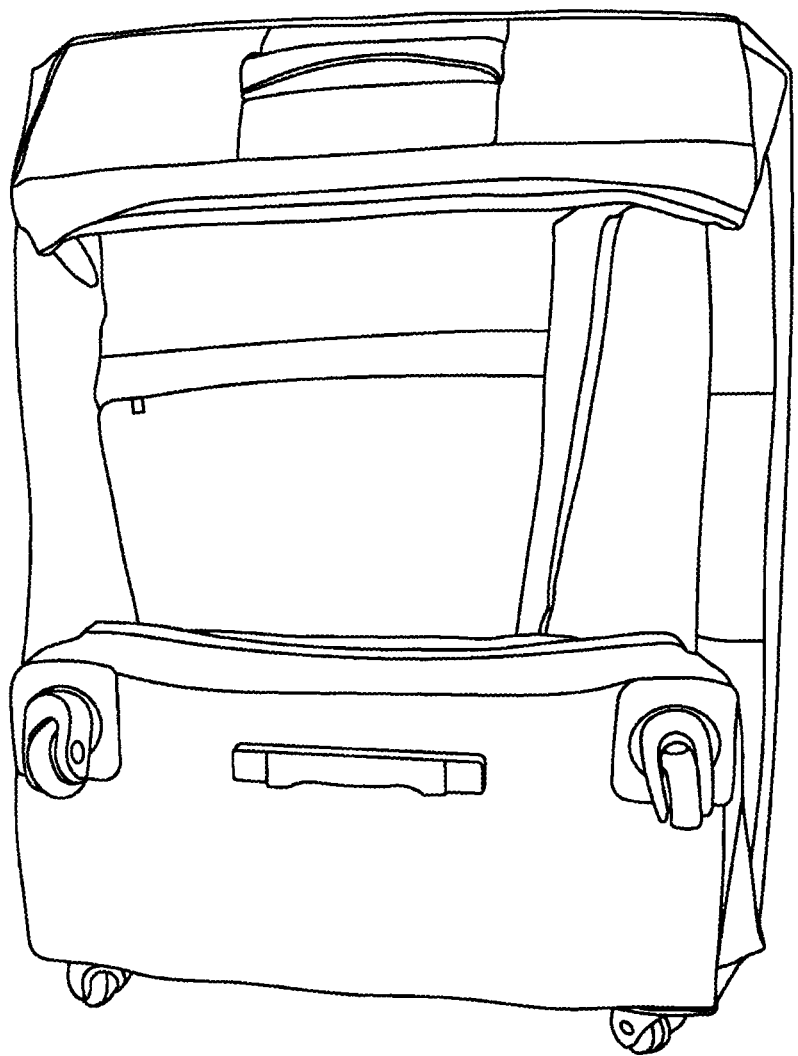

FIG. 64 shows the article removed from the carrying case. It is here noted that the luggage is in a semi-shiny nylon type fabric which can be provided in a variety of vivacious decorator colors and coordinated to the plastic transparent case as described below.

Figure 65:
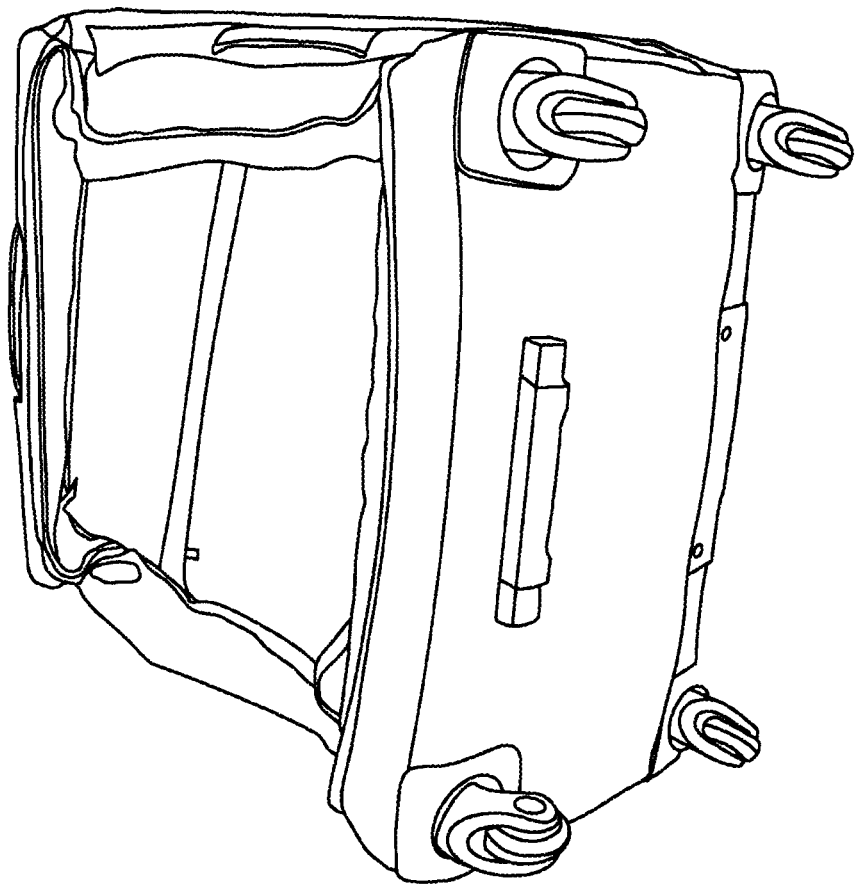

FIG. 65 shows a first step in expanding the exemplary article of luggage. Here the bottom plate has been extended to have a coplanar relationship between the front and the rear portions which are connected by an exemplary hinge or hinges. One can also see the rear wheels and the base of the telescoping handle being affixed to the (rigid) rear portion of the bottom plate which does not become bent in the collapsing process.

Figure 66:
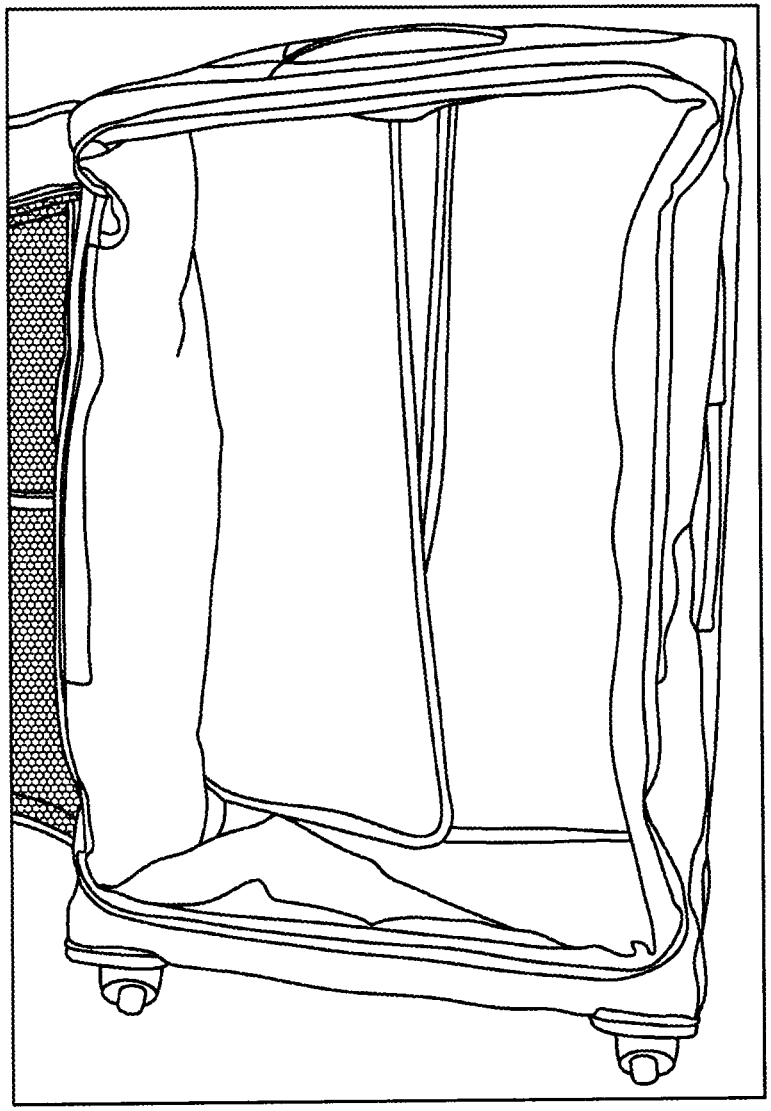
Figure 67:
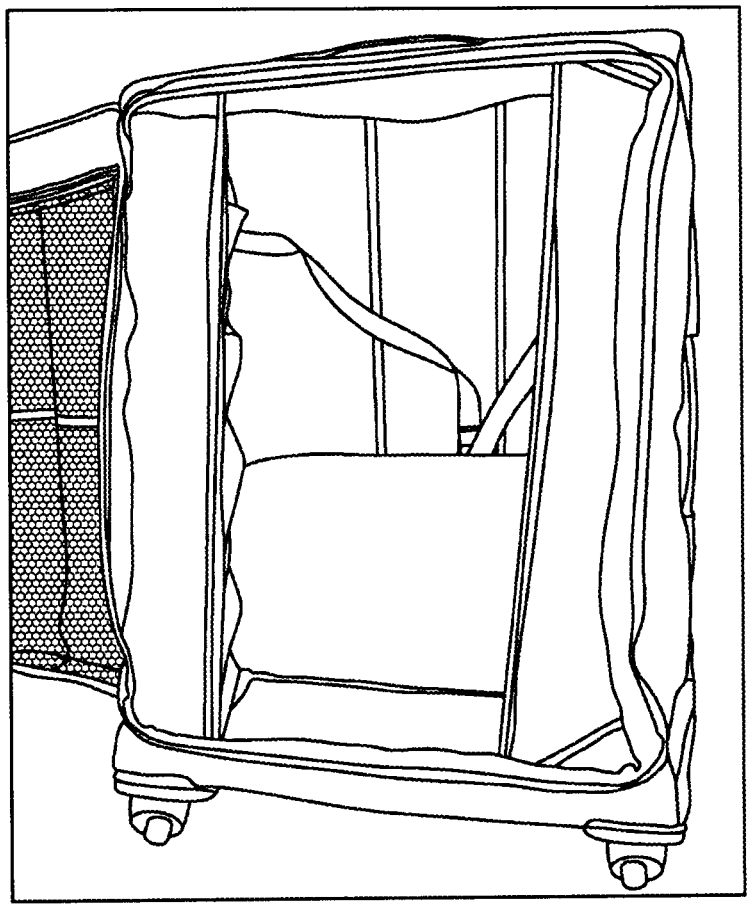

FIG. 66 depicts the now still folded side wings as attached to the sides of the luggage at the rear portion of each side, essentially where it intersects the rear planar surface of the luggage. In general, if the side panels are attached to the interior of the sides of the luggage, less gapping will occur between the side of the luggage and the structural side panels when extended and attached. FIG. 67 shows how underneath the now expanding outward side panels, the bottom cover plate can be seen. Here it is still in its collapsed position and thus essentially parallel with interior surface of the rear surface of the luggage. The two cylinders for holding the telescoping poles for the handle are also visible, underneath the fabric at the backplane of the luggage.

Figure 68:
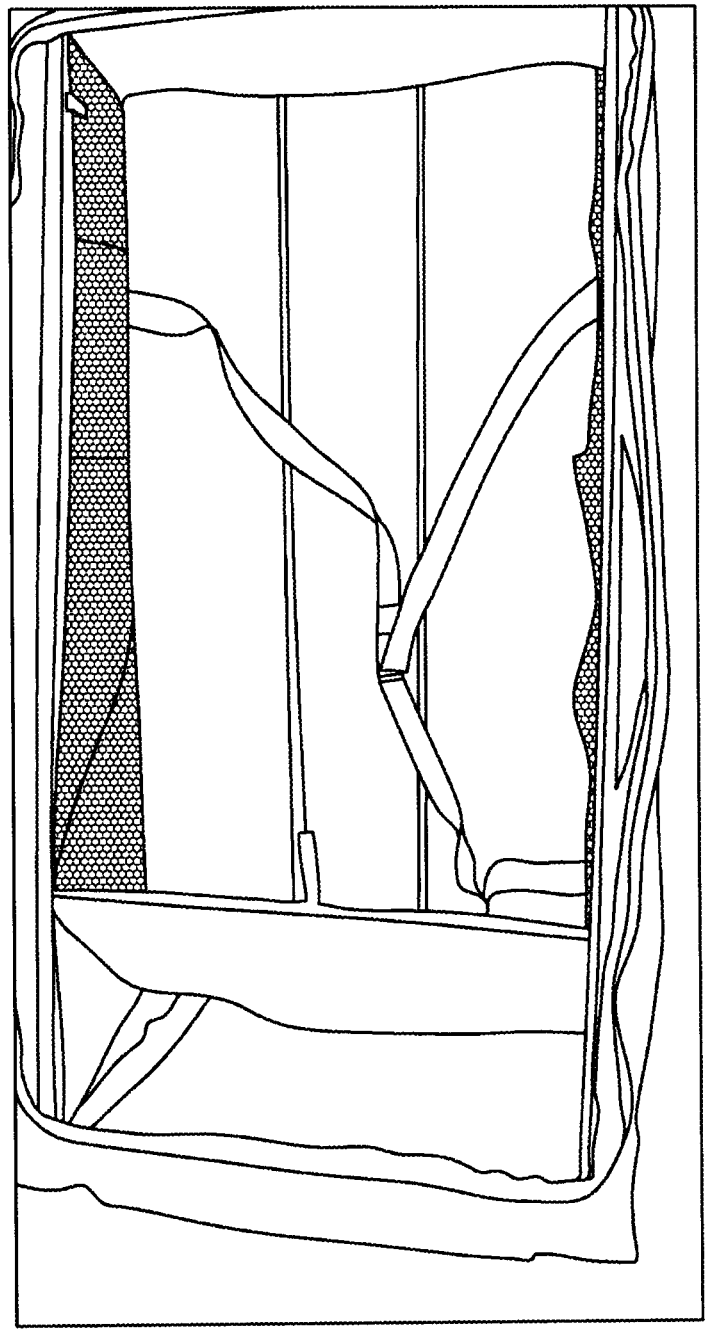

FIG. 68 depicts the bottom cover plate being swiveled downwards, where the side wings have already assumed their fully expanded position. The side wings can be provided with, as shown, pockets, such as of netting, or any other type, just as in conventional luggage.

FIG. 69 shows the bottom cover now fully extended and lying perpendicular to both the side wings and to the rear surface of the luggage, and being substantially parallel to the bottom plate of the luggage. In alternate embodiments the bottom cover can be attached various mechanisms to the bottom plane of the luggage so as to hold it in place. FIG. 70 is a synoptic view of the entire interior of the now expanded luggage, and FIG. 71 shows the exemplary luggage piece of FIG. 43 with the front flap now zipped on. It is noted from looking at FIG. 71 that the front flap can be permanently attached to a portion, here a central portion, of the left side panel and, as shown, has been folded over and zippered to connect with the remainder of the left side panel and the top, right side, and bottom panels respectively. Additionally, the telescoping handle has been extended and the luggage is now in a position to be moved around.

Exemplary Collapsible Luggage Prototype II

FIGS. 72-83 depict an alternate exemplary prototype according to an exemplary embodiment of the present invention in various stages of compression from (i) a fully expanded configuration to (ii) a collapsed or folded configuration, and then, once compressed, being inserted into, and transported using, a transparent carrying case.

Figure 72:
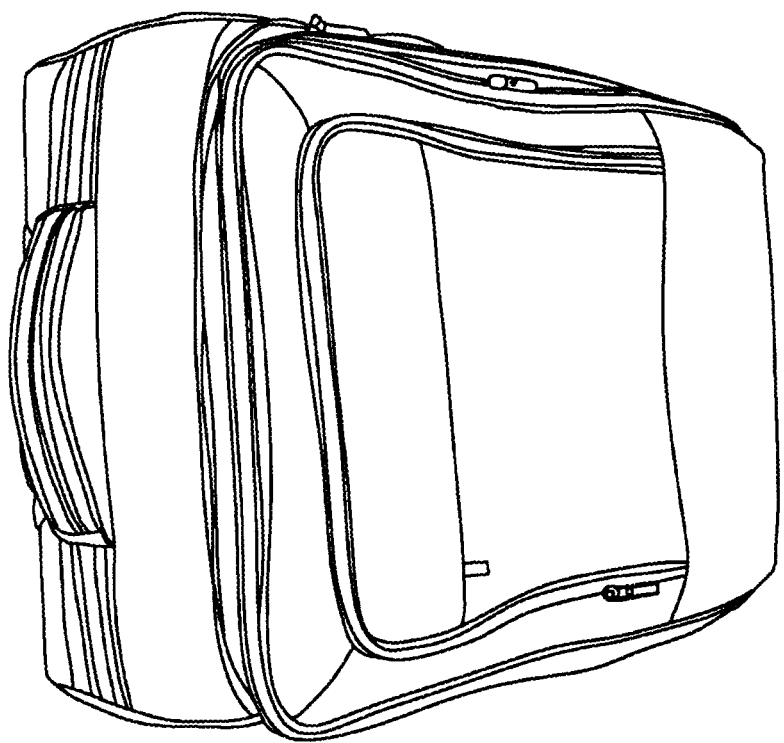
FIGS. 72-83 depict an alternate exemplary prototype according to an exemplary embodiment of the present invention in various stages of compression from a fully expanded configuration to a collapsed or folded configuration.
Figure 73:
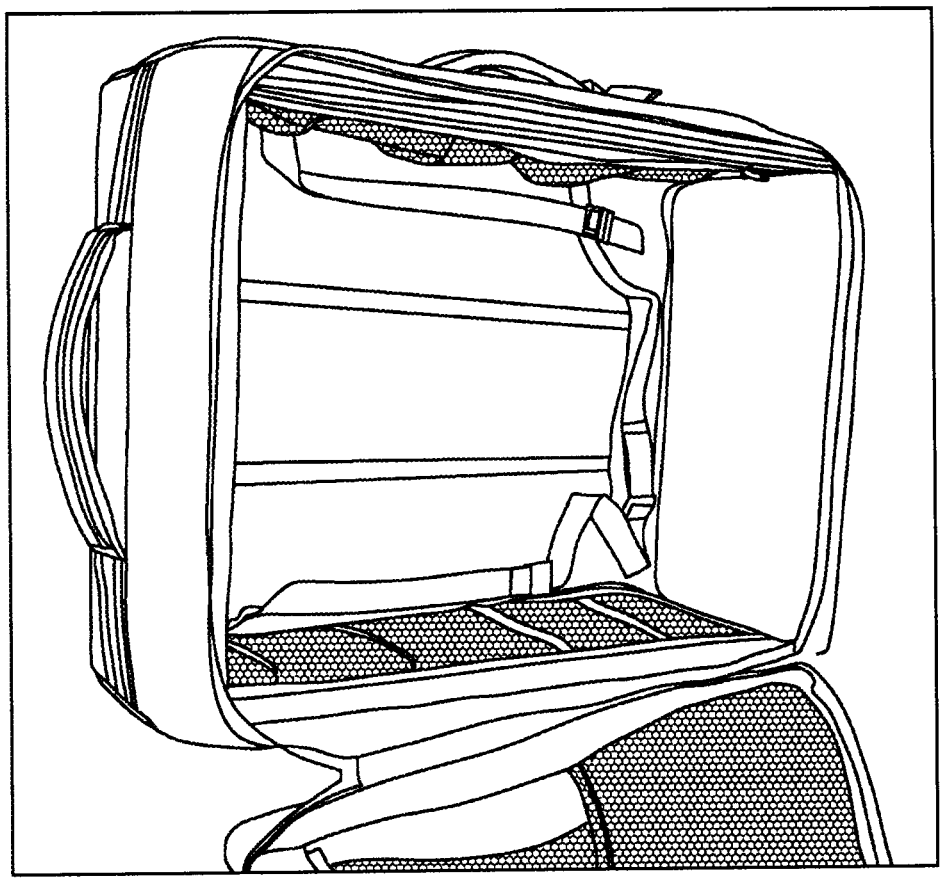

FIG. 72 shows the exemplary article of luggage standing upright in its fully expanded configuration. FIG. 73 shows the front flap totally unzipped and opened. It is noted from looking at the left side of FIG. 73 that the front flap is only permanently affixed to a portion of the left side panel, but not all, here about a half or two thirds of the length, and that it is affixed to the remaining portions of the left side and to the remaining panels (bottom, right side and top) only via a zipper. This makes it easier to fold over the collapsed bottom portion with the wheels sticking out, as described below.

Figure 74:
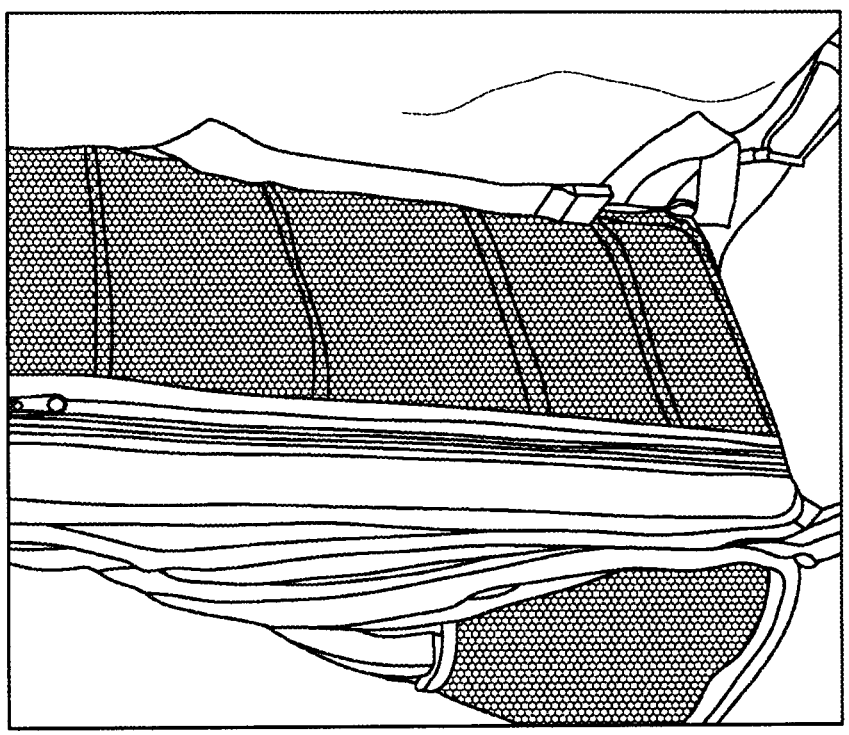
Figure 75:
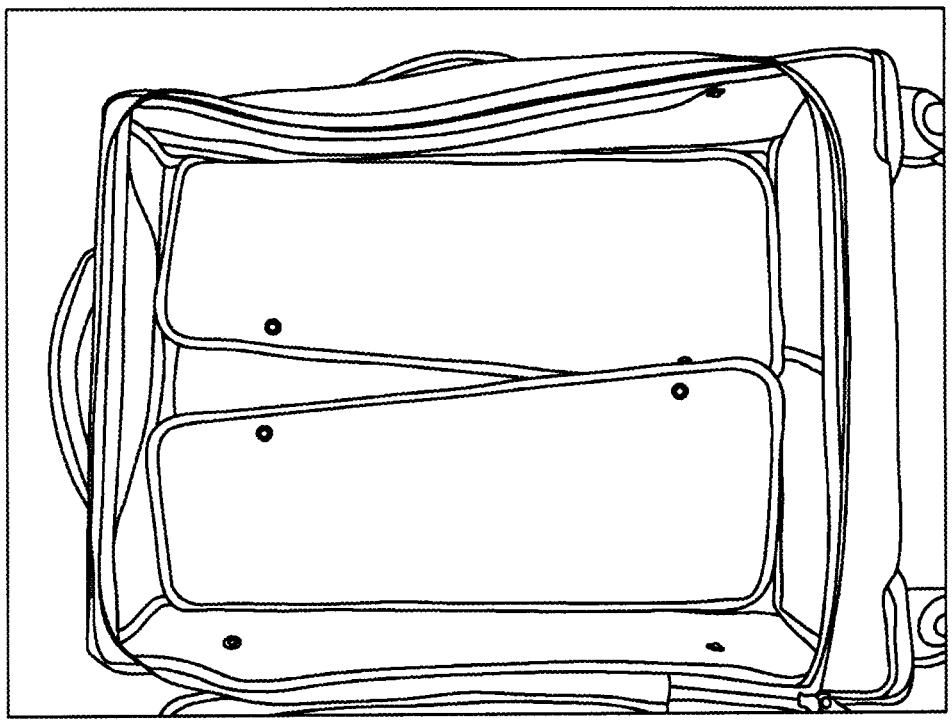

FIG. 74 is a close up shot of the left side wing in its fully extended position. It shows an exemplary pocket made of netting, closable by a zipper, but alternatively any type of pocket, with any type of closing mechanism can be used. In this exemplary embodiment, the side wings are attached to the interior of the left and right side panels by snaps, as shown in FIG. 75 where the two wings have already been collapsed. The mating portion of the snaps, or other affixation means or devices, such as, for example, Velcro, can be embedded into the fabric of the left side and right side interiors, as shown.

Figure 76:
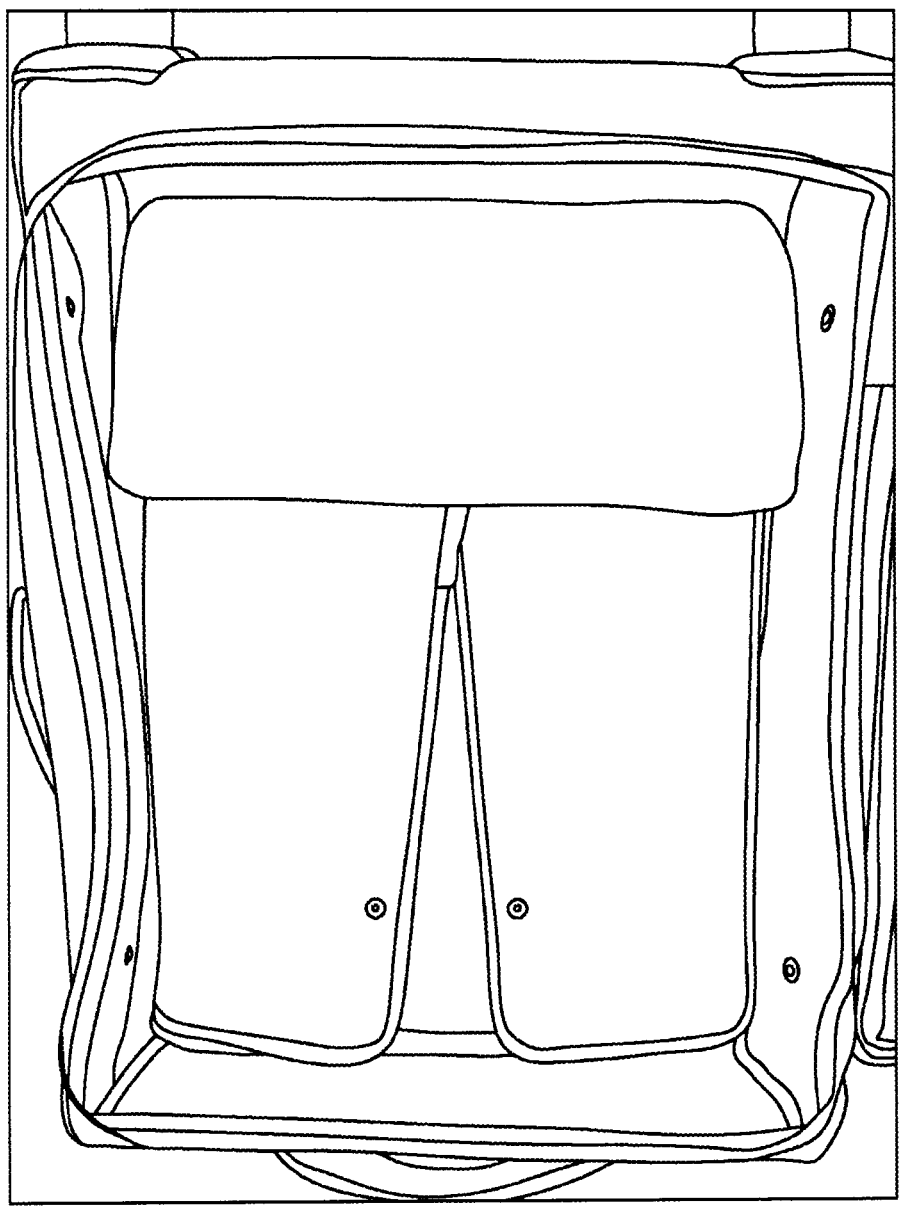
Figure 77:
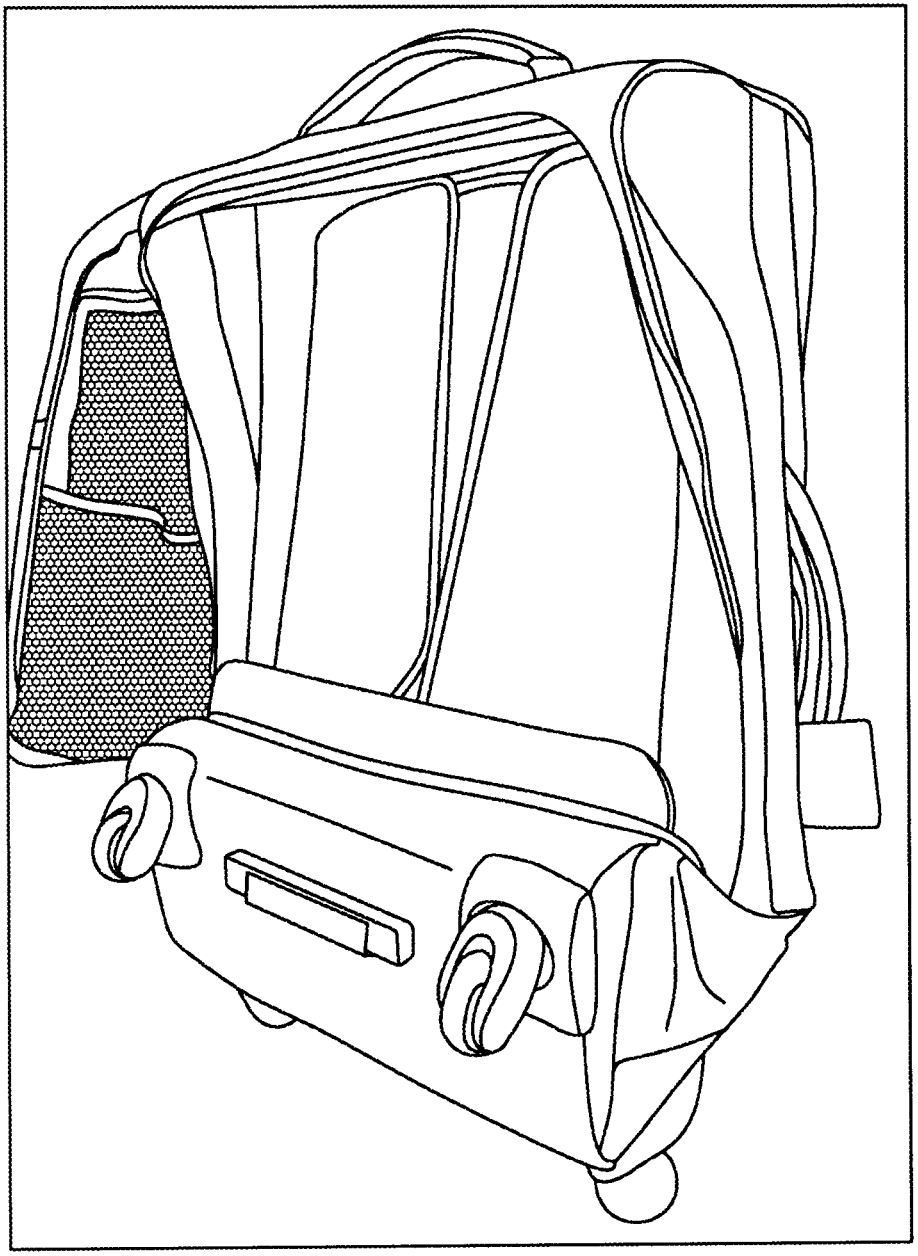

FIG. 76 shows the bottom cover being swiveled upwards to be essentially parallel with the side wings, folded against the rear panel interior of the luggage, and FIG. 77 shows the hinged bottom plate of the luggage being collapsed, where its longer or deeper portion (forward of the hinge) is folded upwards at the hinge, as described above in detail. This particular prototype utilizes a novel self-locking 90° hinge as described above, and therefore a user can hear a click when the hinge reaches the L-shaped position—the vertical stopping position—where the angle between the plates of the hinges is approximately 90°. As can be seen n FIGS. 78 and 79, due to the fact that the zipper of the front flap is not attached along the entire left side of the luggage, as described above, but its fixed attachment begins high enough away from the bottom of the luggage, it does not get in the way of folding the front flap on top of the collapsed bottom front wheels. Thus, if a user desires to first fold down the bottom plate and the top plate and then fold the front flap over both of those, as shown, this can be done, and the front wheels are then covered, with an aesthetically pleasing presentation of the collapsed luggage in its case. To do this it is necessary to have the zippered portion of the front clear the length of the vertical portion of the bottom plate so that this easy flip over can achieved.

Figure 78:
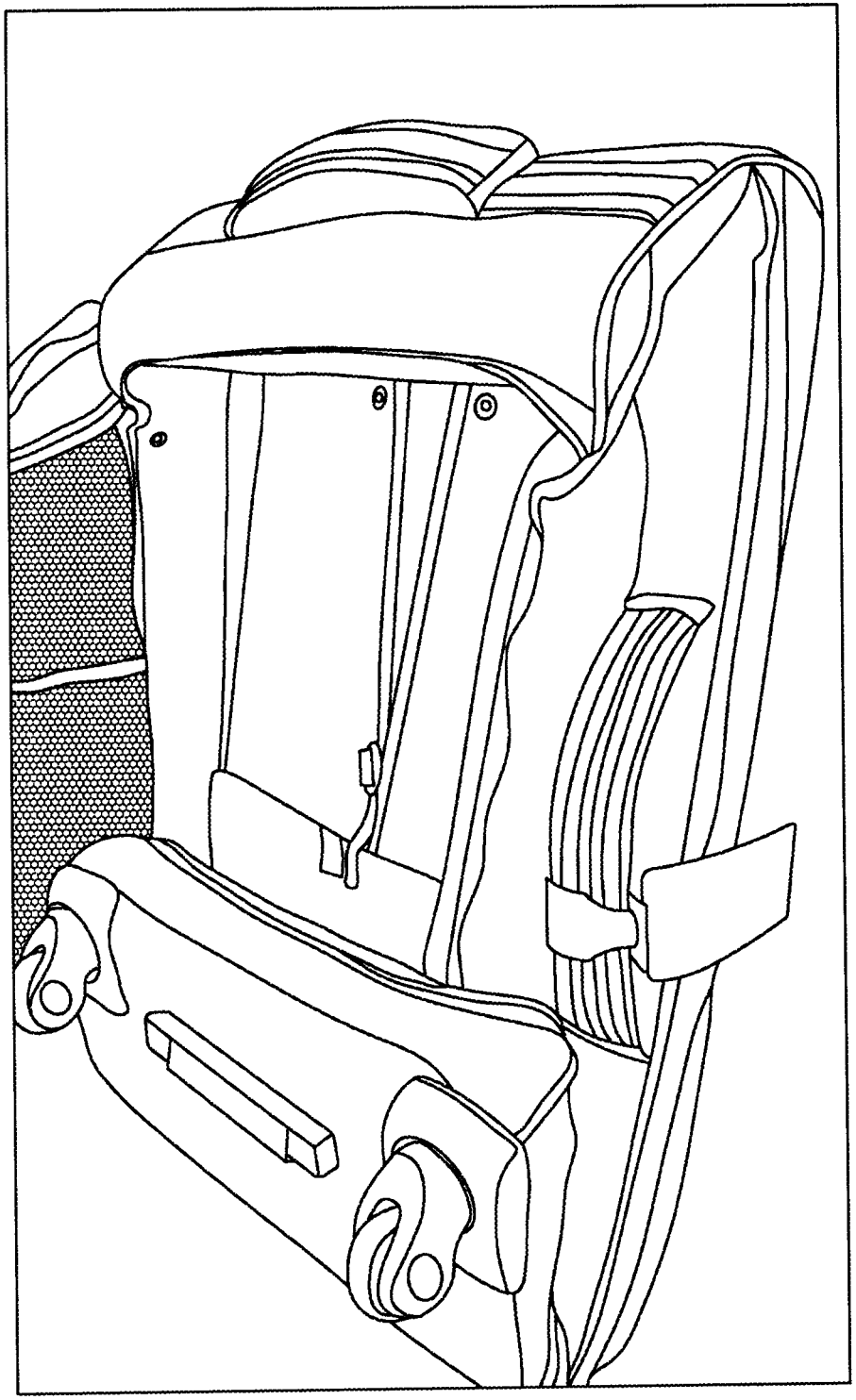
Figure 79:
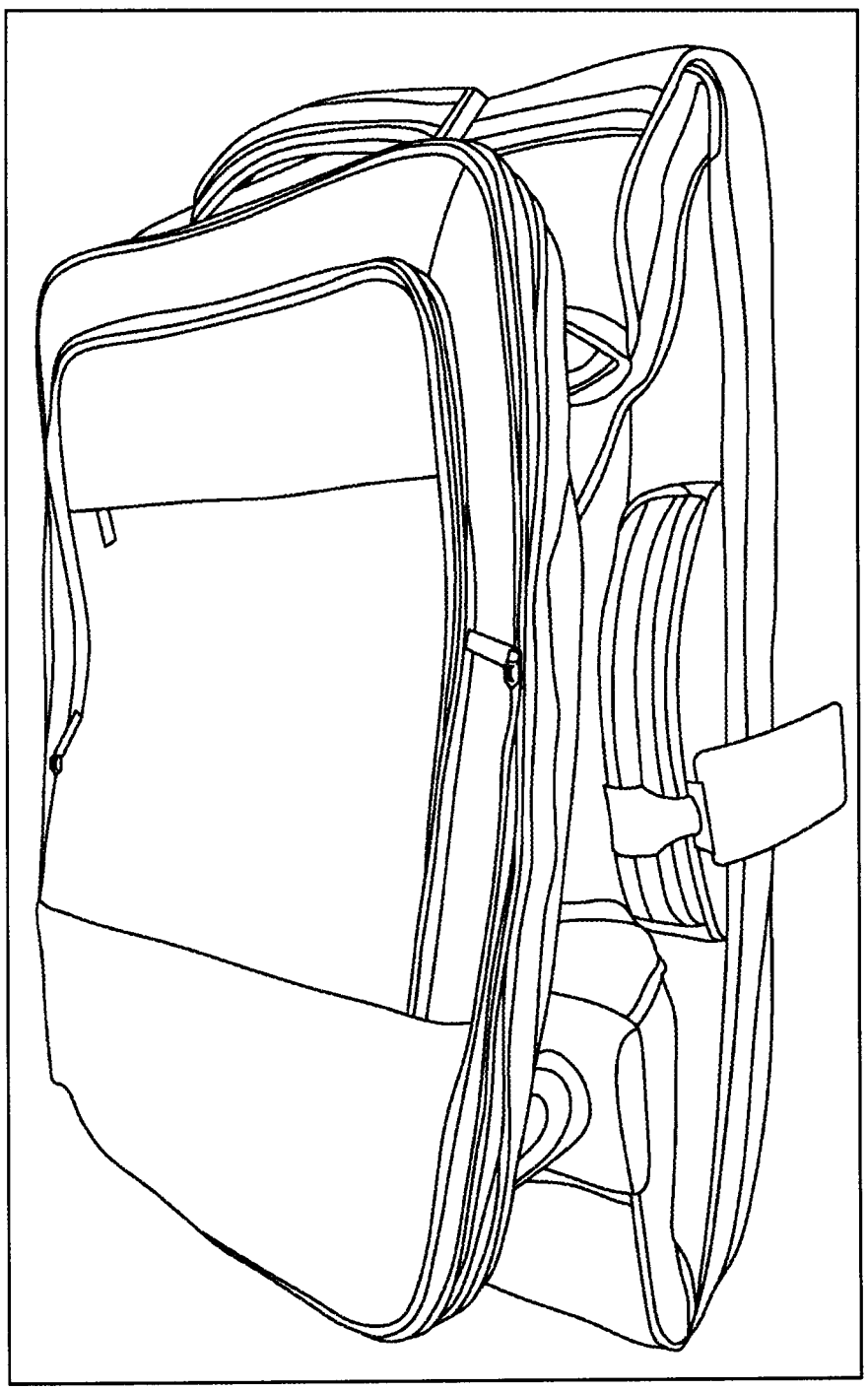

FIG. 78 shows the exemplary top plate being collapsed. The longer portion of the top plate, which in this embodiment is not attached at all to the rear portion of the top plate, but rather sewn next to it in a "sewn-in joint," i.e., encased in fabric with a seam between them, can be easily collapsed downwards, thus allowing the user to flip over the front flap as shown in FIG. 79. This covers both the protruding front wheels from the now vertical front portion of the bottom plate and it also covers the collapsed portion of the top plate, as shown.

Figure 80:
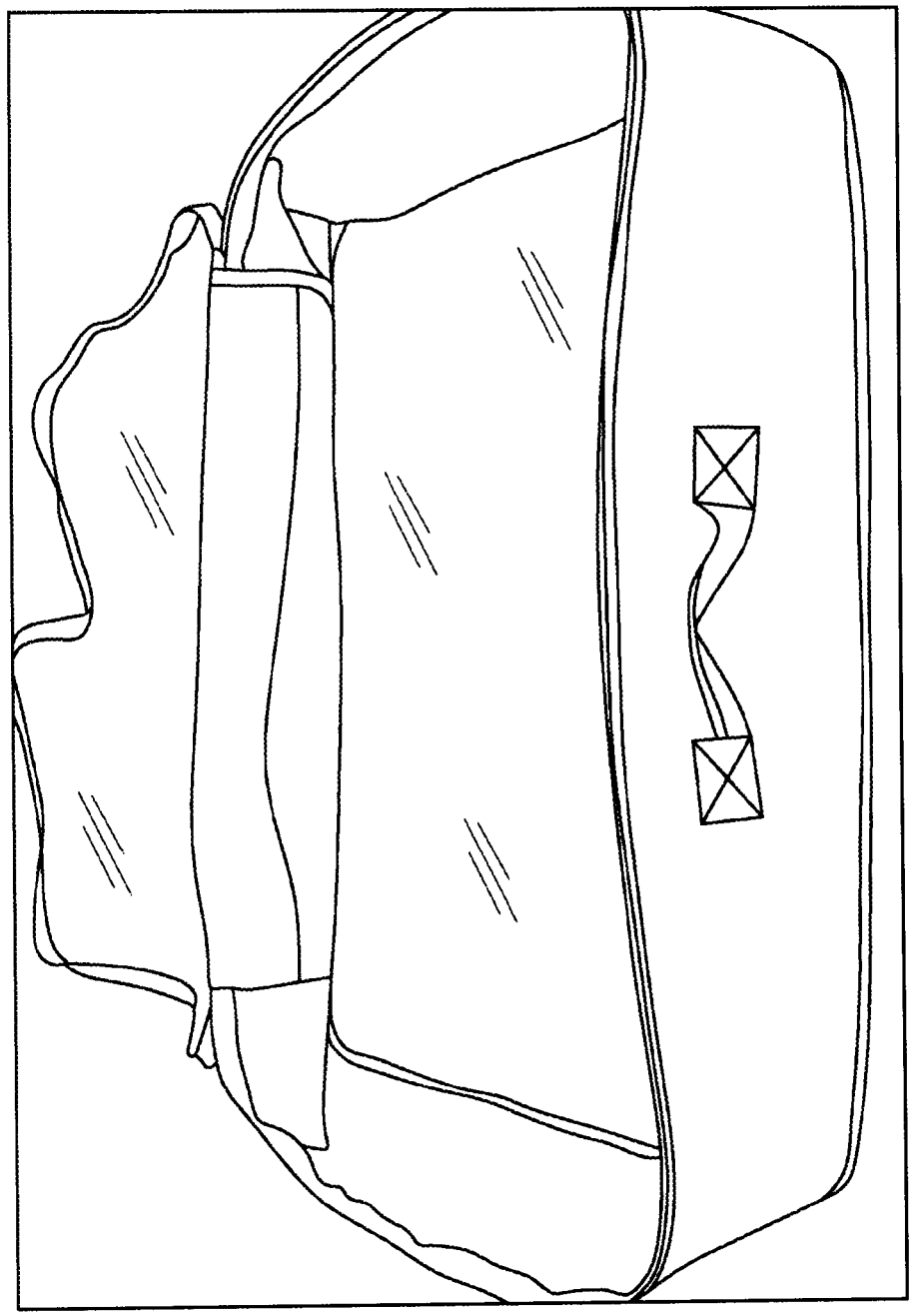

FIG. 80 shows an exemplary transparent carrying case for the collapsed luggage. It is noted that the carrying case has two main transparent surfaces in its front and rear, and the remainder of the case is essentially a fabric band which extends around the perimeter of the case, and can match—in both fabric and in color—with the fabric and color of the actual piece of luggage. Alternatively, various other carrying cases can be used, such as for example, heavier duty fabrics, or opaque fabrics, or both, for example, such as that shown in FIG. 83.

Figure 81:
Figure 82:
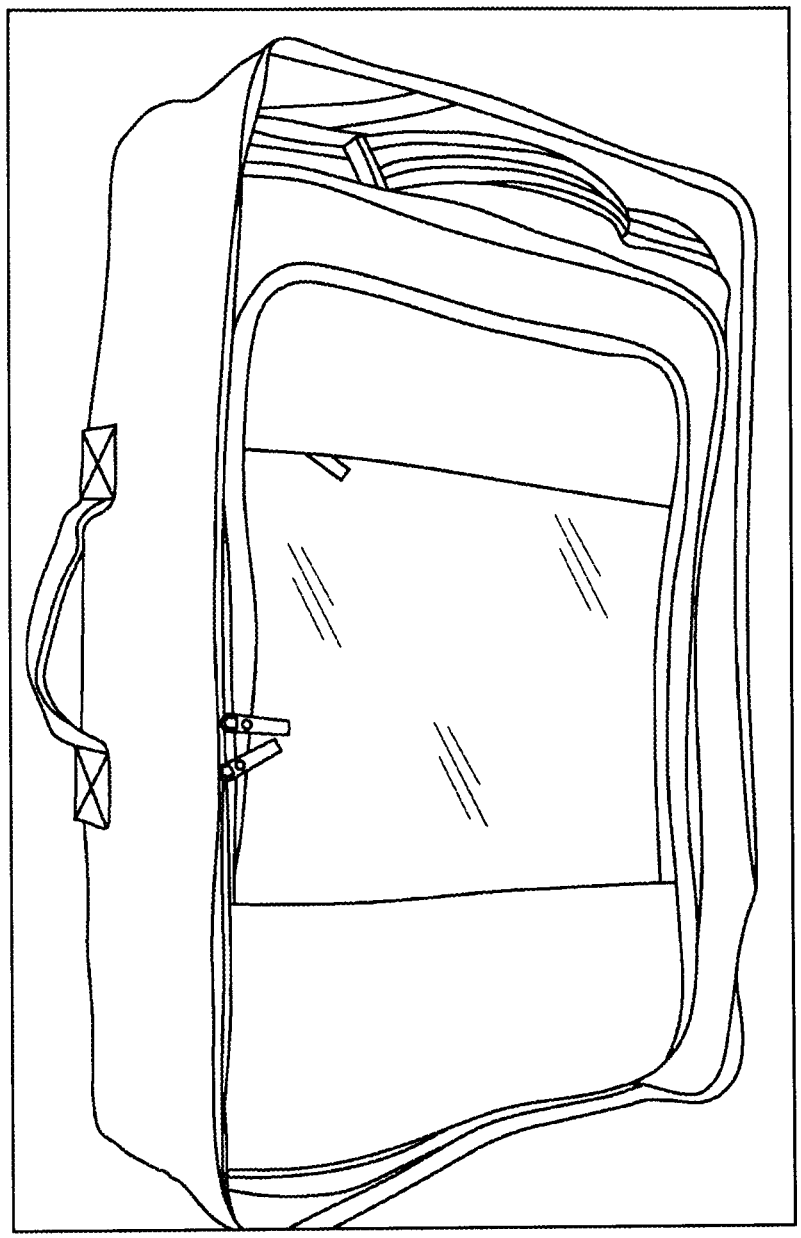

FIG. 81 shows the exemplary article of luggage as inserted into the carrying case, and FIG. 82 shows the completely closed and zippered carrying case containing the luggage standing on its side, ready to be transported. As can be seen in FIG. 82, the front wheels are fully covered by the front flap of the luggage, unlike the alternate configuration shown in FIG. 62.

Packaging and Display Options

Figure 83:
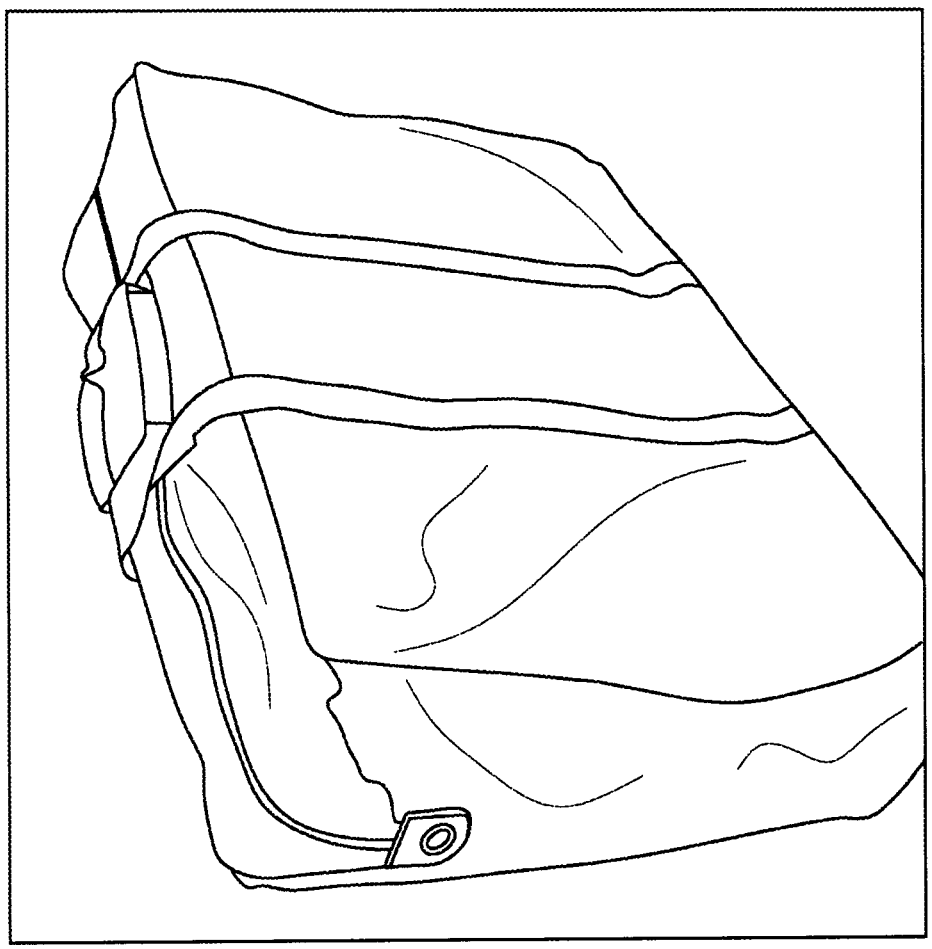

As noted, and as shown in the exemplary photographs, the color of an exemplary article of luggage can be made identical to the color of the carrying case on those four faces where it is not transparent. In exemplary embodiments of the present invention each of the front and back faces of the carrying case can be transparent so that a user can see precisely what is contained inside, or, as noted, heavier duty fabrics, or opaque fabrics, or both, for example, can be used, such as shown in FIG. 83.

It is noted that because conventional luggage is voluminous, large numbers of pieces are not generally presented and stored on the sales floor of retail establishments. Rather a set or two are provided on a platform, and when a user wants to purchase one, the salesman must go to the back room and fetch them. In contrast, luggage according to exemplary embodiments of the present invention can be easily stacked in the case as shown in FIGS. 62 and 63, of FIG. 82, but with one on top of each other with the case lying horizontally such as is shown therein. Therefore one can stack against a back wall, for example, a variety of colors and sizes of luggage and a potential purchaser can see the entire stock that is available in one fell swoop. One can easily imagine a radical change in the marketing of luggage wherein in a typical high ceiling retail space, a wall or number of walls can be used to store large stacks of collapsed luggage in its transparent case in a variety of decorator colors and the user can pull them from the stack as he or she may desire, in similar fashion to how customers purchase shirts or the like, in a boutique such as are found in major retail establishments. Seeing the large stacks of vivaciously colored luggage in the color co-ordinated transparent cases can be visually enticing, and sales can be significantly improved using the novel luggage presented herein.

Options for Additional Support

Figure 84:
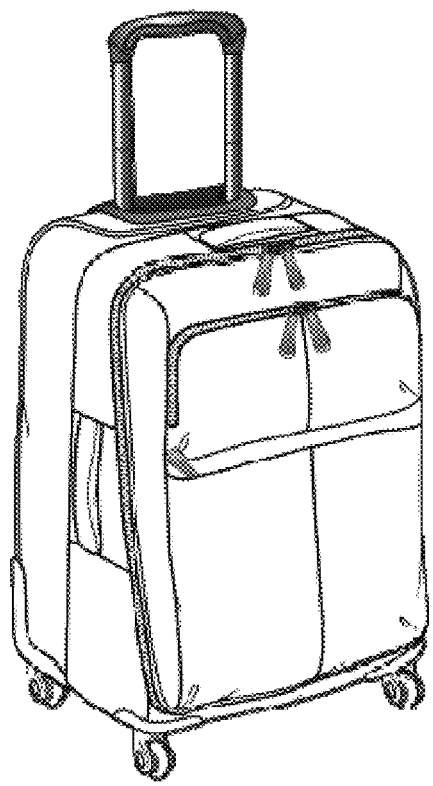
FIG. 84 depicts an alternate exemplary article of luggage in front perspective and side views, respectively, according to an exemplary embodiment of the present invention.
Figure 84:
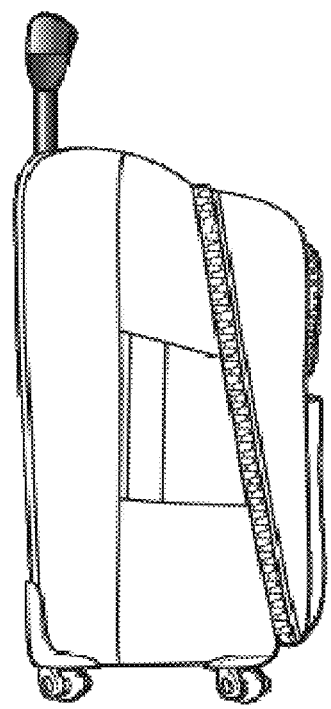

FIG. 84 depicts an alternate exemplary type of luggage that can be formed in a collapsible configuration according to exemplary embodiments of the present invention. It is noted that in the rear portion of the luggage shown in FIGS. 84-85, besides the plastic wheel supports on the bottom of the rear panel of the luggage which extend forward along the depth direction a distance D, there is a semi-rigid band of approximately the same depth D that surrounds the entire article of luggage in each example. This distance can be, for example, equal to the depth of the rear portion of the hinged bottom panel. Therefore, there is a kind of semi-rigid, or rigid, for example, flat ring or band of the same depth D as the rear portion of the bottom plate that can provide support to, and give the remaining panels of the luggage (top, right, left) their form. It is this ring that is not collapsed as seen in FIGS. 84 and 85, and which thus defines the minimum depth of the collapsible luggage in the collapsed state.

With reference to FIG. 84(*a*), one can see at the rear of the bag this semi-rigid band which runs around the entire perimeter of the article. It is within this band that the telescopic handle mechanism is provided and it is along the length of this band on the bottom that the plastic supports holding the wheels are also provided, as noted. All the other panels of the luggage are made of a soft material in this exemplary embodiment.

Figure 85:
FIG. 85 depicts the exemplary article of luggage of FIG. 84 in various stages of collapse and folding according to an exemplary embodiment of the present invention.
Figure 85:
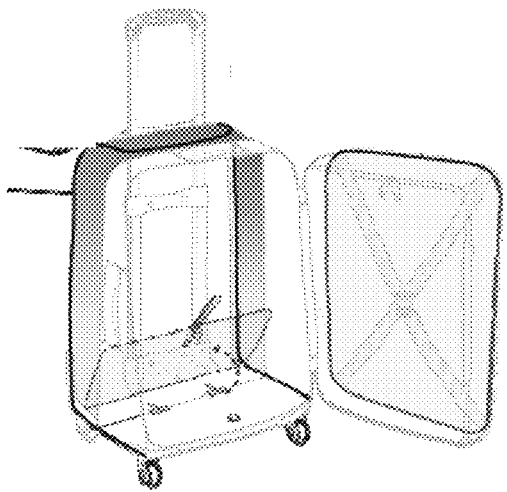
Figure 85:
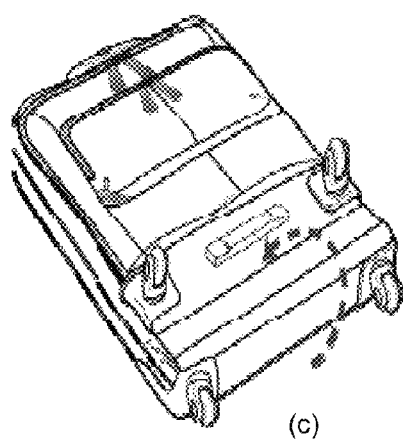

FIG. 85 shows the exemplary article of FIG. 84 in various stages of collapse. With reference thereto, in FIG. 85(*a*), the article is shown with its front flap open and the bottom support flap attached in its normally fully expanded configuration. It is noted that in each of the exemplary embodiments of the present invention, the bottom support flap is attached to the bottom panel of the luggage by means of a fastener in the expanded configuration. In this case a turnbuckle fastener, but as noted above, it is understood that various other types of fasteners can be used. It is also noted that the bottom plate covers the entire surface area of the bottom panel of the luggage and makes and snug fit therewith. This can be accomplished in some embodiments, for example, by means of lips provided in the bottom panel of the luggage within which the bottom support flap snugly fits when closed and fastened. It is this snug fit that ensures all the contents of the bag are supported by the bottom support flap in the fully expanded configuration.

As can be seen with reference to FIG. 85(*b*), to collapse the luggage, the bottom support flap is unfastened and swiveled upwards. This allows the soft panels of the remainder of the article to be collapsed and the forward portion of the hinged bottom plate to similarly be swiveled upwards to cover the now collapsed front panel of the article, as shown in FIG. 85(*c*).

It is also noted that in exemplary embodiments of the present invention, instead of first collapsing the entire piece, folding over the front flap and then swiveling upward the front portion of the bottom plate so that the front wheels are visible in the collapsed configuration, it is also possible to first swivel upwards the front portion of the bottom plate and then cover the protruding front wheels with the front panel, front door, or front flap, of the article of luggage, as the case may be. This allows for storing the luggage in a carrying case in a way that the front wheels do not directly push against the inner surface of the carrying case. As shown below, in various photographs of various exemplary embodiments, this puts less pressure on the plastic of the carrying case, and makes for visually more planar—and thus more "sleek"—view of the bag as compressed and stored in the carrying case.

FIG. 85(*b*) illustrates another feature to provide additional support. Here a front zipper attached cover is somewhat large. It is provided with a rigid cord or, for example, steel, or carbon fiber, or the like around its rear perimeter, as shown. Similar cording is provided in the back of the bag shown in FIG. 84(*b*), there being a cut at the hinge line, and the cord that extends to the front of the bottom plate being sewn in, but not attached, to allow for the front portion of the bottom pate to easily rotate upwards. By combining wire ring supports, as in FIG. 85(*b*), at the front of a piece, and the semi-rigid perimeter band at the back, substantial support can be created, such that a smaller piece, bag or tote can be placed on the top of the exemplary luggage in its expanded state. Use of wire support around the perimeter of the front zipper attached cover can be used for any thickness of such front cover, as well.

The description, figures and photographs are intended by way of example only and are not intended to limit the present invention in any way except as set forth in the following claims. It is particularly noted that the persons skilled in the art can readily combine the various technical aspects of the various elements of the various exemplary embodiments that have been exemplarily described above in numerous other ways, all of which are considered to be within the scope of the invention. For example, any described hinge mechanism can be paired with any conceivable style or material of bottom plate, and any affixation device or system described in connection with one exemplary embodiment is understood to be compatible with any other, etc.

What is claimed is:

1. A collapsible article of luggage, comprising:
   a bottom surface, comprising:
      a rigid front portion,
      a rigid rear portion, said front and rear portions being connected by at least one hinge so that they can move from an essentially coplanar configuration to an essentially perpendicular configuration the result of said rigid front portion being rotated about said hinge to be substantially perpendicular to said rigid rear portion, said rigid rear portion remaining fixed; and
      a locking mechanism arranged to lock said front and rear portions in said essentially coplanar configuration;
   a top surface, comprising:
      a front portion and a rear portion, said front portion and said rear portion arranged so as be able to move from an essentially coplanar configuration to an essentially perpendicular configuration;
   a rear surface, essentially perpendicular to the rear portion of the bottom surface;
   a left side surface;
   a right side surface; and
   a front surface, said front surface releasably connected to at least two of said bottom, top, left and right surfaces,
   wherein, in operation, the article of luggage can be in an expanded configuration and in a collapsed configuration, and
   wherein, in said expanded configuration:
      said front and rear portions of the bottom surface are locked in said essentially coplanar configuration, said bottom surface extends the depth of the luggage, and said front and rear portions of the top surface are positioned in said essentially coplanar configuration,
   and in said collapsed configuration:
      said front and rear portions of the bottom surface are positioned in said essentially perpendicular configuration, and said front and rear portions of the top surface are positioned in said essentially perpendicular configuration.

2. The article of luggage of claim 1, wherein said at least one hinge connecting said front and rear portions of the bottom surface is manually locked by a locking mechanism.

3. The article of luggage of claim 2, wherein said at least one hinge is locked or unlocked by a user pushing on an actuator.

4. The article of luggage of claim 2, wherein said at least one hinge is locked or unlocked by a user activating a spring loaded button.

5. The article of luggage of claim 1, wherein said front and rear rigid portions of said bottom surface are connected by at least one self-locking hinge, also serving as the locking mechanism.

6. The article of luggage of claim 5, wherein said at least one self-locking hinge has natural stops in a 180 degree configuration and a 90 degree configuration.

7. The article of luggage of claim 6, wherein said at least one self-locking hinge emits a sound when it is placed in each of said 90 degree and 180 degree configurations.

8. The article of luggage of claim 1, wherein said front surface is releasably connected to at least two of said bottom, top, left and right surfaces by a zipper or equivalent releasable closure.

9. The article of luggage of claim 1, wherein said front surface is permanently connected to a portion of the front portion of said left surface, and releasably connected to front portions of said bottom, top and right surfaces.

10. The article of luggage of claim 1, further comprising one or more of foldable side panels, a perimeter supporting band at the rear, and a perimeter supporting cord in said front surface.

11. The article of luggage of claim 10, wherein said foldable side panels are connected to one of said rear surface and said right side and left side surfaces, and wherein in an expanded configuration said side panels are positioned essentially parallel to interior surfaces of said right and left side panels, and in a collapsed configuration are positioned essentially parallel to and adjacent to an interior of said rear surface.

12. The article of luggage of claim 11, wherein said side panels provide structural support.

13. The article of luggage of claim 11, wherein said side panels comprise a wire or carbon fiber frame covered in fabric.

14. The article of luggage of claim 1, further comprising at least one of: foldable side panels and a foldable bottom cover, said foldable bottom cover.

15. The article of luggage of claim 14 or 1, wherein said bottom cover is provided with lateral lips, arranged to hold side panels in a final expanded position.

16. The article of luggage of claim 1, further comprising either:
(i) two wheels provided on the rigid rear portion of the bottom surface; or
(ii) two wheels provided on the rigid rear portion of the bottom surface, and two wheels provided on the rigid front portion of the bottom surface.

17. The article of luggage of either of claim 1 or 16, further comprising a telescoping handle that can be used with the article standing on the ground.

18. A method of providing collapsible luggage, comprising:
providing a rigid bottom plate comprising two rigid portions, a rear portion and a front portion, the front portion capable of being rotated relative to the rear portion about a first axis, said first axis being at a defined distance forward of the rear edge of said rear portion;
providing a rigid top plate comprising two rigid portions, a rear portion and a front portion, the front portion capable of being rotated relative to the rear portion about a second axis;
providing a flexible rear surface, right side surface and left side surface, said rear surface essentially perpendicular to the rear portion of the bottom surface;
providing a right side support that can be rotated along a third axis; and
providing a left side support that can be rotated along a fourth axis, the third and fourth axes being essentially parallel, and allowing said right side support and said left side support to be folded substantially into a plane, wherein the first axis and the second axis are substantially parallel, and substantially perpendicular to the third axis and the fourth axis, the rigid bottom portion arranged to be locked in essentially coplanar configuration,
wherein said bottom surface extends the depth of the luggage.

19. A method of providing collapsible luggage, comprising:
providing a rigid bottom plate comprising two rigid portions, a rear portion and a front portion, the front portion capable of being rotated relative to the rear portion about a first axis;
providing a rigid top plate comprising two rigid portions, a rear portion and a front portion, the front portion capable of being rotated relative to the rear portion about a second axis;
providing a flexible rear surface, right side surface and left side surface;
providing a right side support that can be rotated along a third axis; and
providing a left side support that can be rotated along a fourth axis, the third and fourth axes being essentially parallel, and allowing said right side support and said left side support to be folded substantially into a plane, wherein the first axis and the second axis are substantially parallel, and substantially perpendicular to the third axis and the fourth axis, the rigid bottom portion arranged to be locked in essentially coplanar configuration, wherein said bottom surface extends substantially the full depth of the luggage.

20. The method of claim 19, wherein the collapsible luggage can assume either an expanded state and a collapsed state, the expanded state having:
the two portions of the bottom plate substantially coplanar;
the two portions of the top plate substantially coplanar; and the right side support and the left side support being each substantially perpendicular to the top plate and the bottom plate.

21. The method of claim 20, the collapsed state having: the two portions of the bottom plate substantially perpendicular; the two portions of the top plate substantially perpendicular; and the right side support and the left side support being each substantially parallel to the flexible rear surface.

22. The method of any of claims 19-21, wherein the ratio of the volume of the luggage in the collapsed state to that of the volume in the expanded state is equal to the ratio of the length of the shorter of the portions of the bottom plate plus any protrusion from the longer of the portions of the bottom plate to the sum of the lengths of the two portions of the bottom plate.

23. A method of providing collapsible luggage, comprising:
providing a rigid rear panel;
providing a rigid bottom plate comprising two rigid portions, a rear portion and a front portion, the front portion capable of being rotated relative to the rear portion about a first axis so as to allow the two portions to be in either a planar and a perpendicular configuration, said first axis being at a defined distance forward of the rear edge of said rear portion of said bottom plate, and said rear portion of the bottom plate essentially perpendicular to the rigid rear panel;
providing a flexible top surface, front surface, right side surface and left side surface; and
providing a bottom support flap that can be rotated along a second axis substantially parallel to said first axis, allowing said support flap to either lie on top of said rigid bottom plate in its planar configuration or be folded substantially into a plane adjacent to the rear panel when said rigid bottom plate is in its perpendicular configuration, wherein the two portions of the rigid bottom plane are connected in each of its planar and perpendicular configurations by one or more self-locking hinges, and wherein, when said two portions of the bottom plate are in said planar configuration said front and rear portions of the bottom surface are locked in said planar configuration by said one or more self-locking hinges, and said bottom surface extends the depth of the luggage.

24. The method of claim 23, wherein the one or more self-locking hinges comprise a self-locking hinge, including:

a first arm and a second arm, the first arm provided with a cylinder containing a spring and a ball, the first arm and the second arm each rotatably connected to an axis; and a flange co-axial with the axis, the flange fixed with respect to the second arm, the flange having a first radius over most of its arc length, and smaller radii at selected positions along its surface, the selected positions corresponding to preset stops, wherein the flange is placed along the axis so as to abut the ball at the end of the cylinder.

* * * * *